(12) United States Patent
Sugiura et al.

(10) Patent No.: US 7,075,602 B2
(45) Date of Patent: Jul. 11, 2006

(54) SUBSTRATE FOR REFLECTIVE LIQUID CRYSTAL DISPLAY DEVICE AND REFLECTIVE LIQUID CRYSTAL DISPLAY DEVICE USING THE SAME WHEREIN THE REFLECTIVE SURFACE IS A WRINKLED PATTERN OF SMALL MIRRORS

(75) Inventors: Norio Sugiura, Kawasaki (JP);
Katsufumi Ohmuro, Kawasaki (JP);
Kunihiro Tashiro, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/166,603

(22) Filed: Jun. 11, 2002

(65) Prior Publication Data
US 2003/0123000 A1    Jul. 3, 2003

(30) Foreign Application Priority Data
Oct. 15, 2001    (JP) .............................. 2001-317500

(51) Int. Cl.
*G02F 1/1335* (2006.01)
(52) U.S. Cl. ..................................................... 349/113
(58) Field of Classification Search ................ 349/113
See application file for complete search history.

(56) References Cited

U.S. PATENT DOCUMENTS 3,950,078 A * 4/1976 Zatsky ........................ 349/71
4,431,272 A * 2/1984 Yazawa et al. ............. 349/113
6,476,890 B1 * 11/2002 Funahata et al. ........... 349/113
6,573,959 B1 * 6/2003 Molsen ........................ 349/113
6,583,840 B1 * 6/2003 Inoue et al. ................. 349/141

FOREIGN PATENT DOCUMENTS

| EP | 884 626 | | 12/1998 |
|---|---|---|---|
| GB | 1462978 | | 1/1977 |
| GB | 02 028 529 A | * | 3/1980 |
| GB | 2028529 | * | 3/1980 |
| JP | 5-232465 | | 9/1993 |
| JP | 6-011711 | | 1/1994 |
| JP | 8-338993 | | 12/1996 |
| JP | 10-153802 | | 6/1998 |
| JP | 11-305236 | | 11/1999 |
| JP | 11-311784 | | 11/1999 |
| JP | 2000-029030 | | 1/2000 |
| JP | 2001-083523 | | 3/2001 |
| WO | WO 98/57222 | * | 12/1998 |
| WO | WO 9857222 | * | 12/1998 |

* cited by examiner

*Primary Examiner*—Andrew Schechter
*Assistant Examiner*—Jeanne Andrea Di Grazio
(74) *Attorney, Agent, or Firm*—Greer, Burns & Crain, Ltd.

(57) ABSTRACT

The invention provides a reflective liquid crystal display device being low cost, high reflectance, and high contrast in the reflective liquid crystal display device of VA system providing a diffusion reflective plate having uneven shape and using negative dielectric anisotropy liquid crystal and a substrate using for a reflective liquid crystal display device. Assuming that reflective surface of the reflective plate has plurality of small mirror surfaces, direction of normal vector In of the small mirror is constructed so that standard deviation of probability distribution existing within angle range of azimuth angle from $\phi n$ to $\phi n+1°$ is 0.1 or more.

7 Claims, 48 Drawing Sheets

FIG.10
| CELL GAP | AZIMUTH ANGLE CONDITION THAT δ SHIFTS MORE THAN 25° FROM 90° |
|---|---|
| 2um | 10~50° |
| 2.5um | 30° |
| 3um | 120~140° |
| 3.5um | 100~160° |
| 4um | 0~10°　50~180° |
FIG.11
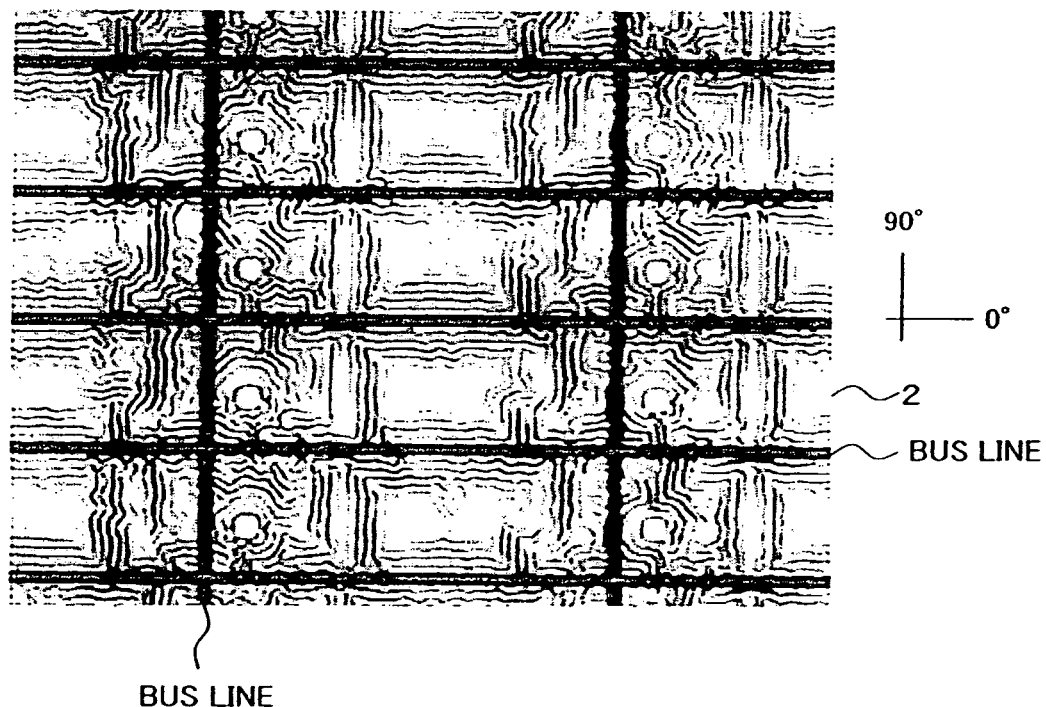
FIG.12
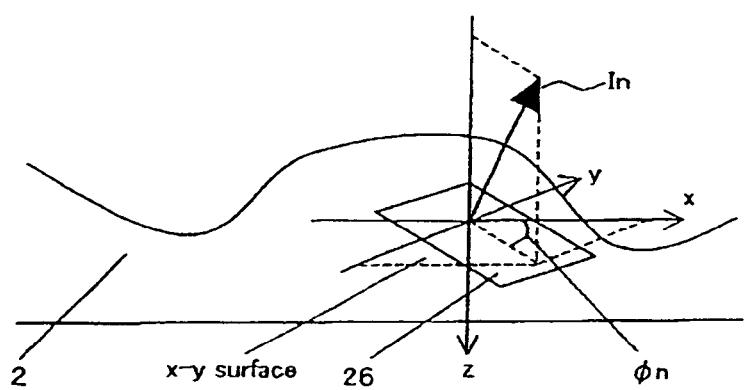

|  | STANDARD DEVIATION | NOTE |
|---|---|---|
| SAMPLE 1 | 0.56 | UNEVEN SHAPE OF EMBODIMENT 1-1 |
| SAMPLE 2 | 0.32 | |
| SAMPLE 3 | 0.10 | CONVENTIONAL EXAMPLE |

|  | MAXIMUM | MINIMUM |
|---|---|---|
| SAMPLE 1 | 29.5 | 23.4 |
| SAMPLE 2 | 26.8 | 24.2 |
| SAMPLE 3 | 25.1 | 24.7 |

FILM THICKNESS 4 μm

FILM THICKNESS 3.5 μm

FILM THICKNESS 3 μm

FILM THICKNESS 2.5 μm

FILM THICKNESS 2 μm

FILM THICKNESS 1.5 μm

FILM THICKNESS 1 μm

FILM THICKNESS 0.7 μm

FIG.20
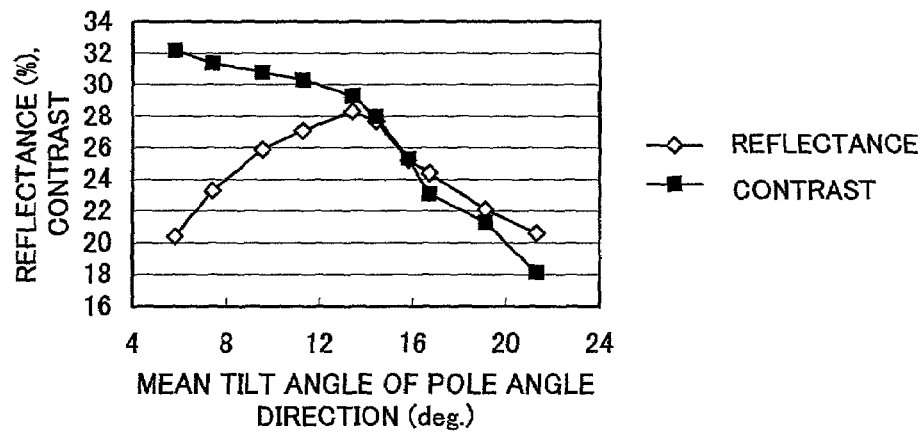
FIG.21
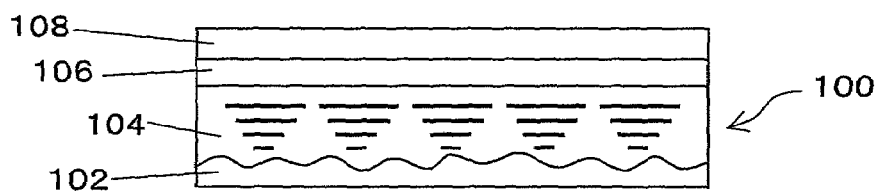
FIG.22A                FIG.22B
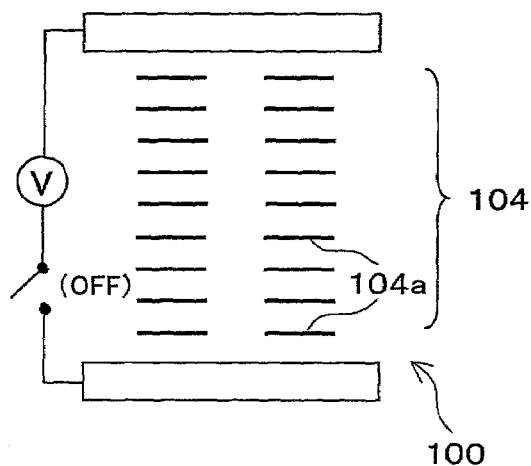  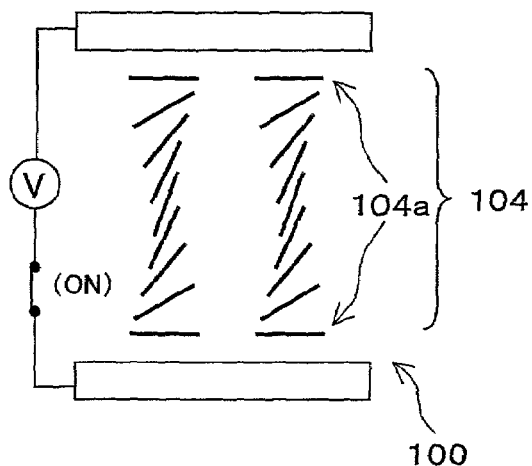

US 7,075,602 B2

SUBSTRATE FOR REFLECTIVE LIQUID CRYSTAL DISPLAY DEVICE AND REFLECTIVE LIQUID CRYSTAL DISPLAY DEVICE USING THE SAME WHEREIN THE REFLECTIVE SURFACE IS A WRINKLED PATTERN OF SMALL MIRRORS

BACKGROUND OF THE INVENTION

Field of the Invention

The present invention relates to a reflective liquid crystal display device and a substrate for the reflective liquid crystal display device used for the device, and more particularly, to die reflective liquid crystal display device of VA system providing a diffusion reflective plate having uneven shape and using liquid crystal of negative dielectric anisotropy, and a substrate for the reflective liquid crystal display device used for the device.

The reflective liquid crystal display device has characteristics of thin shape, light weight, and low power consumption, and does not need a back light unit because of the display using external light so that it is possible to realize a thin paper-like display device. The reflective liquid crystal display device put to practical use nowadays adopts a one sheet polarizing plate system disclosed in Japanese Patent Laid-Open No. 232465/1993 and Japanese Patent Laid-Open No. 338993/1996. Since high contrast is obtained and only one sheet of polarizing plate is used by the one sheet polarizing plate system, loss of light is reduced and a comparatively bright display is obtained.

FIG. 21 shows an outline of the reflective liquid crystal display device 100 construction according to a one sheet polarizing plate system of the related art, and shows a section cut off vertically to a display surface. A diffusing reflective plate 102 having uneven reflective surface is formed on a substrate not shown. A phase difference plate (λ/4 plate for example) 106 is arranged on a facing substrate not shown through the reflective surface of the diffusion reflective plate 102 and the predetermined cell gap. A polarizing plate 108 is arranged at an external light incidence side of the phase difference plate 106. A liquid crystal layer 104 is sealed in the predetermined cell gap, and horizontal alignment films (not shown) are fanned at boundaries of the liquid crystal layer 104 of both substrates. A rubbing treatment, for example, is performed on the two horizontal alignment films sandwiching the liquid crystal layer 104 so that liquid crystal molecules of the boundaries are orientated in different directions to each other.

For the liquid crystal layer 104, nematic liquid crystal having positive dielectric anisotropy is used. Since liquid crystal molecules of the horizontal alignment film boundary are oriented almost horizontally at the predetermined pre-tilt angle in the condition that voltage is not applied between the both substrates, the liquid crystal becomes twist nematic liquid crystal in which liquid crystal molecules are rotated toward a cell gap direction. The conventional reflective liquid crystal display device 100 of one sheet polarizing plate system performs display of normally white type displaying bright condition (that is, white) when no voltage is applied.

FIG. 22A and FIG. 22B show conditions of liquid crystal molecules 104a in the liquid crystal layer 104 of the conventional reflective liquid crystal display device 100 of one sheet polarizing plate system. FIG. 22A shows the liquid crystal molecules 104a in the bright condition when no voltage is applied, and FIG. 22B shows the liquid crystal molecules 104a in the dark condition when voltage is applied. For easy description, condition of the crystal molecules 104a without twist is drawn simplifying the figure in FIG. 22A and FIG. 22B. In the dark condition, the liquid crystal molecules 104a of the horizontal alignment film boundary does not rotate much to the vertical direction from horizontal direction even if voltage is applied because of anchoring effect (alignment regulation) as shown in FIG. 22B. Because of that, retardation (phase delay) occurs at this area, and a problem of not enough black display. Then, a method is proposed, in which a phase difference plate is designed considering residual retardation at voltage applying condition (Y. Itoh, N. Kimura, S. Mizushima, Y. Ishii, and M. Hijikigawa, AM-LCD 2000 digest, p. 243 (2000)). However even if such design is performed, it is difficult to remove the retardation at all wavelengths and to obtain high contrast.

FIG. 23 shows an outline of the reflective liquid crystal display device 101 construction according to one sheet polarizing plate system of to related art differing from the device of FIG. 21, and shows a section vertically cut off cut to a display surface. A point differing from the structure shown in FIG. 21 is that vertical alignment films (not shown) are formed at boundaries of the liquid crystal layer 105 of both substrates and nematic liquid crystal having negative dielectric anisotropy is used for the liquid crystal layer 105. Thereby, a liquid crystal display device of VA (vertically aligned) type in which liquid crystal molecules of vertical alignment film boundaries orient almost vertically at the condition when no voltage is applied between both substrates is constructed. The conventional reflective liquid crystal display device 101 of one sheet polarizing plate system performs display of normally black type displaying dark condition (that is, black) when no voltage is applied. The conventional reflective liquid crystal display device 101 can obtain very high contrast because residual retardation does not exist at a black display. However, since retardation generates for incident light from an oblique direction to a display surface, a problem that it is difficult to obtain a good dark condition in external incident light to the display surface from all directions occurs. Especially, since light reaching the diffusion reflective plate 102 is further diffused and reflected there by using the diffusion reflective plate 102 having an unevenness, influence of light by an oblique incidence becomes large so that contrast falls remarkably.

SUMMARY OF THE INVENTION

An object of the invention is to provide a reflective liquid crystal display device having low cost, high reflectance, and high contrast and a substrate for the reflective liquid crystal display device used for the device.

Assuming that a substrate for the reflective liquid crystal display device provides a light reflective plate forming an uneven shape at a reflective surface and the reflective surface is constructed by a plurality of small mirror surfaces, the above-mentioned object is achieved by a substrate for the reflective liquid crystal display device in which a standard deviation of a probability distribution that has a direction of a normal vector of the small mirror surfaces existing at an azimuth angle range of $\phi n$ to $\phi n+1°$ is larger than 0.1.

BRIEF DESCRIPTION OF THE DRAWINGS

FIG. 10 is a view showing range of azimuth φ when the cell gap is 2 to 4 μm and phase difference δ exceeds 25° or more from 90°;

FIG. 11 is a view showing the diffusion reflective plate 2 having the reflective surface constructed with wrinkled shape uneven pattern according to Embodiment 1-1 in the first mode for carrying out the invention;

FIG. 12 is a view describing to obtain existence probability distribution of normal vector In of a small mirror surface 26 about azimuth φn of normal vector In assuming that surface of the diffusion reflective plate 2 is constructed with the small mirror surfaces 26;

FIG. 13 is a view showing existence probability of normal vector In to direction of normal vector In;

FIG. 15 is a view showing existence probability of normal vector In to direction of normal vector In;

FIG. 16 is a view showing standard deviation of existence probability at azimuth dependency of the diffusion reflective plates of Sample 1 to Sample 3 obtained from existence probability distribution of azimuth dependency shown in FIG. 15;

FIG. 17 is a view showing the maximum value and the minimum value of contrast at varying azimuth of the diffusion reflective plate;

FIG. 20 is a view showing the result of reflectance and contrast to mean tilt of polar angle direction;

FIG. 21 shows an outline of the conventional reflective liquid crystal display device construction according to one sheet polarizing plate system, and is a view showing section vertically cut off to display surface;

FIG. 22A and FIG. 22B are views showing conditions of liquid crystal molecules when voltage is applied for the conventional reflective liquid crystal display device 100 according to one sheet polarizing plate system;

FIG. 58A to FIG. 58F are views showing pictures observed at alignment observation in Embodiment 3-1 according to the third mode for carrying out the invention.

DETAILED DESCRIPTION OF PREFERRED EMBODIMENTS

[First Mode for Carrying Out]

Figure 1A:
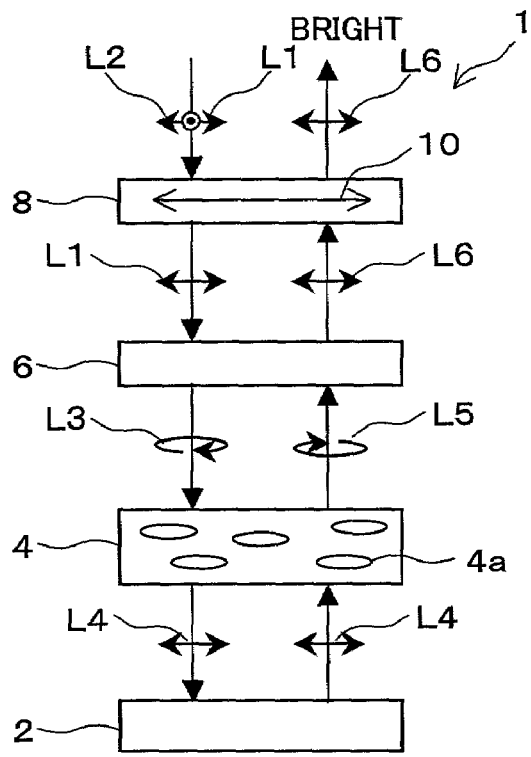
FIG. 1A and FIG. 1B are views describing a schematic view of the structure and operational principle of a reflective liquid crystal display device according to a first mode for carrying out the invention.
Figure 1B:
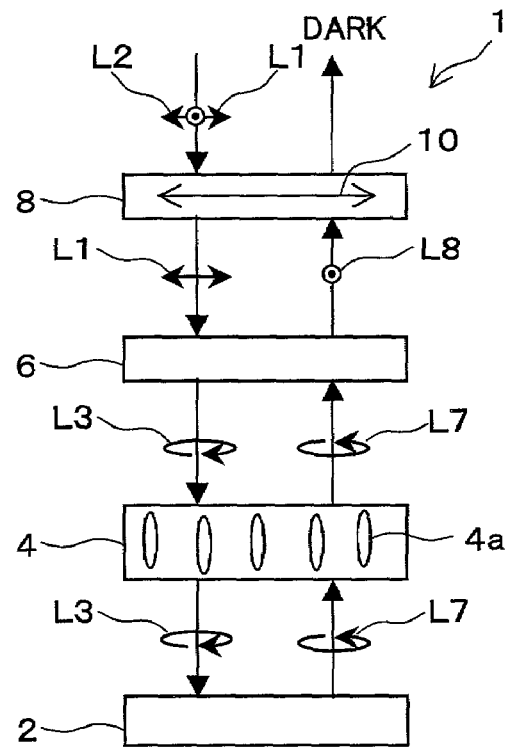

A substrate for a reflective liquid crystal display device and a reflective liquid crystal display device using the substrates according to a first mode for carrying out the invention will be described referring FIG. 1A to FIG. 20. First, using FIG. 1A and FIG. 1B, a schematic of the structure and operational principle of the reflective liquid crystal display device according to the mode for carrying out will be described. FIG. 1A and FIG. 1B show a section of the reflective liquid crystal display device 1 vertically cut off to display surface, FIG. 1A shows a bright condition (white display), and FIG. 1B shows a dark condition (black display). A diffusion reflective plate 2 having an uneven reflective surface is formed on a substrate not shown. A phase difference plate (λ/4 plate for example) 6 is arranged on a facing substrate not shown facing the reflective surface of the diffusion reflective plate 2 through the predetermined cell gap substrate. A polarizing plate 8 is arranged at external light incidence side of the phase difference plate 6. A liquid crystal layer 4 is scaled in the predetermined cell gap, and vertical alignment films (not shown) are firmed at boundaries of the liquid crystal layer 4 of both substrates.

For the liquid crystal layer 4, liquid crystal of VA type having negative dielectric anisotropy is used, in which liquid crystal molecules of the vertical alignment film boundary are oriented almost vertically in the condition that a voltage is not applied between the substrates. The reflective liquid crystal display device 1 of a one sheet polarizing plate system performs a display of normally black type, displaying a dark condition when no voltage is applied.

It is regarded that the polarizing plate 8 has a polarizing axis (light transmitting aids) 10 parallel to the surface of die paper in FIG. 1A. When external light (presented with light L1 of linear polarized light having polarizing azimuth parallel to the polarizing axis 10, and light L2 of linear polarized light having polarizing azimuth. intersecting the L1 at right angle and vertical to the surface of the paper) enters the polarizing plate 8 from display surface, light L2 is absorbed at the polarizing plate 8, and only light L1 transmits the polarizing plate 8. Next, light L1 enters the λ/4 plate 6, becomes light L3 of circularly polarized light (right-handed viewing from direction facing traveling direction for example), and enters the liquid crystal layer 4. Liquid crystal molecules 4a are tilted to the liquid crystal layer 4 at the state that voltage is applied, light L3 becomes light L4 of linear polarized light having polarized light azimuth parallel to the surface of paper by retardation generated by tilt of the liquid crystal molecules 4a, reflects at the diffusion reflection plate 2, and enters the liquid crystal layer 4 again. Light L4 becomes light L5 of right-handed circularly polarized light again by retardation of the liquid crystal layer 4. Next, light L5 enters the λ/4 plate 6, becomes light L6 of circularly polarized light parallel to the surface of paper, and emits from the λ/4 plate 6. Polarized light azimuth of light L6 is parallel to polarizing axis of the polarizing plate 8, therefore L6 transmits the polarizing plate 8, emits out of the display surface, and white display is performed.

On the other hand, when external light enters the polarizing plate 8 from display surface in FIG. 1B, light L2 is absorbed at the polarizing plate 8, only light L1 transmits the polarizing plate 8. Next, light L1 enters the λ/4 plate 6, becomes light L3 of right-handed circularly polarized light, and enters the liquid crystal layer 4. Liquid crystal molecules 4a stand almost vertically to the liquid crystal layer 4 at condition that voltage is not applied and retardation is not generated. Thus, light L3 enters the diffusion reflective plate 2 holding right-handed circularly polarized light condition. Since light L3 is converted 180° in traveling direction while reflecting at the diffusion reflective plate 2, rotating direction of circularly polarized light becomes practically reversed, it becomes light L7 of loft-handed circularly polarized light, and enters the liquid crystal layer 4 again. Since light L7 is not influenced by retardation at the liquid crystal layer 4, light L7 enters the λ/4 plate 6 balding left-banded circularly polarized light condition, it becomes light L8 of linear polarized light vertical to the surface of paper, and emits from the λ/4 plate 6. Since polarized light azimuth of light L8 crosses at polarizing axis of the polarizing plate 8, L8 is absorbed at the polarizing plate 8 so that light is not emitted out of display surface and results in black display. Therefore, in order to obtain a dark condition, it is needed that incident light becomes circularly polarized light at the diffusion reflective plate 2.

However, since retardation of the λ/4 plate 6 and the liquid crystal layer 4 changes about the oblique incident light coming to the display surface obliquely, retardation occurs and oblique incident light becomes ellipsoid polarized light at the diffusion reflective plate 2. By not reflection such reflective light to an observing direction of the display surface, it is possible to realize a good dark condition.

That is, by making a surface construction of the diffusion reflective plate 2 shown in FIG. 1A and FIG. 1B an uneven structure having reflective directivity of an azimuth direction, the loss of contrast can be reduced. Especially, assuming that the uneven structure of surface of the diffusion reflective plate 2 is constructed by a plurality of small mirror surfaces, it is possible to reduce contrast loss by making by the standard deviation of a probability distribution that a direction to a normal vector of small minor surfaces exists at an angle range of φn to φn+1° larger than 0.1.

The reflective liquid crystal display device according to the modes for carrying out will be described below using embodiments.

EMBODIMENT 1-1

Figure 2A:
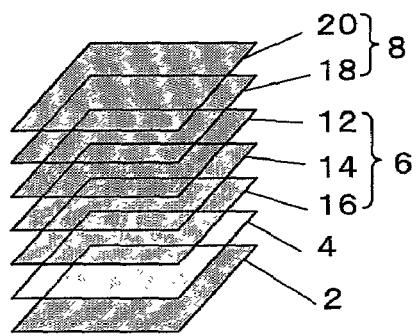
FIG. 2A and FIG. 2B are views showing a reflective liquid crystal display device of Embodiment 1-1 according to a first mode for carrying out the invention as a model.
Figure 2B:
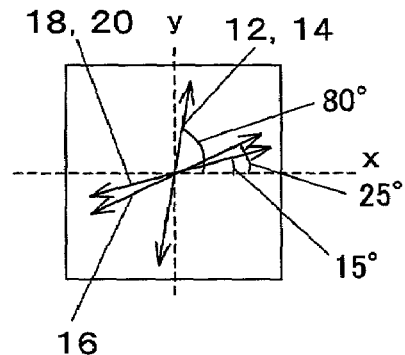

FIG. 2A and FIG. 2B are views showing the reflective liquid crystal display device according to the invention as a model. FIG. 2A is a perspective view showing laminating condition of each optical element, and FIG. 2B shows arranged relation of these optic axes. FIG. 2B will be described later.

The phase difference plate 6 has a first phase difference plate 12 (λ/2 made of resin having norbornen structure) and a second phase difference plate 14 (λ/4 made of the same resin) in order to realize wide band λ/4 plate as shown in FIG. 2A. The phase difference plate 6 is constructed by further inserting a third phase difference plate 16 (negative phase difference film VAC 75 by Sumitomo Chemical Company is used) compensating retardation by oblique incidence between the wide band λ/4 plate and the liquid crystal layer 4.

For the liquid crystal layer 4, liquid crystal material (by Merck Japan Company) having negative dielectric anisotropy and Δn=0.1 in refractive index difference is used.

The polarizing plate 8 has a polarizing film 20 (G01220DU by Nitto Denko Company) and a TAC (Triacetyl Cellulose) film 18. Even in the TAC film 18, retardation exists so it is also necessary to consider the retardation.

Figure 3:
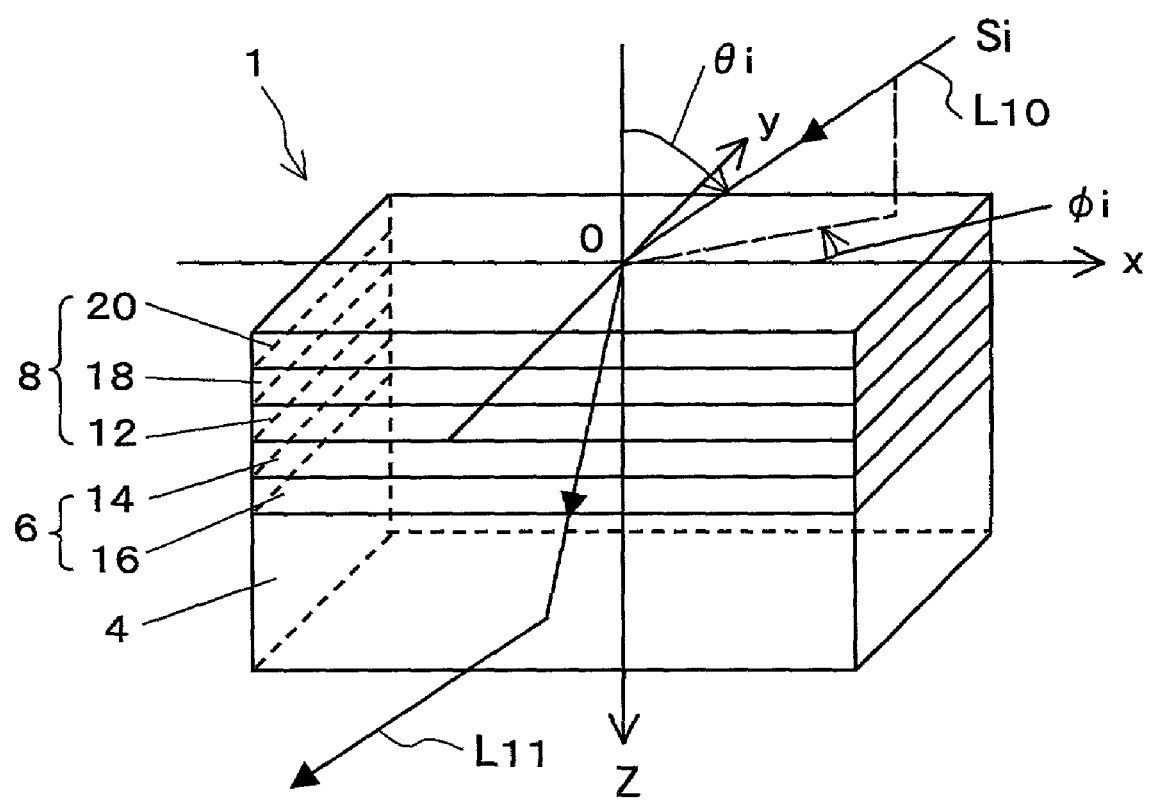
FIG. 3 is a perspective view showing a reflective liquid crystal display device of Embodiment 1-1 according to a first mode for carrying out the invention as a model.

FIG. 3 shows a state that a polarizing condition (phase differenceδ) of incident light L11 on the diffusion reflective plate 2 is examined by applying light L10 from a display surface or the reflective liquid crystal display device 1 of to VA mode of the construction shown in FIG. 1A and FIG. 2B. The embodiment will be described using the following coordinate system by taking the origin 0 of the coordinate system at the center of display surface displaying a picture; taking x axis (right side is positive in the figure) for a horizontal direction parallel to the display surface passing through the origin 0; taking a y axis (upper right side is positive in the figure) for a direction parallel to the display surface and intersecting the x axis at a right angle; and taking z axis (lower side is positive in the figure) for the normal direction of display surface. In the arbitrary point Si of three-dimensional space shown in the coordinates system, azimuth angle φi (angle measured counterclockwise from positive side of x axis) is the angle between the projection of the arbitrary point Si and coordinates origin 0 on the x-y surface and the x axis, and pole angle θi (angle measured from negative side of z axis) is the angle between the straight line and z axis.

Figure 4:
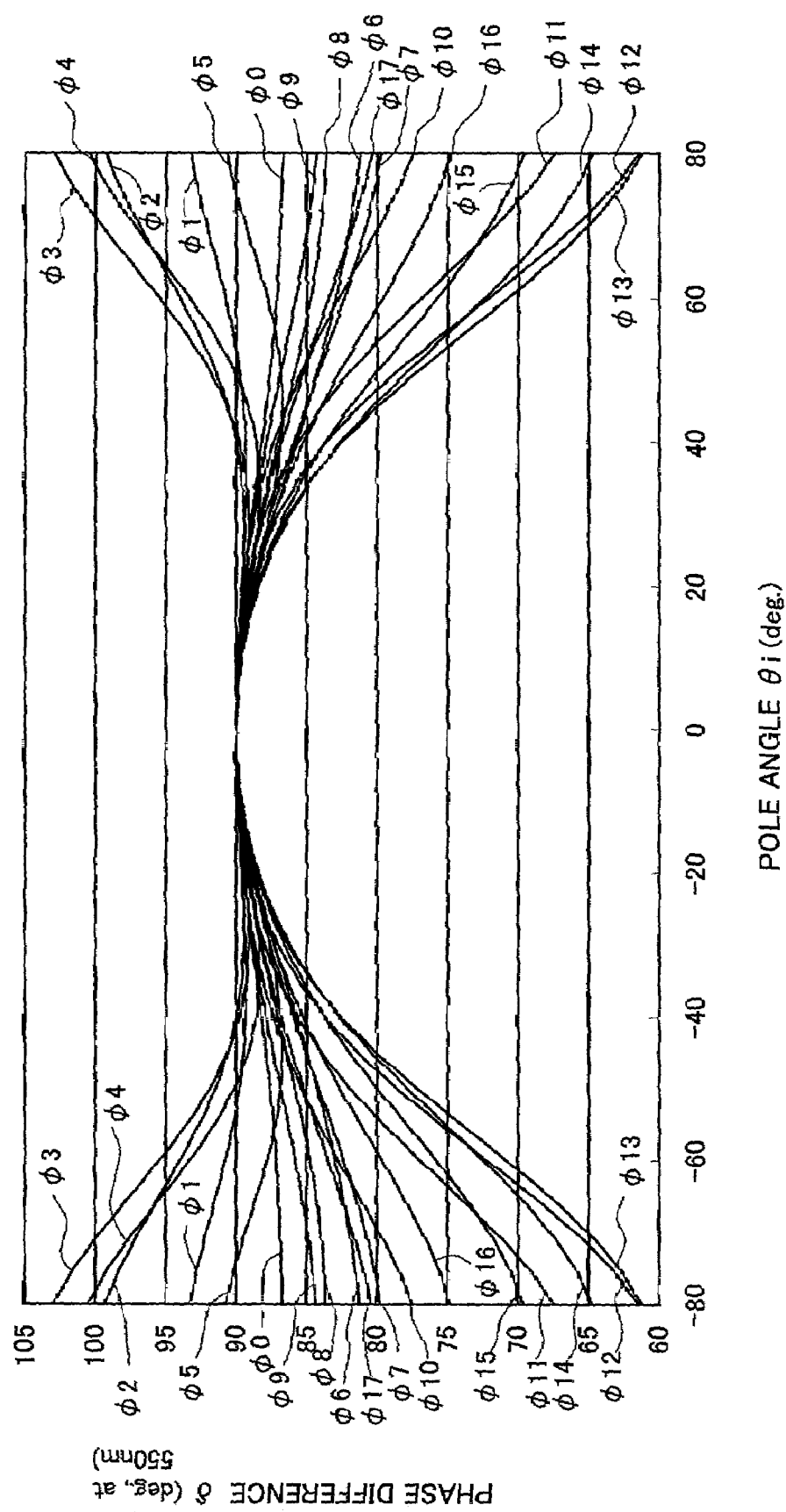
FIG. 4 is a view showing change of phase difference δ of light L11 when the light 10 going toward origin 0 from arbitrary point Si enters a polarizing plate 6, and further goes towards a diffusion reflective plate 2 as light L11 passing through a phase difference plate 6 and a liquid crystal layer 4.

The phase difference δ of light L11 when light L10 (wavelength λ=550 nm) going to the origin 0 from the arbitrary point Si enters the polarizing plate 8, further going to the diffusion reflective plate 2 as light L11 passing through the phase difference plate 6 and the liquid crystal layer 4 is shown in FIG. 4. In FIG. 4, horizontal axis represents pole angle θi (degree) of course of light L10, and vertical axis represents phase difference δ (degree; shown with absolute value) of light L11. In the graph, eighteen of the same azimuth angle curves φ0 to φ17 calculated by every 10 degrees from azimuth angle φ0=0° to φ17=170° for azimuth angle φi are plotted. Thickness (z direction; cell gap) of the liquid crystal layer 4 at this time is 3 μm.

It is known from FIG. 4 that phase difference δ becomes almost 90° without depending on azimuth angle φi near the pole angle θi=0° and obtains circulary polarized light. It is known that phase difference δ shifts sharply from 90° when absolute value of pole angle θi becomes large, particularly phase difference δ runs off sharply from 90° at direction of azimuth angle φ11=110° to φ15=150°.

Figure 5:
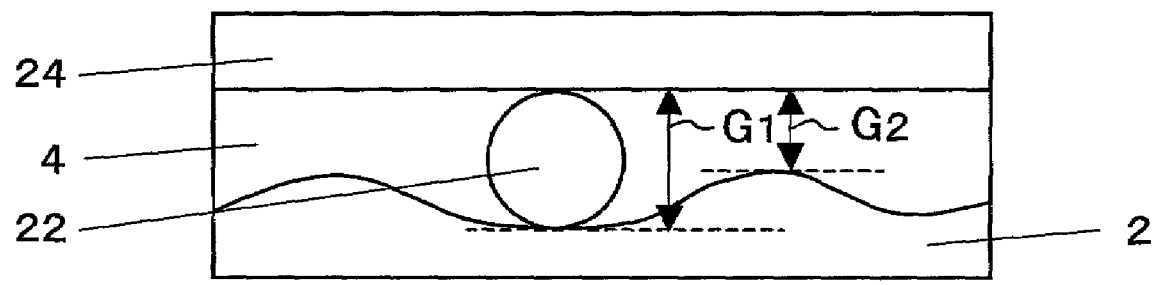
FIG. 5 is a view showing a position relation of an uneven reflective surface of the diffusion reflective plate 2 and spherical spacer.
Figure 6:
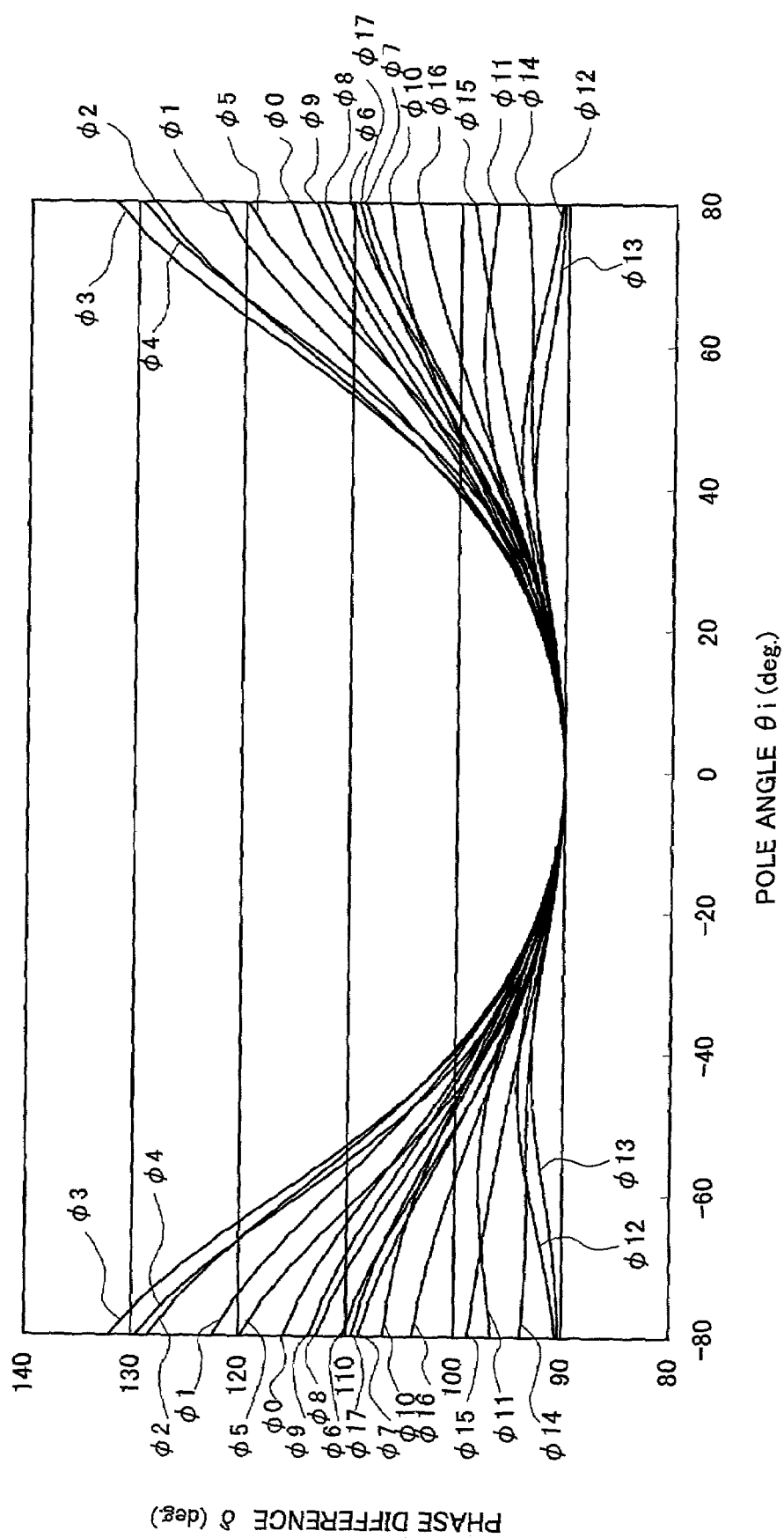
FIG. 6 is a view showing result of examination of cell gap dependency of phase difference δ at cell gap of 2 μm.
Figure 7:
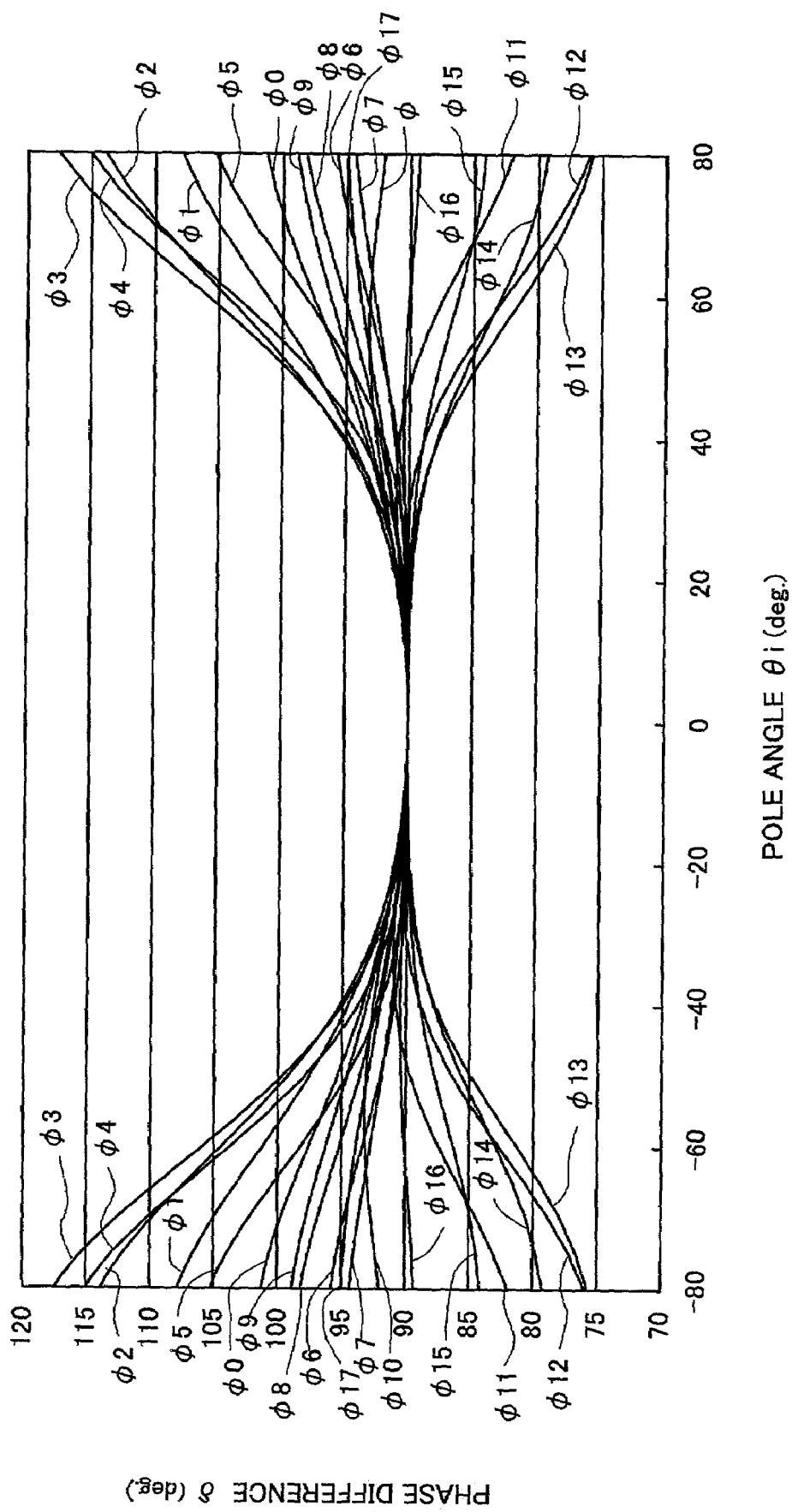
FIG. 7 is a view showing result of examination of cell gap dependency of phase difference δ at cell gap of 2.5 μm.
Figure 8:
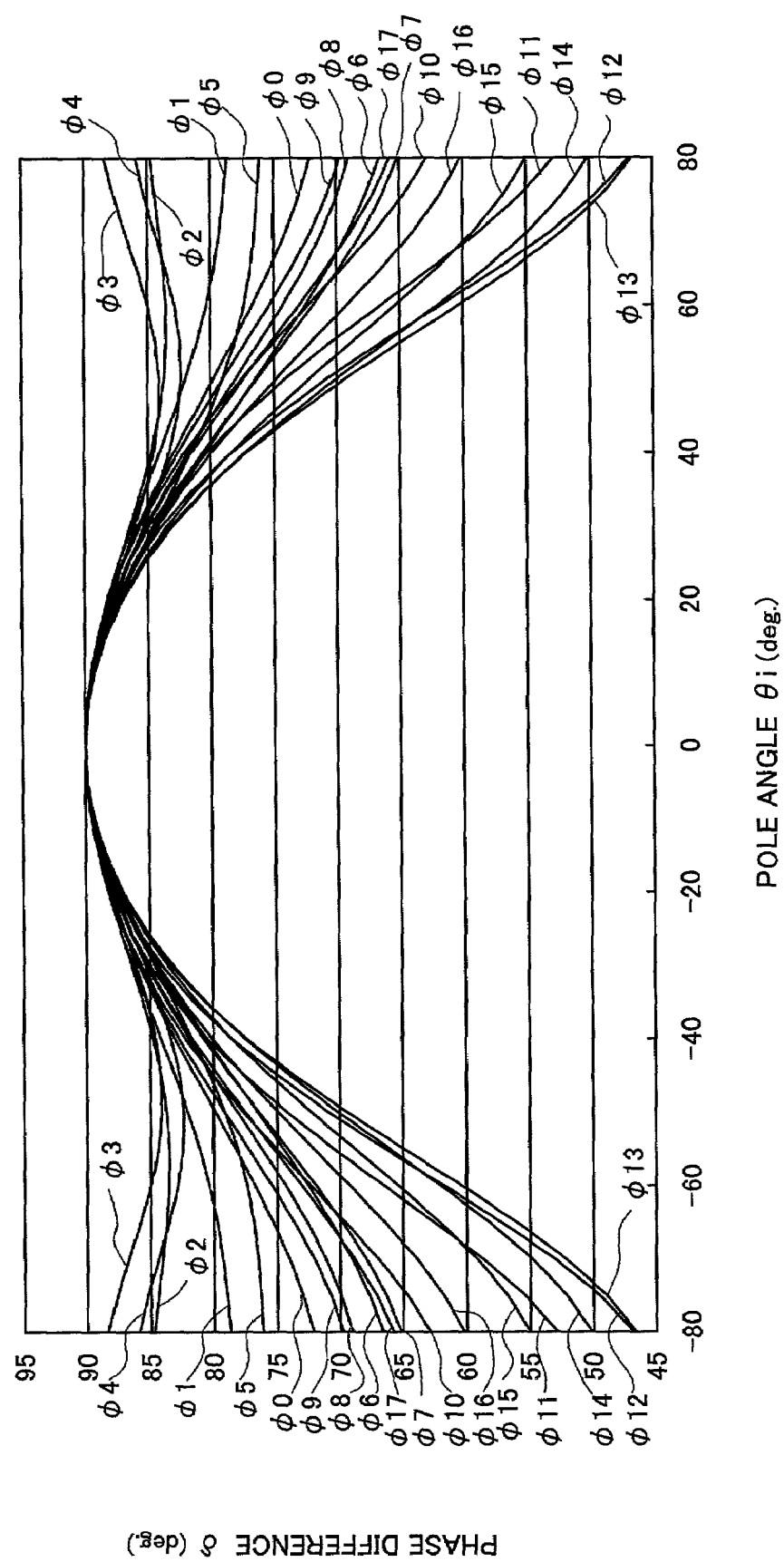
FIG. 8 is a view showing result of examination of cell gap dependency of phase difference δ at cell gap of 3.5 μm.
Figure 9:
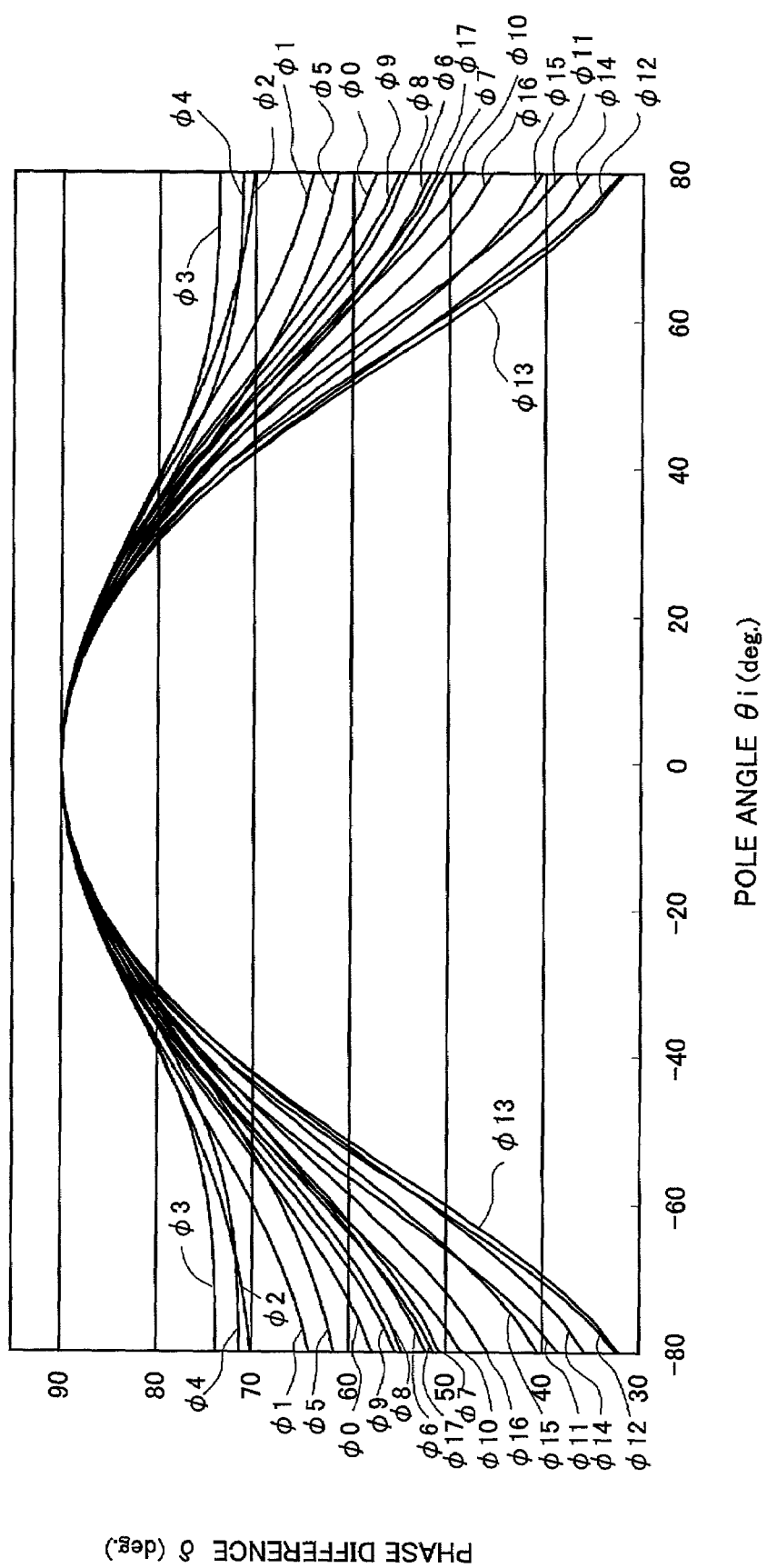
FIG. 9 is a view showing result of examination of cell gap dependency of phase difference δ at cell gap of 4 μm.

The result observing the reflective liquid crystal display device 1 using the diffusion reflective plate 2 by microscope is shown in FIG. 5. When the diffusion reflective plate 2 having an unevenness is used, cell gap changes as shown in widths G1 and G2 of FIG. 5 because amplitude of unevenness of about 1 μm exists. It is known that there is a spherical shape spacer 22 for cell gap control at the hollow of unevenness of the reflective surface of the diffusion reflective plate 2 as shown in FIG. 5. Numerical symbol 24 in FIG. 5 shows a facing substrate side.

Therefore, when liquid crystal panel of 3 μm, 3.5 μm, or 4 μm cell gap are produced, each cell gap changes between 2 to 3 μm, 2.5 to 3.5 μm, or 3 to 4 μm. Based on them, cell gap dependency of phase difference δ at cell gap of 2 to 4 μm is examined. The result is shown in FIG. 6 to FIG. 9.

In FIG. 6 to FIG. 9, horizontal axis represents pole angle θi (degree) of course of light L10, and vertical axis represents phase difference δ (degree) of light L11. In the graph, eighteen of the same azimuth angle curves φ0 to φ17 measured by every 10 degrees from azimuth angle φ0=0° to φ17=170° for azimuth angle φi are plotted. As clear from FIG. 6 to FIG. 9, when cell gap of the liquid crystal layer 4 changes, retardation of oblique incidence changes and viewing angle characteristic changes sharply.

Relations of the change of cell gap and phase difference δ obtained based on FIG. 6 to FIG. 9 are shown together in FIG. 10. Since it is known by the result of observation that light leakage of a dark condition becomes large when the phase difference δ shifts 25° or more from 9°, FIG. 10 shows a range of azimuth angle φi when the cell gap is 2 to 4 μm and the phase difference δ shifts 25° or from 90°. As shown in FIG. 10, phase difference δ shifts 25° or more from 90° at azimuth angle φ=10° to 50° at 2 μm cell gap. Further, phase difference δ shifts 25° or more from 90° at azimuth angle φ=30° at 2.5 μm cell gap; at azimuth angle φ=120° to 14° at 3 μm cell gap; at azimuth angle φ–100° to 60° at 3.5 μm cell gap; and at azimuth angle φ–0° to 10° and φ=50 to 180° at 4 μm cell gap.

Therefore, when a designed value of the cell gap is 3 μm for example, it is known that phase difference δ shifts sharply from 9° so as to become light leakage when light L10 entering from azimuth angle φ=10° to 50° and azimuth angle φ=120° to 140° reaches the diffusion reflective plate 2 as light L11 applying a condition that a phase difference δ at cell gap of 2 to 3 μm at FIG. 10 shifts 250° or more from 90°. Similarly, when a designed value of the cell gap is 3.5 μm. since the cell gap is changeable within 2.5 to 3.5 μm, it is known that the phase difference δ shifts sharply from 90° so as to become light leakage when light L10 entering from the azimuth angle φ–30° and azimuth angle φ=100° to 160° reaches the diffusion reflective plate 2 as light L11. Further, when the designed valve of the cell gap is 4 μm, since the cell gap is changeable within 3 to 4 μm, it is known that phase difference δ shifts sharply from 90° so as to become light leakage when light L10 entering from azimuth angle φ=0° to 10° and azimuth angle φ=50° to 18° reaches the diffusion reflective plate 2 as light L11.

In order that light causing such light leakage does not reflect to an observing direction of the reflective liquid crystal display device, unevenness where light of an incident azimuth angle φ causing a light leakage dues not reflect to a normal direction of panel surface may be formed on the reflective surface of the diffusion reflective plate 2. That is, tilt surface may not be extended to an azimuth with the most contribution to retied incident light from azimuth angle φi that causes light leakage to a normal direction of the panel surface (azimuth angle(φi+90°)). Therefore, when a cell gap of designed value is 3 μm, shape of the reflective surface is formed so as to make a tilt corresponding to an azimuth angle φ=10° to 50° and an azimuth angle φ120° to 140° small as possible. As reflective surface shape, the diffusion reflective plate 2 having a reflective surface constructed with a random wrinkled uneven shape as shown in FIG. 11 is formed at every pixel on a TFT (Thin Film Transistor) substrate. The diffusion reflective plate 2 serves as a picture electrode formed at every pixel, and is electrically connected to a source electrode of the TFT not shown. The diffusion reflective plate 2 is produced by the following method:

(1) A resist layer of 3 μm thickness is formed applying positive type novolak photoresist on the TFT substrate using spin-coater;

(2) Pre-baking of two minutes at temperature 90° C. is performed to the resist layer on the TFT substrate using a hot plate;

(3) Post-baking of 80 minutes at temperature 135° C. is performed to the resist layer on the TFT substrate using a clean oven;

(4) Irradiation is performed to the resist layer on the TFT substrate using UV (Ultra Violet) with irradiating energy 2600 mJ/cm$^2$;

(5) Final baking of 60 minutes at the temperature 215° C. is performed to the resist layer on the TFT substrate using the clean oven, thus a wrinkled shape pattern is formed on the surface of the resist layer; and (6) Al (Aluminum) of 200 nm thickness is formed on the resist layer by spattering, thus the Al layer functions as a diffusion reflective plate (plate) and the reflective surface shape becomes a wrinkled uneven shape (wrinkled uneven structure (matter)) reflecting the wrinkled pattern of the lower resist layer.

As shown in FIG. 11, gate bus lines and drain bus lines extend to directions of azimuth angle φ=0° and φ=90° at the diffusion reflective plate 2 on the TFT substrate surface. Because of that, a wrinkled uneven shape reflecting these bus line shapes is formed. The surface shape is measured by an AFM (Atomic Force Microscope), and assuming that the surface of the diffusion reflective plate 2 is constructed with a small mirror surface 26 as shown hi FIG. 12, an existence probability distribution of a normal vector. In of the small mirror surface 26 is obtained about azimuth angle φn of the normal vector. Three dimensional coordinates system of x-y-z in FIG. 12 is the same as the coordinates system shown in FIG. 3.

Figure 13:
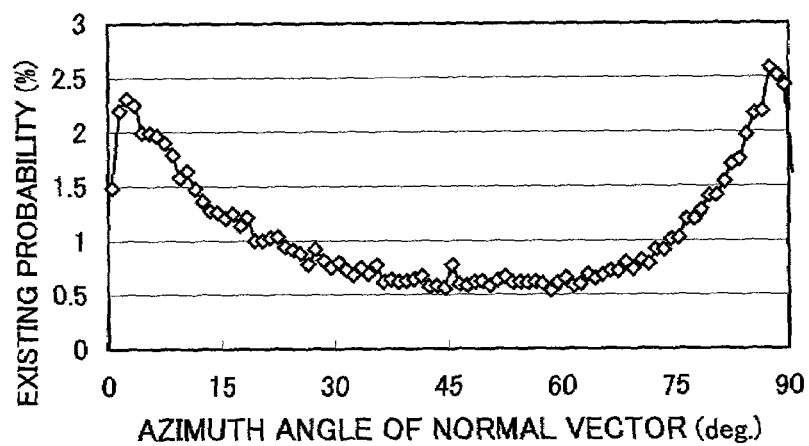

FIG. 13, the horizontal axis represents the direction of the normal vector In with an azimuth angle φn, and the vertical axis represents the existence probability of normal vector In. As shown in FIG. 13, many tilts of the azimuth angle φn =0° and φ–90° exist in normal vector In. Although a local maximum of probability distribution exists at an arbitrary azimuth and azimuth intersecting at a right angle in the embodiment, the local maximum of probability distribution may exist only at the arbitrary azimuth. Using to diffusion reflective plate 2, the reflective liquid crystal display device of a VA mode is produced. A vertical alignment flint is used, and a micro-pearl of 3 μm diameter by Sekisui Fine Chemical Company is used for the spherical spacer. Measurement of reflectance of a dark condition (used with integrating sphere) is tested by bonding the polarizing plate 8 and the phase difference plate 6 described FIG. 2A to the reflecting cell. FIG. 2B shows a condition of viewing the x-y surface along the z direction about the x-y-z coordinate system shown in FIG. 3. As shown in FIG. 2B, the light absorbing axis of the polarizing film 20 of the polarizing plate 8 (vertical direction to polarizing axis) and lagging axis of the TAC film 18 are parallel, and is fixed to azimuth angle φ=15°. Here, the lagging axis means a larger axis among refractive indexes of directions in film surface nx and ny when placing nx and ny far refractive indexes of directions in film surface and nz for refractive indexes of thickness directions.

Returning to FIG. 2B, the lagging axis of the unit phase difference plate 12 of the phase difference plate 6 is at an azimuth angler φ=25°, and the lagging axis of the second phase difference plate and the third phase difference plate 16 are parallel and at an azimuth angle φ–80°. With the structure of optic axis of FIG. 2B described above, using the diffusion reflective plate 2 providing the wrinkled uneven shape shown in FIG. 11 for the diffusion reflective pine 2 in the laminating structure of optical film shown in FIG. 2A reflectance is measured rotating the laminating structure to the direction of the azimuth angle φ centering the coordinates origin. In the measurement, reflectance of the diffusion reflective plate 2 in a dark condition when voltage is not applied to the liquid crystal layers 4 and reflectance in a bright condition when applying a diving voltage of 5 V between the liquid crystal layers 4 are obtained. From these measurement data, contrast is calculated.

Figure 14:
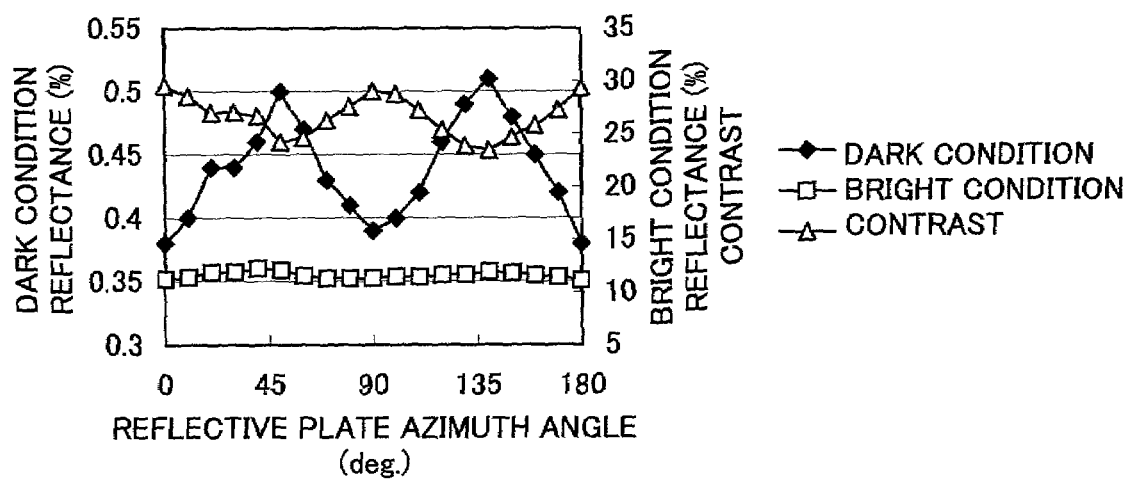
FIG. 14 is a view showing reflectance of dark condition (%), reflectance of bright condition (%), and contrast to azimuth (deg.) of the diffusion reflective plate 2.

The result is shown in FIG. 14. Horizontal axis of FIG. 14 represents azimuth angle (degree) of the diffusion reflective plate 2, vertical axis of left side represents reflectance of dark condition (%), and vertical axis of right side represents reflectance of bright condition (%) and contrast. As shown in FIG. 14, it is known that reflectance of dark condition falls remarkably at azimuth angle φ–0° (=180°) and φ–90°, and high contrast is obtained. As known from FIG. 11, in the diffusion reflective plate 2, many tilts exist at directions of azimuth angle φ=0° and φ=90°, and existence of tilts at direction of azimuth angle φ–45° and φ=135° is very few. Because of that, although light entering from azimuth angle φ=0° and φ=90° is used more, on the other hand, utilization factor of light entering from azimuth angle φ45° and φ135° becomes small. Since light in the direction of azimuth angle φ=10° to 50° and azimuth angle φ=120° to 140° does not become circularly polarized light as shown in FIG. 10, the liquid crystal layer 4 combined with the polarizing plate 8 and the phase difference plate 6 is suited to decrease utilization factor of these lights. Therefore, high contrast is obtained by falling reflectance of the dark condition.

EMBODIMENT 1-2

Figures 15, 16, 17:
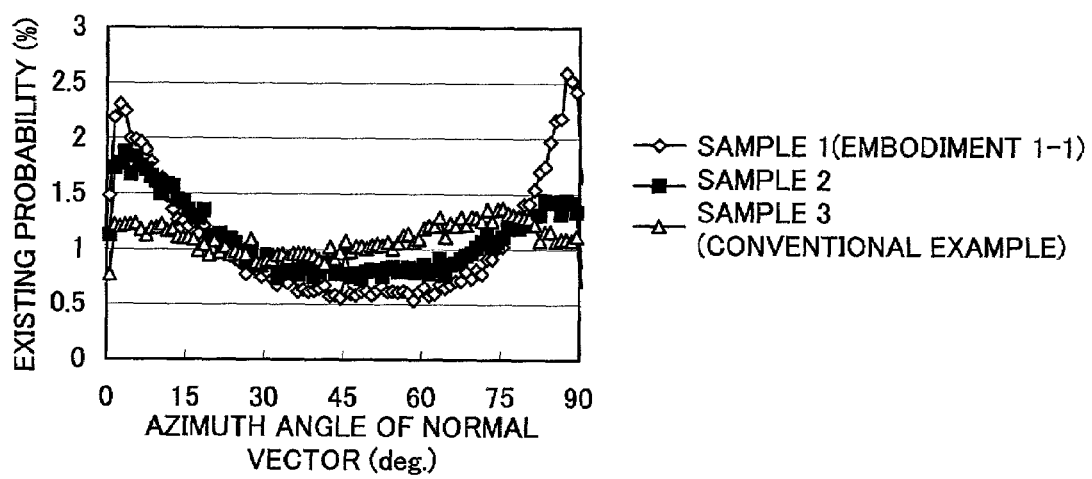

Characteristic in the case of changing azimuth dependency of surface shape of the diffusion reflective plate 2 is examined. Azimuth dependency of normal vector In of the small mirror surface 26 at surface shape of the diffusion reflective plate 2 used is shown in FIG. 15. In FIG. 15, horizontal axis represents direction of normal vector In with azimuth angle φn, and vertical axis represents existence probability of normal vector In. Sample 1 in the figure is the diffusion reflective plate 2 of Embodiment 1-1, Sample 3 is the conventional diffusion reflective plate including circle pattern not depending on azimuth. Sample 2 is the diffusion reflective plate 2 having intermediate azimuth dependency of them.

The diffusion reflective plate 2 of Sample 2 is produced by the following method:

(1) A resist layer of 3 μm thickness is formed applying positive type novolak photoresist on the TFT substrate using spin-coater;

(2) The TFT substrate is dried under reduced pressure;

(3) Pre-baking of two minutes at a temperature 90° C. is performed to the resist layer on the TFT substrate using a hot plate;

(4) Post-baking of 80 minutes at a temperature of 135° C. is performed to the resist layer on the TFT substrate using a clean oven;

(5) Irradiation is performed to the resist layer on the TFT substrate using UV light with irradiating energy 2600 mJ/cm$^2$;

(6) Final baking of 60 minutes at a temperature of 215° C. is performed to the resist layer on the TFT substrate using the clean oven, thus wrinkled shape pattern is formed on surface of resist layer; and (7) Al of 200 nm thickness is funned on the resist layer by spattering, thus Al layer functions as a diffusion reflective plate (plate) and the reflective surface shape becomes a wrinkled uneven shape reflecting a wrinkled patter of the lower resist layer.

The diffusion reflective plate 2 of Sample 3 is produced by the following method:

(1) A resist layer of 3 μm thickness is formed applying positive type novolak photoresist on the TFT substrate using a spin-coater;

(2) Pre-baking of 20 minutes at temperature 90° C. is performed to the resist layer on the TFT substrate using a clean oven;

(3) The resist layer is exposed using a mask pattern where circular patterns of 10 μm diameter are arranged at random;

(4) Developing one minute the resist layer on the TFT substrate using developing solution MF 319 (by Shipley Company);

(5) Post-baking of 40 minutes at a temperature of 125° C. is performed to the resist layer on the TFT substrate using a clean oven;

(6) Irradiation is performed to the resist layer on the TFT substrate using UV light with irradiating energy 1300 mJ/cm$^2$;

(7) Final baking of 60 minutes at a temperature of 215° C. is performed to the resist layer on the TFT substrate using the clean oven; and (8) Al of 200 nm thickness is formed on the resist layer by spattering.

Standard deviation of an existence probability at an azimuth dependency of diffusion reflective plates of the sample 1 to the Sample 3 obtained by the existence probability distribution of azimuth angle dependency shown in FIG. 15 is shown in FIG. 16. In FIG. 16, the left item represents sample number, middle item represents standard deviation, and right item represents note (description). The diffusion reflective plate used up to now such as Sample 3 hardly has azimuth dependency so that very small standard deviation (=0.10) is shown. On the other hand, Sample 2 shows comparably large standard deviation (=0.32), and uneven shape of Embodiment 1-1 of the sample 1 shows large standard deviation (=0.56).

The reflective liquid crystal display devices are formed using these diffusion reflective plates, and liquid crystal panels of VA mode combined with the polarizing plate 8 and phase difference plate 6 shown in FIG. 2A and FIG. 2B are produced. Reflectance of these panels is measured under the integrating sphere. The maximum value and the minimum value of contrast at changing azimuth of the diffusion reflective plate are shown in FIG. 17. The maximum value and the minimum value of contrast hardly change in Sample 3 (the prior art) from FIG. 17. In Sample 2 and Sample 1, it is known that the maximum contrast becomes higher than the conventional mode (standard deviation=0.10) because standard deviation of existence probability (=0.32 to 0.56; desirably 0.5 or more) at azimuth dependency shown in FIG. 16 having azimuth dependency at the shape of diffusion reflective plate becomes large.

EMBODIMENT 1-3

By the result of FIG. 10, at design of the cells of 3.5 μm and 4 μm thickness, azimuth not required for the diffusion reflective plate 2 is azimuth angle φ=30° and φ=100° to 160° (center azimuth φ=130°) and φ=50° to 190° (center azimuth φ=120°). Therefore, many tilt surfaces extending tilts to azimuth of φ=30° and φ=130°, and φ=120° may exit. Relation of φ=30° and φ130°, or φ=145° can be realized by wrinkled pattern almost intersecting at a right angle, and =φ120° can be realized by a wrinkled pattern of stripe shape.

EMBODIMENT 1-4

Figure 18:
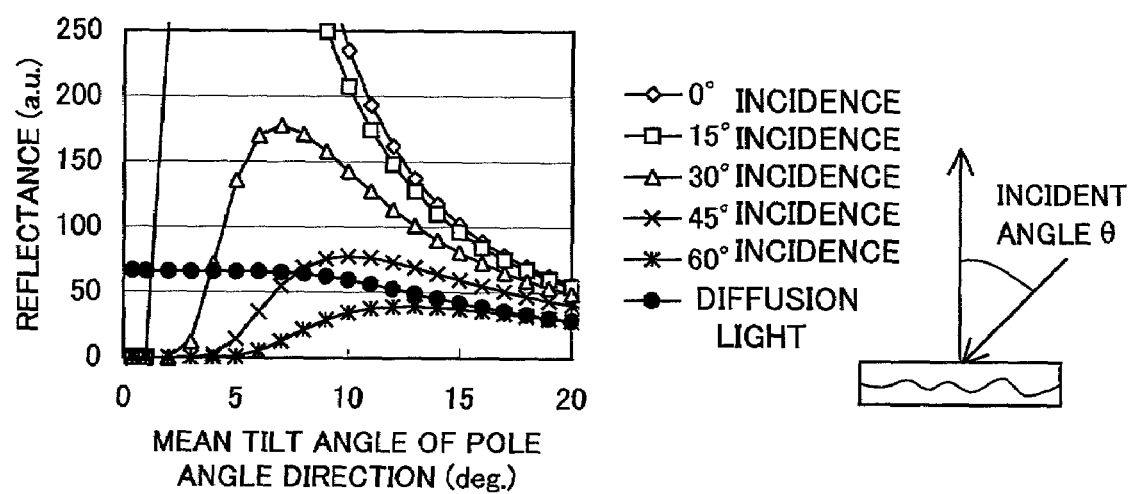
FIG. 18 is a view showing relation between mean tilt angle of polar angle θ direction and reflectance.

Azimuth dependency of pole angle θ of tilt at a surface of the diffusion reflective plate 2 is examined. FIG. 18 shows the relation of mean tilt angle of pole angle θ and reflectance assuming that the tilt of the diffusion reflective plate 2 obeys a normal distribution. As shown in FIG, 18, when parallel bundle rays enter from the polarizing plate 8 with certain incident angle, it is known the larger the incident angle at the surface of the face sandwiching the diffusion reflective plate 2 becomes, the larger the mean tilt angle of pole angle θ direction obtaining the maximum reflectance becomes. It is known from FIG. 18 that the mean tilt angles of pole angle θ direction obtaining the maximum reflectance at incident angles of 30°, 45° and 60° become 7°, 10°, and 13° respectively. An actual environment using the reflective liquid crystal display device 1 has light entering from various directions. Therefore, a bright reflective liquid crystal display device can be obtained by designing the diffusion reflective plate 2 so that the mean tilt angle of pole angle θ direction becomes dose to 7° to 15°.

Then, a reflective liquid crystal display device of VA mode (liquid crystal material of Δn=0.1 having negative dielectric anisotropy is used, and cell gap is 3 μm) is produced using the diffusion reflective plate 2 different in mean tilt angle. The diffusion reflective plate 2 is produced by the following method:

(1) A resist layer is formed applying positive type novolak photoresist on the glass substrate of 0.7 mm thickness using spin-coater;

(2) Pre-baking of 20 minutes at temperature 90° C. is performed to the resist layer on the substrate using a clean oven;

(3) Irradiation is performed to the resist layer on the substrate using UV light with irradiating energy 2600 mJ/cm$^2$;

(4) Final baking of 60 minutes at temperature 215° C. is performed to the resist layer on the substrate using the clean oven, thus a wrinkled shape pattern is formed on the surface of resist layer; and (5) Al of 200 nm thickness is formed on the resist layer by spattering, thus Al layer functions as a diffusion reflective plate (plate) and optical reflective surface shape becomes a wrinkled uneven shape reflecting wrinkled pattern of lower resist layer.

Figure 19A:
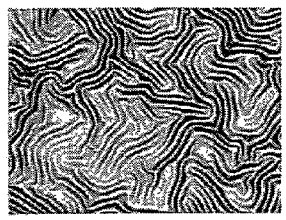
FIG. 19A to FIG. 19H are views showing microscope pictures (20 magnifications) of wrinkled pattern formed by varying film thickness of resist layer.
Figure 19B:
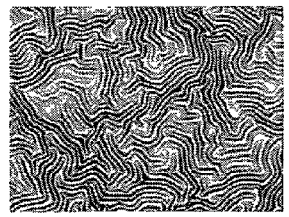
Figure 19C:
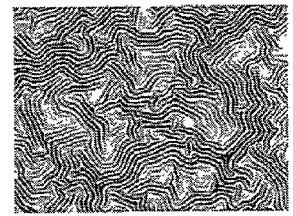
Figure 19D:
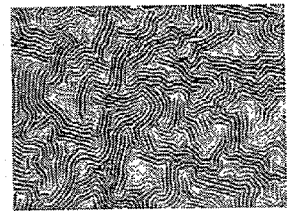
Figure 19E:
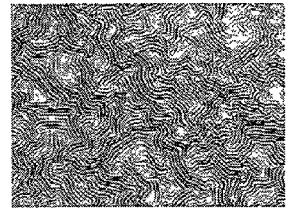
Figure 19F:
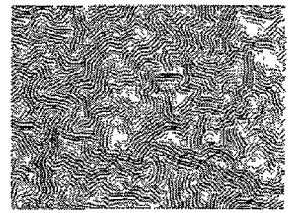
Figure 19G:
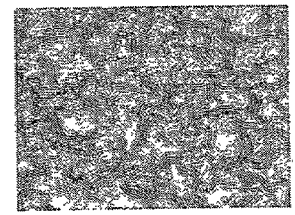
Figure 19H:
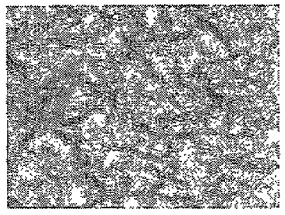
Figure 23:
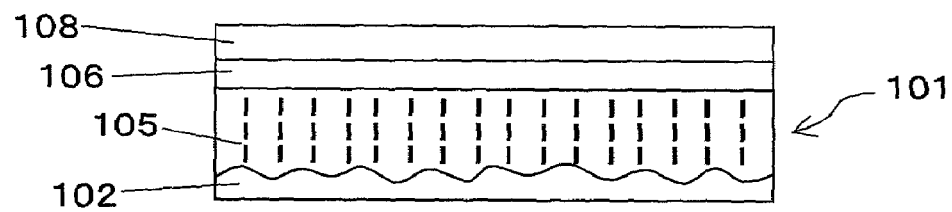
FIG. 23 shows another outline of the conventional reflective liquid crystal display device construction according to one sheet polarizing plate system, and is a view showing section vertically cut off to display surface.

In order to change mean tilt of pole angle θ, film thickness of the resist layer is adjusted. FIGS. 19A to FIG. 19H show picture of microscope (20 magnifications) of wrinkled shape pattern formed by varying film thickness of the resist layer. FIG. 19A shows a wrinkled pattern example at resist layer of 4 μm film thickness. Similarly, FIG. 19B shows a wrinkled pattern example at resist layer of 3.5 μm; FIG. 19C shows resist layer of 3 μm; FIG. 19D shows resist layer of 2.5 μm; FIG. 19E shows at resist layer of 2 μm; and FIG. 19F shows resist layer of 1.5 μm. FIG. 19G shows resist layer of 1 μm; and FIG. 19H shows resist layer of 0.7 μm.

As known from FIG. 19A to FIG. 19H, amplitude of wrinkled pattern can be changed sharply by changing film thickness of the resist layer. Surface of the diffusion reflective plate 2 produced by such the method is measured using AFM, and mean tilt angle is obtained.

The result of reflectance and contrast to each mean tilt of pole angle direction measured using integrated sphere is shown in FIG. 20. The construction shown in FIG. 2A and FIG. 2B is used for the polarizing plate 8 and the phase difference plate 6. It is known from FIG. 20 that peak of reflectance is obtained at mean tilt near 13° and contrast falls when mean tilt becomes large. The reason that tendency of reflectance differs from the simulation result of diffusion light shown in FIG. 18 is considered that tilt distribution of the used diffusion reflective plate 2 does not obey normal distribution. The reason that contrast falls remarkably at large mean tilt is that the larger the mean tilt the incident light from large pole angle θ direction reflect to normal direction of the panel. That is, since light not compensated enough by the phase difference plate 6 is used for display, contrast falls sharply. Therefore, it is not desirable to make mean tilt large, and it is known that mean tilt of about 7° to 15° is needed to use from the point of view of reflectance and contrast.

As described above, according to the mode for carrying out, a low cost, high reflectance reflective liquid crystal display device depressing fall of contrast caused by retardation can be realized. Although wrinkles shape pattern of uneven shape is examined in the mode for carrying out, uneven shape having anisotropy of azimuth direction of ellipsoid, rectangle, and triangle can obtain the similar effect.

[A Second Mode for Carrying Out]

Next, a reflective liquid crystal display device according to a second mode for carrying out the invention will be described using FIG. 24A to FIG. 53D. When composing elements according to the mode for carrying out are same as the composing elements according to the first mode for carrying out at operational function, the description is omitted applying the same symbol. Although there is a producing method disclosed in the above-mentioned Japanese Patent Laid-Open No. 232465/1993 in the prior art about a diffusion reflective plate, in the method of the invention, unevenness is formed on a reflective pixel electrode using photolithography technique. In the method, high reflectance can be obtained by forming an arbitrary uneven shape on the diffusion reflective plate. However, producing process becomes complicated because reflective surface shape of the diffusion reflective plate is controlled using the photolithography technique in the method. Further, since uneven shape fanned by exposure condition changes and light reflective characteristic changes sharply, there is a problem that margin of producing process is narrow.

Figure 24A:
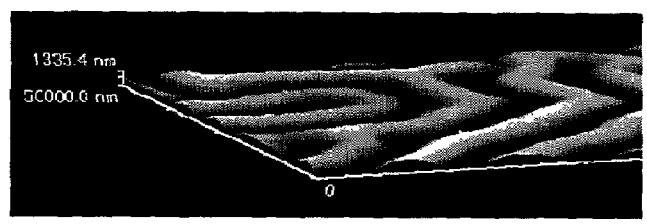
FIG. 24A to FIG. 24C are perspective views showing the diffusion reflective plate 2 providing wrinkled shape uneven pattern at a reflective surface.
Figure 24B:
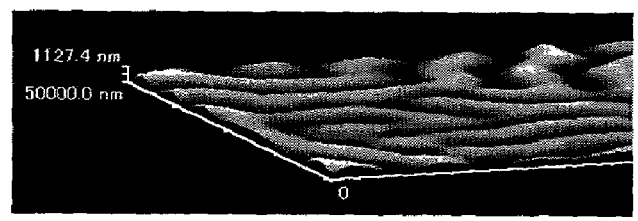
Figure 24C:
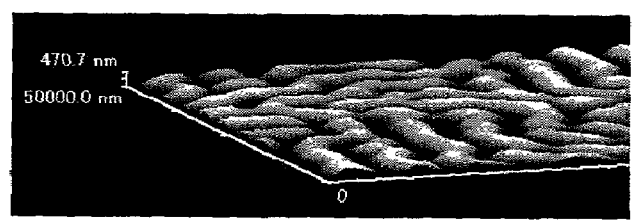

As a method improving such the problem, a reflective liquid crystal display device having a diffusion reflective plate providing a wrinkled uneven shape (micro-groove) on the optical reflective surface is proposed by the applicant of the invention. The wrinkled uneven shape is formed by thermal treatment after letting thermal deformation characteristic (Tg point and melting temperature) to distribute at thickness direction and in-plane direction of a resist (photosensitive resin) layer formed on a substrate. FIG. 24A to FIG. 24C are perspective views showing the diffusion reflective plates 2 providing wrinkled uneven shape on the optical reflective surface. FIG. 24A shows wrinkled uneven shape formed depositing Al at 200 nm thickness by spattering after forming wrinkled uneven shape on upper surface of resist film of 1.7 μm thickness. Undulations of unevenness is 1.3 μm, and mean tilt angle of unevenness is k=13°. FIG. 24B shows wrinkled uneven shape formed depositing Al at 200 nm thickness by spattering after forming wrinkled uneven shape on upper surface of resist film of 1.4 μm thickness. Undulations of unevenness is 1.1 μm, and mean tilt angle of unevenness is k=11°. FIG. 24C shows wrinkled uneven shape formed depositing Al at 200 nm thickness by spattering after forming wrinkled uneven shape on upper surface of resist film of 1 μm thickness. Undulations of unevenness is 0.5 μm, and mean tilt angle of unevenness is k=8°.

According to the diffusion reflective plates 2 shown in FIG., 24A to FIG. 24C, producing process is simplified and production yield is improved. Further, production cost is reduced and stable, high reflective characteristic is obtained. However, although the diffusion reflective plates 2 is very superior in reflective characteristic, it has a problem that reflective performance is not shown enough at using for the conventional reflective liquid crystal display device of TN mode.

Figures 25A, 25B:
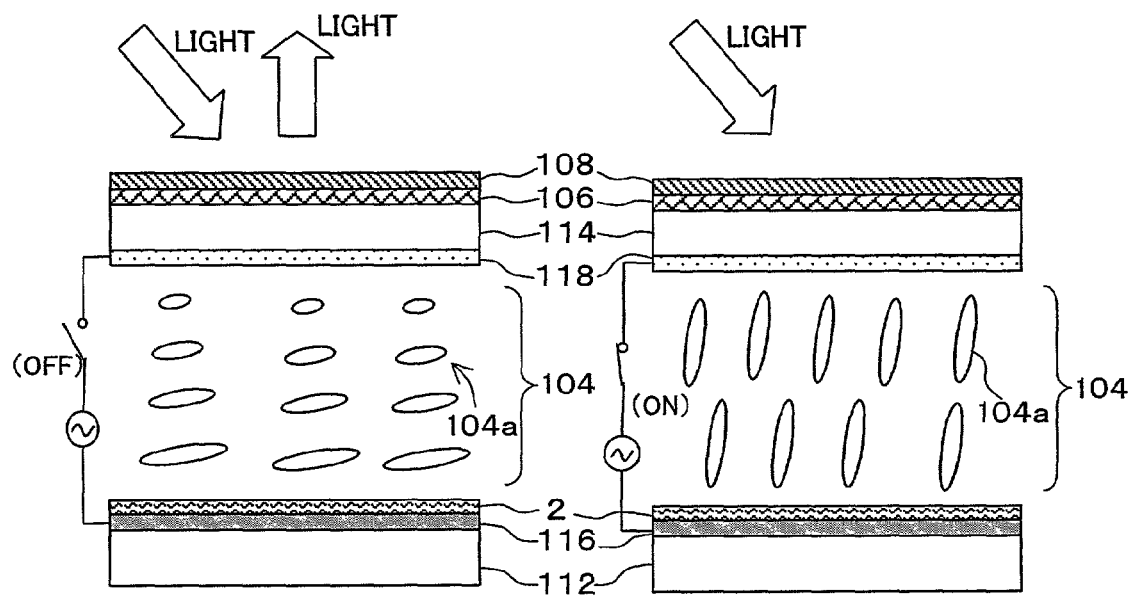
FIG. 25A and FIG. 25B are views showing operational principle of the conventional reflective liquid crystal display device of TN system.
Figures 26A, 26B:
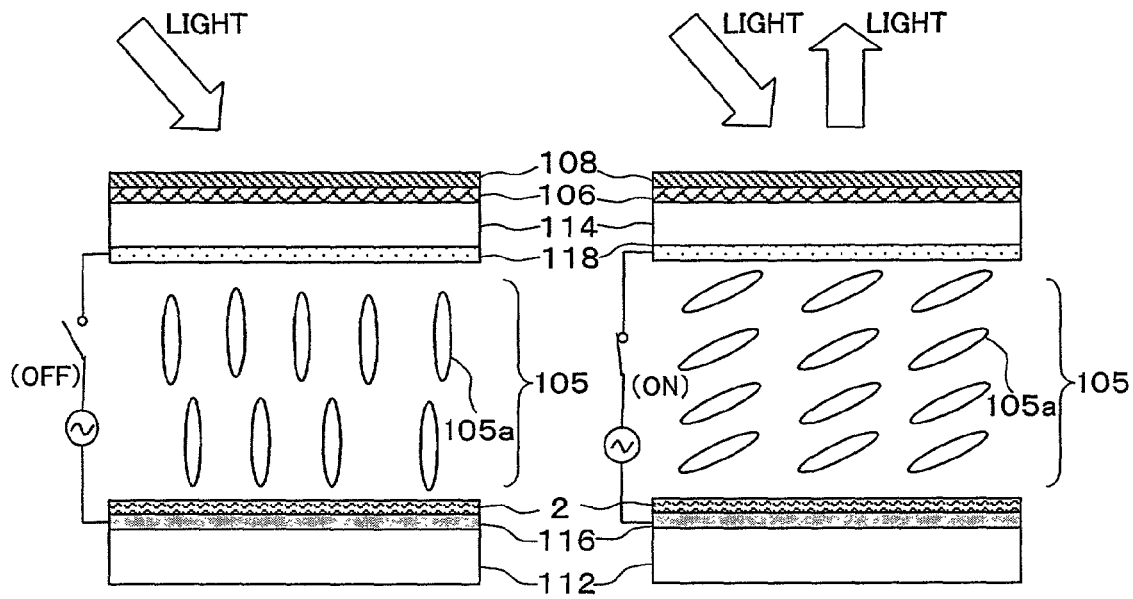
FIGS. 26A and 26B are views showing operational principle of a reflective liquid crystal display device of VA system according to a second mode for carrying out the invention.
Figure 27:
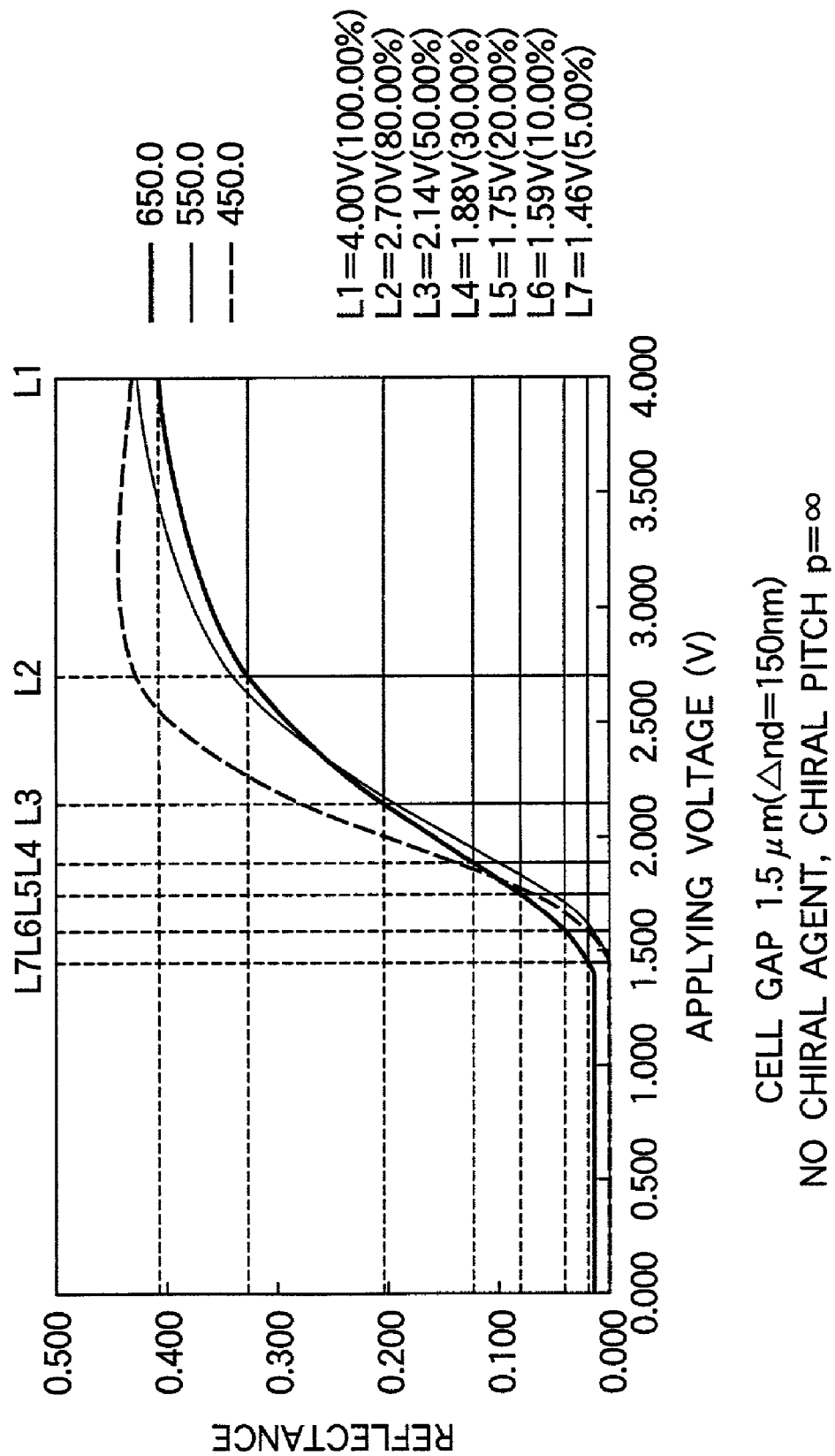
FIG. 27 is a view showing simulation result of optical characteristic of the reflective liquid crystal display device according to a second mode for carrying out the invention.
Figure 28:
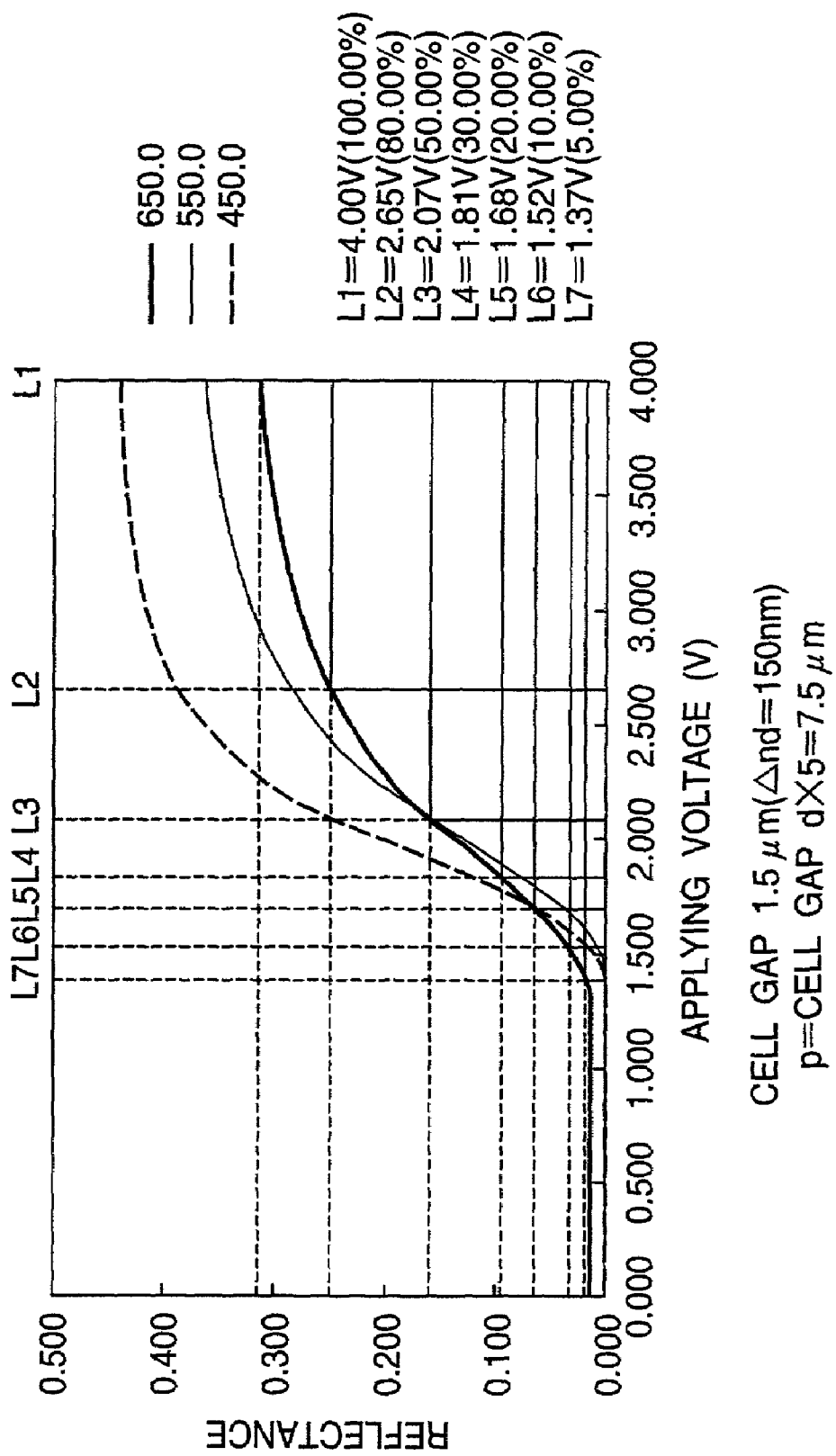
FIG. 28 is a view showing simulation result of optical characteristic of the reflective liquid crystal display device according to a second mode for carrying out the invention.
Figure 29:
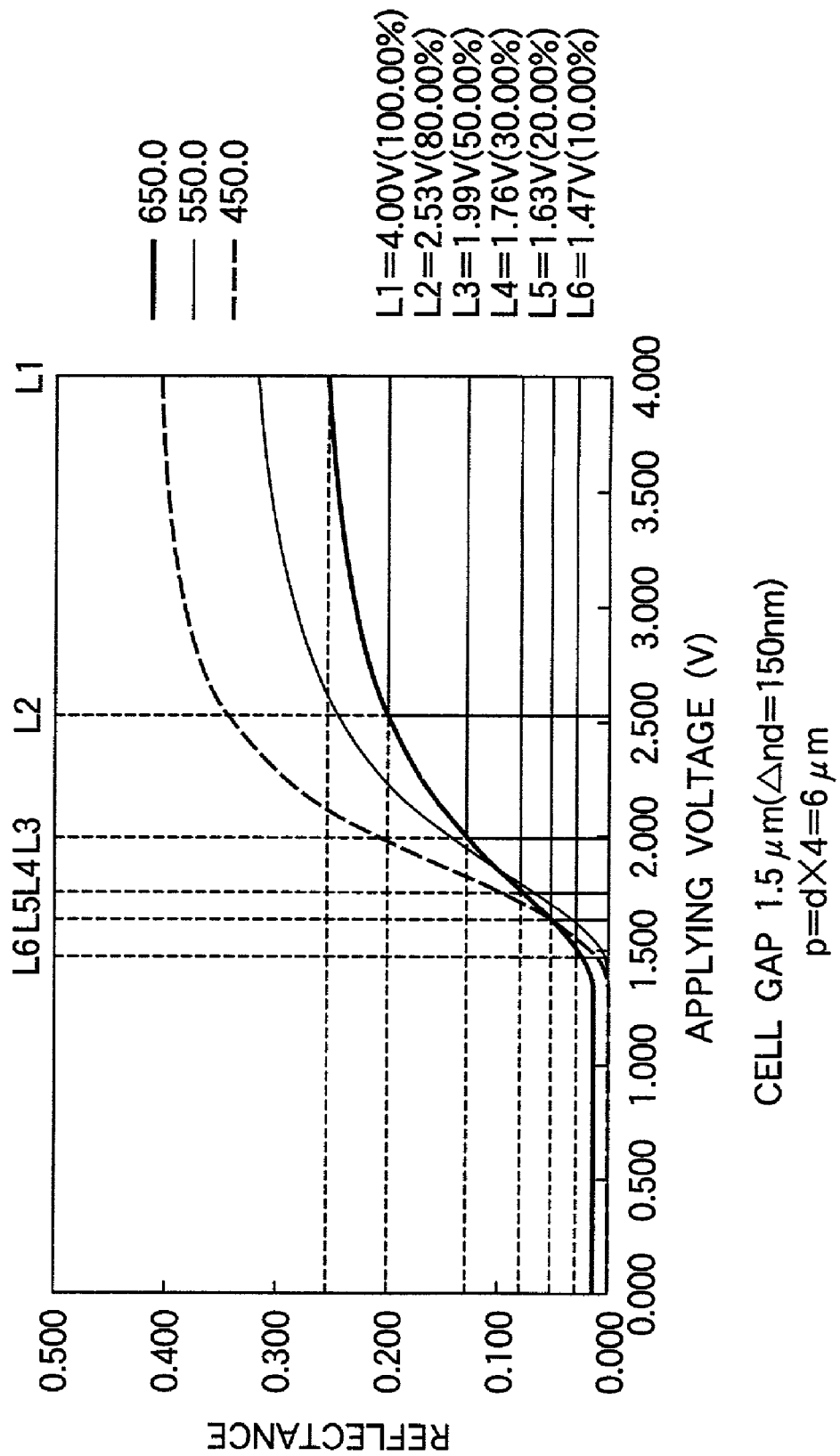
FIG. 29 is a view showing simulation result of optical characteristic of the reflective liquid crystal display device according to a second mode for carrying out the invention.
Figure 30:
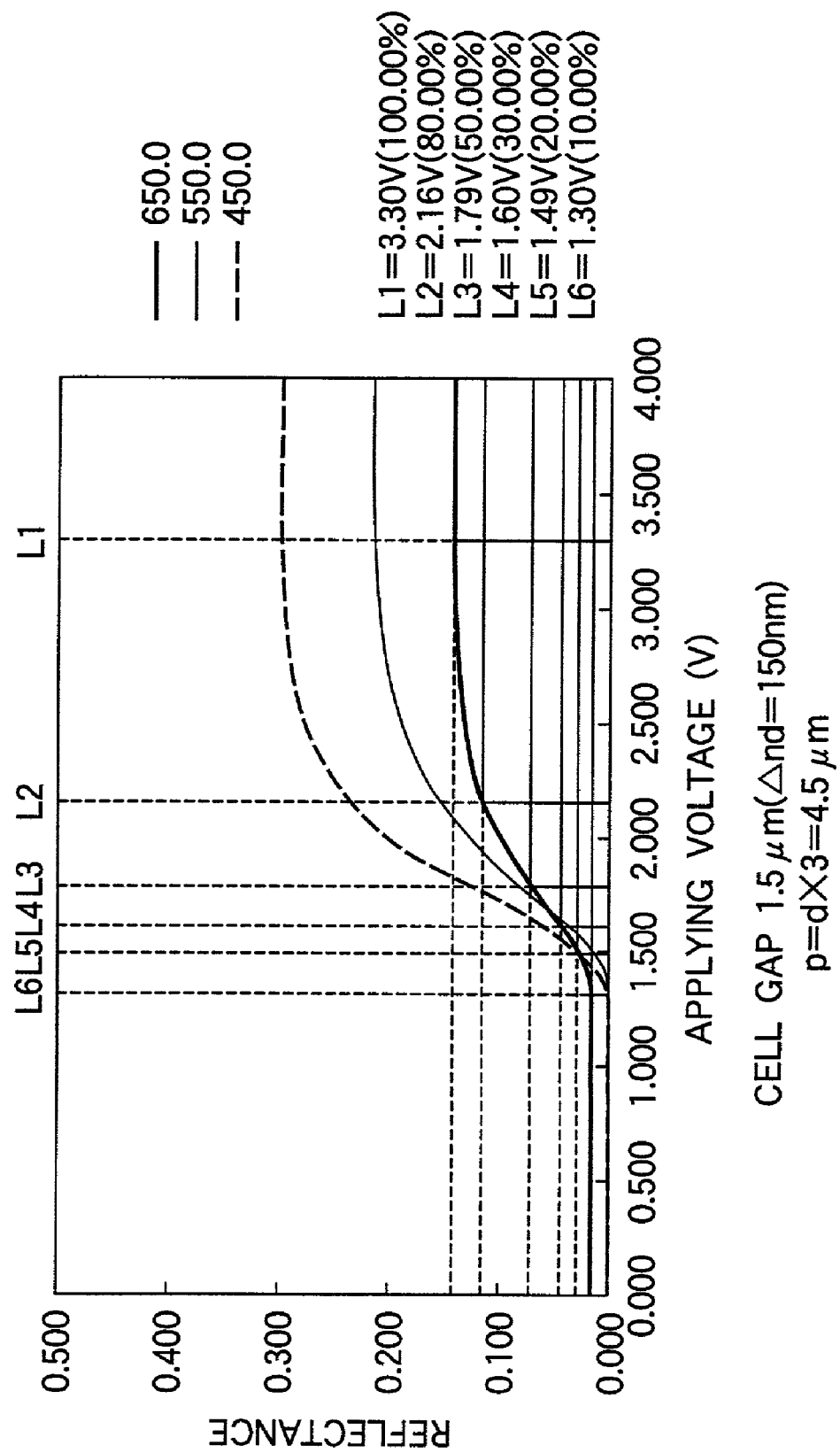
FIG. 30 is a view showing simulation result of optical characteristic of the reflective liquid crystal display device according to a second mode for carrying out the invention.
Figure 31:
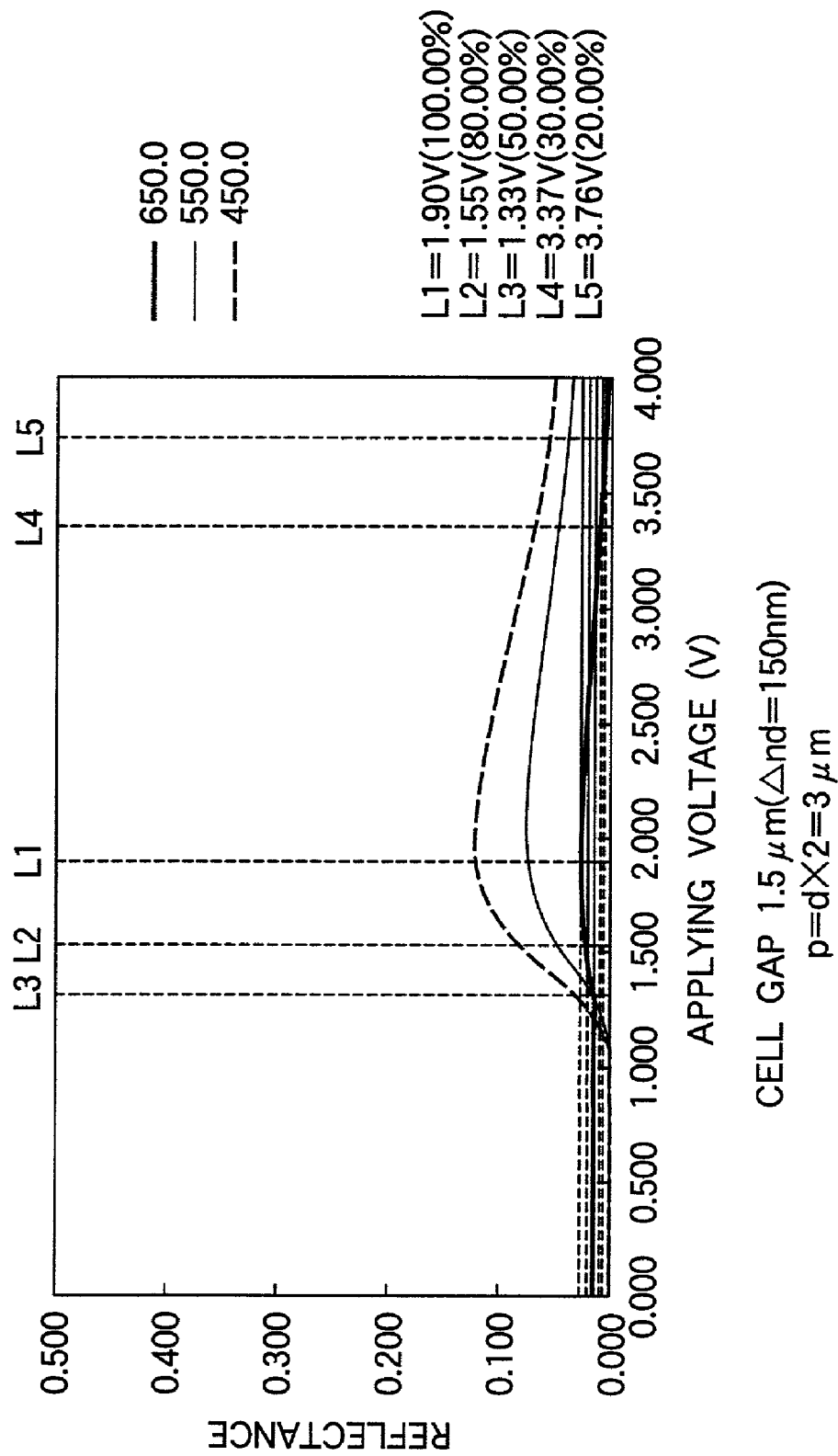
FIG. 31 is a view showing simulation result of optical characteristic of the reflective liquid crystal display device according to a second mode for carrying out the invention.
Figure 32:
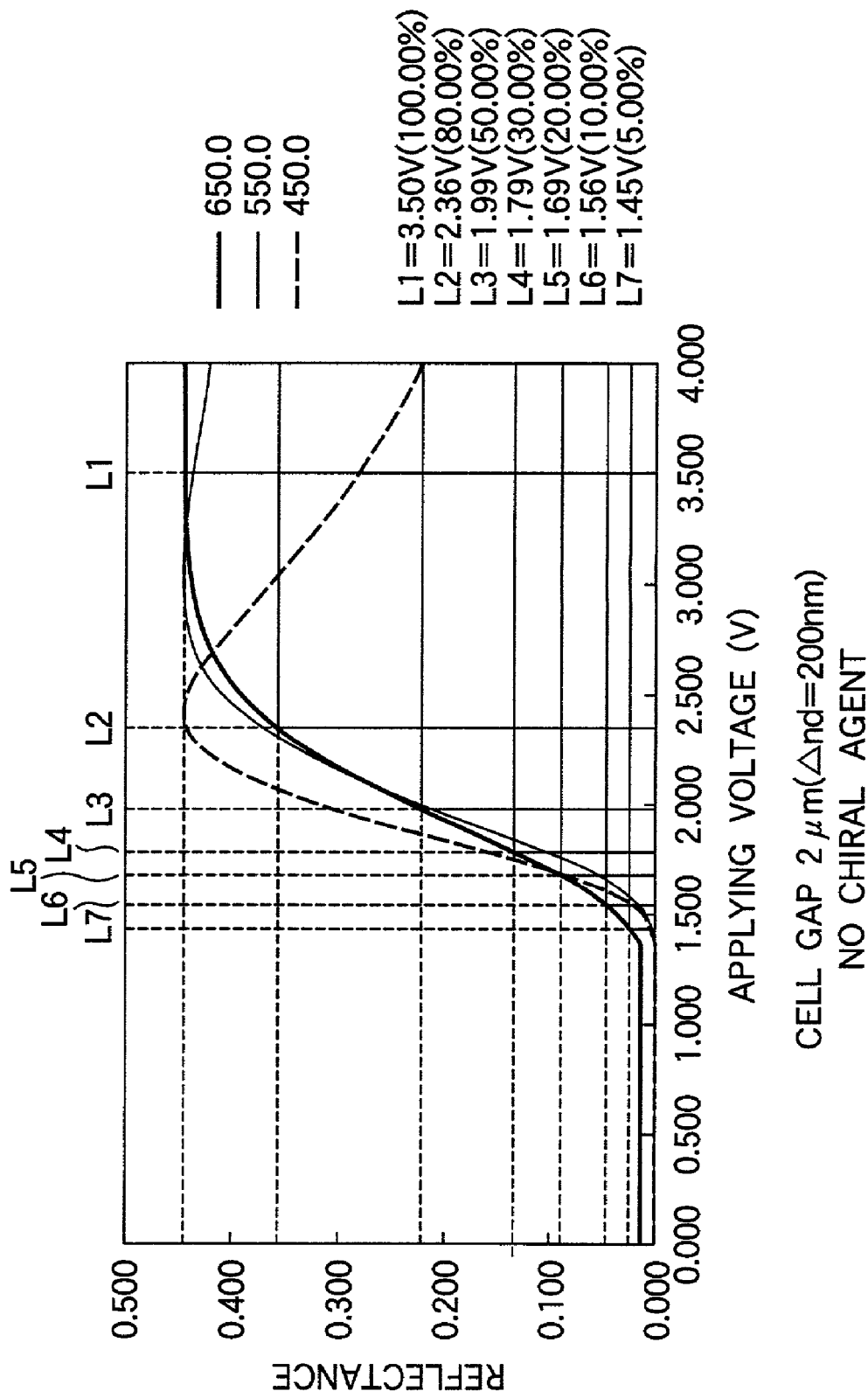
FIG. 32 is a view showing simulation result of optical characteristic of the reflective liquid crystal display device according to a second mode for carrying out the invention.
Figure 33:
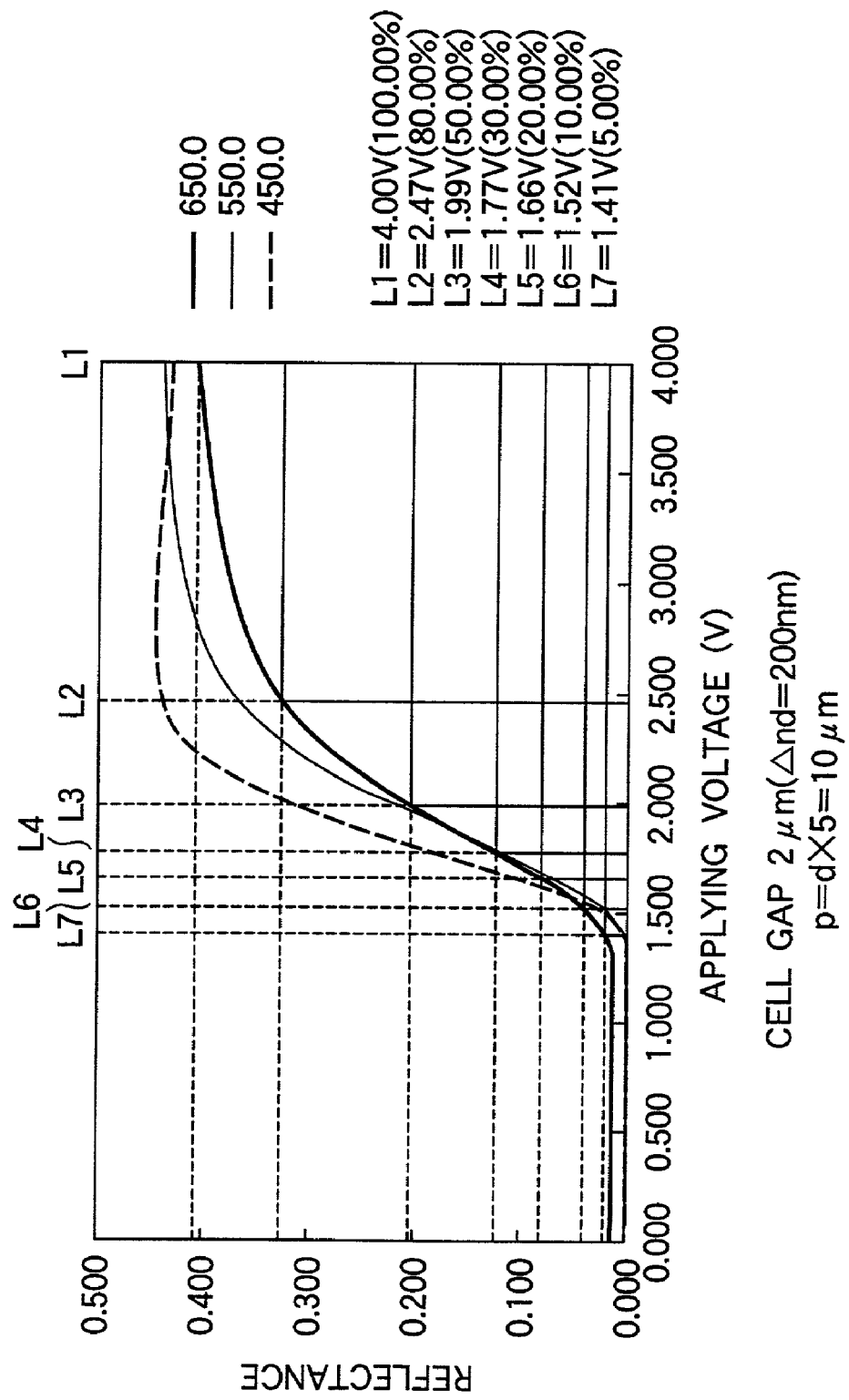
FIG. 33 is a view showing simulation result of optical characteristic of the reflective liquid crystal display device according to a second mode for carrying out the invention.
Figure 34:
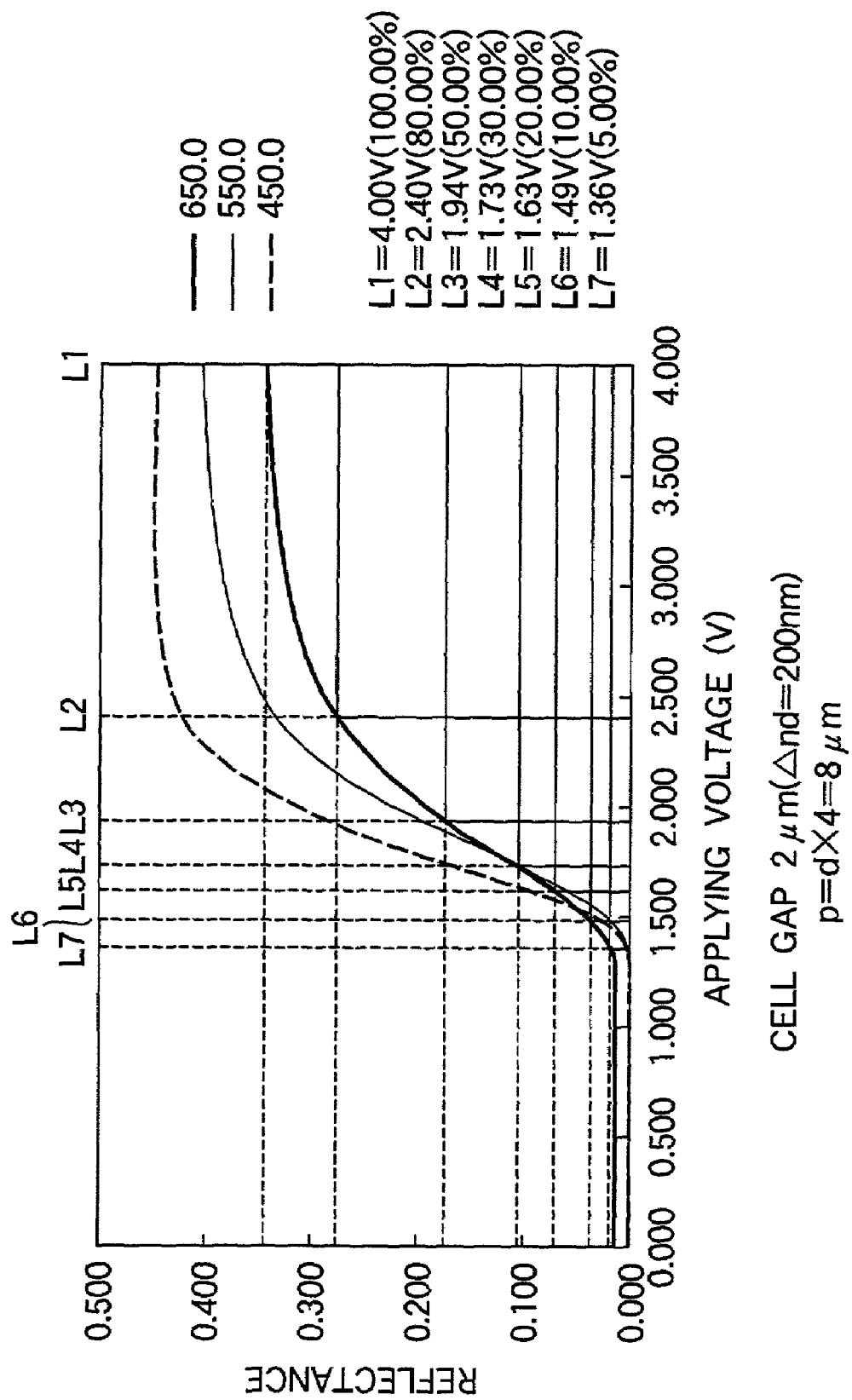
FIG. 34 is a view showing simulation result of optical characteristic of the reflective liquid crystal display device according to a second mode for carrying out the invention.
Figure 35:
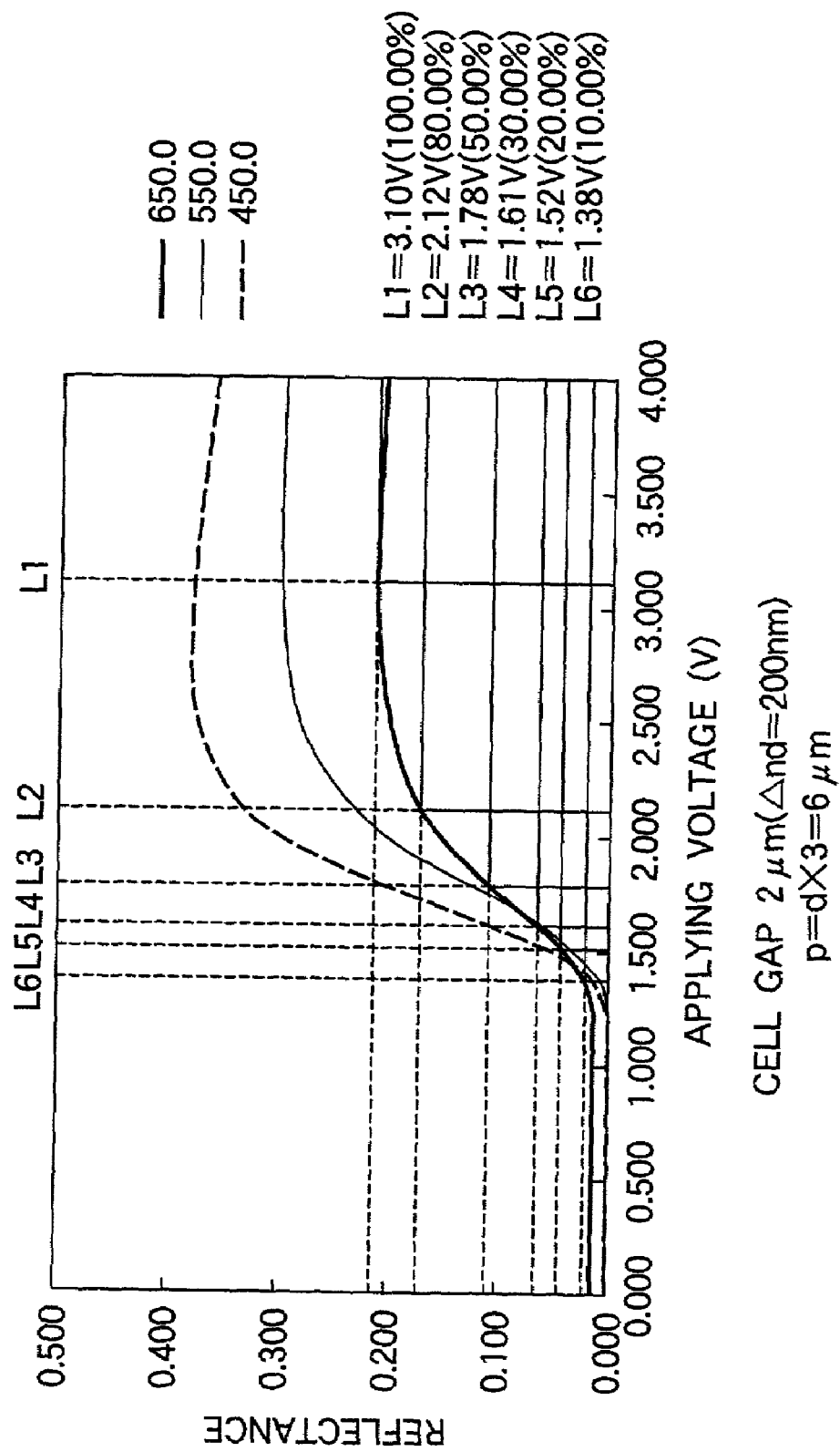
FIG. 35 is a view showing simulation result of optical characteristic of the reflective liquid crystal display device according to a second mode for carrying out the invention.
Figure 36:
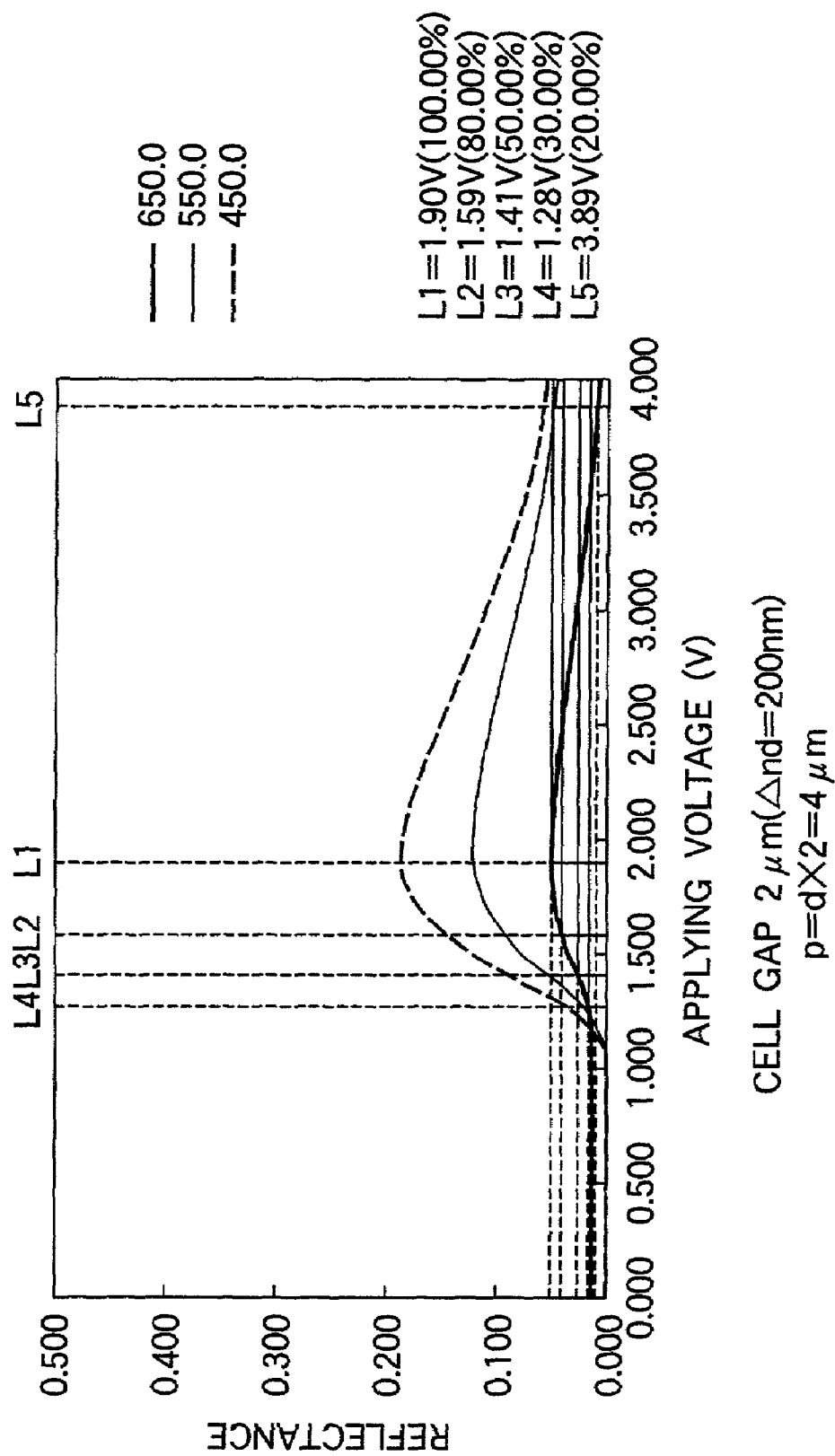
FIG. 36 is a view showing simulation result of optical characteristic of the reflective liquid crystal display device according to a second mode for carrying out the invention.
Figure 37:
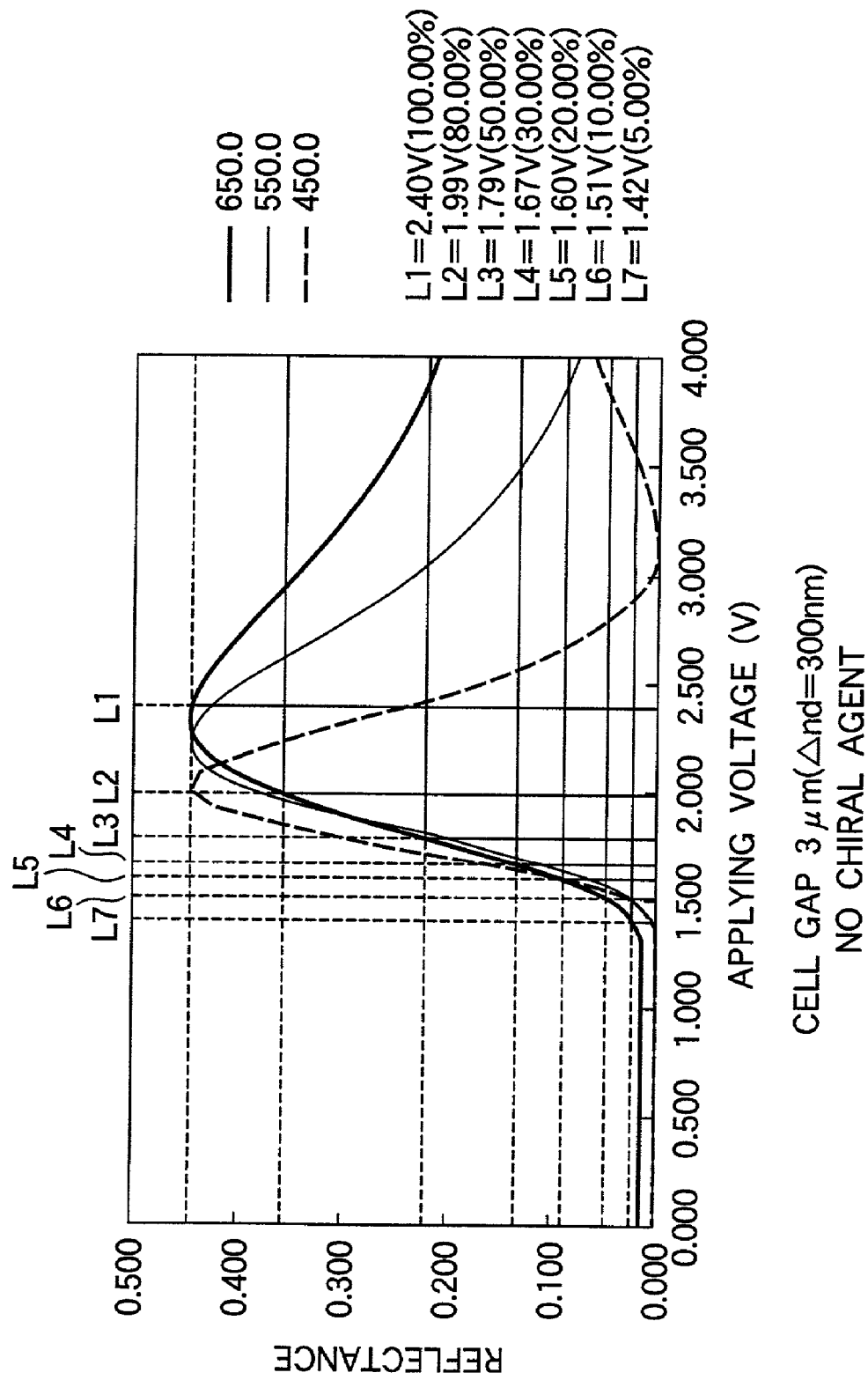
FIG. 37 is a view showing simulation result of optical characteristic of the reflective liquid crystal display device according to a second mode for carrying out the invention.
Figure 38:
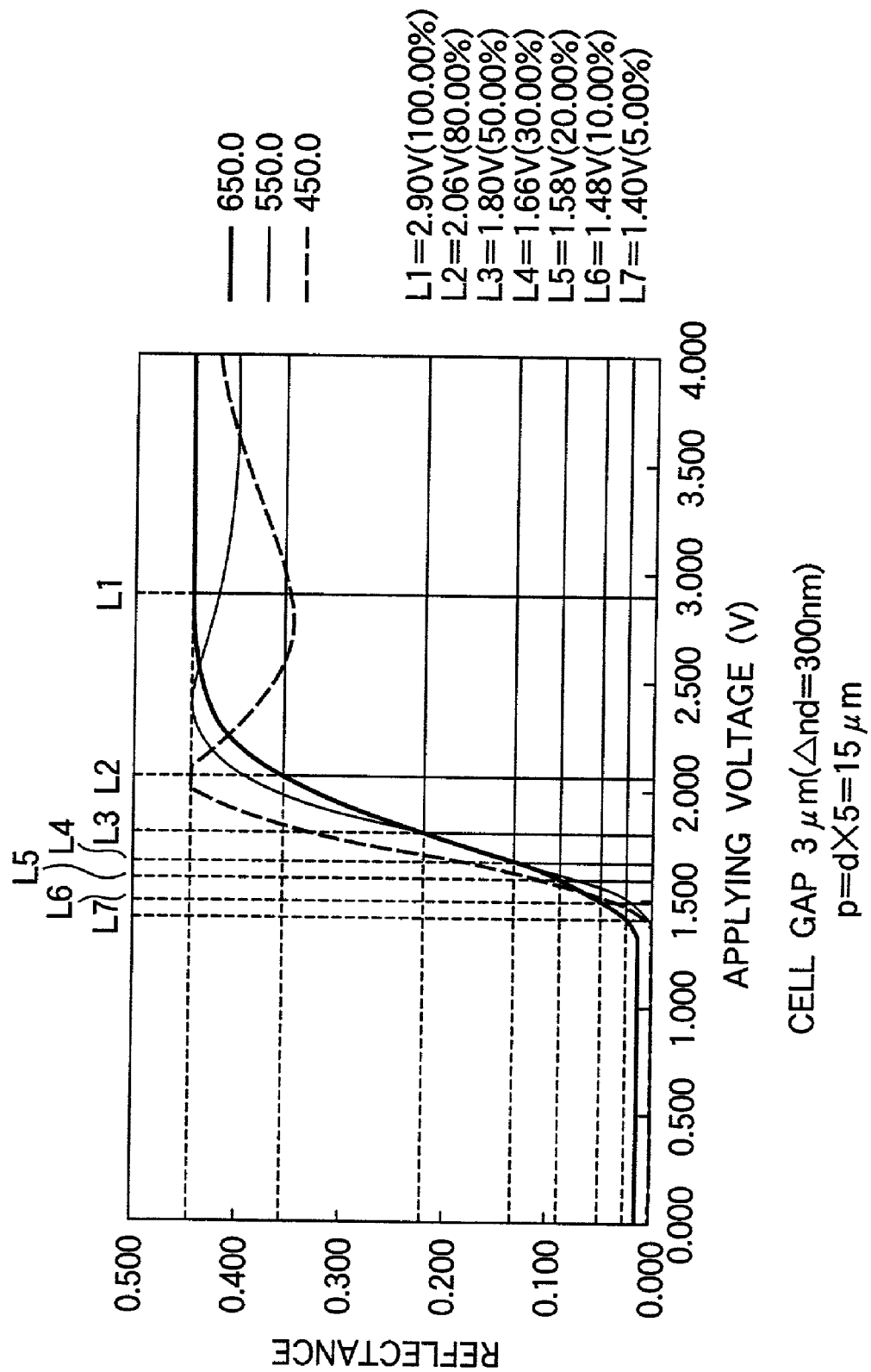
FIG. 38 is a view showing simulation result of optical characteristic of the reflective liquid crystal display device according to a second mode for carrying out the invention.
Figure 39:
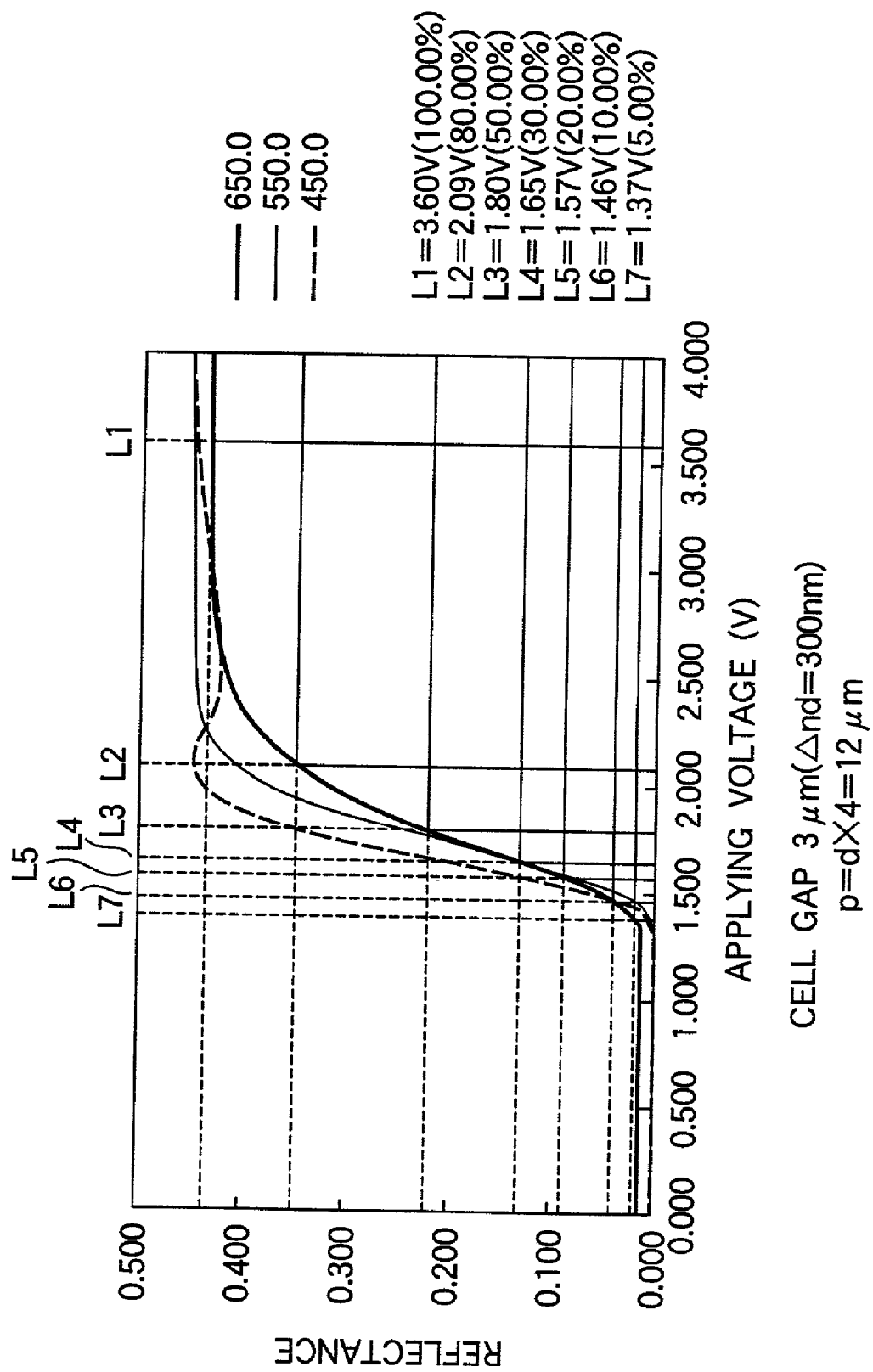
FIG. 39 is a view showing simulation result of optical characteristic of the reflective liquid crystal display device according to a second mode for carrying out the invention.
Figure 40:
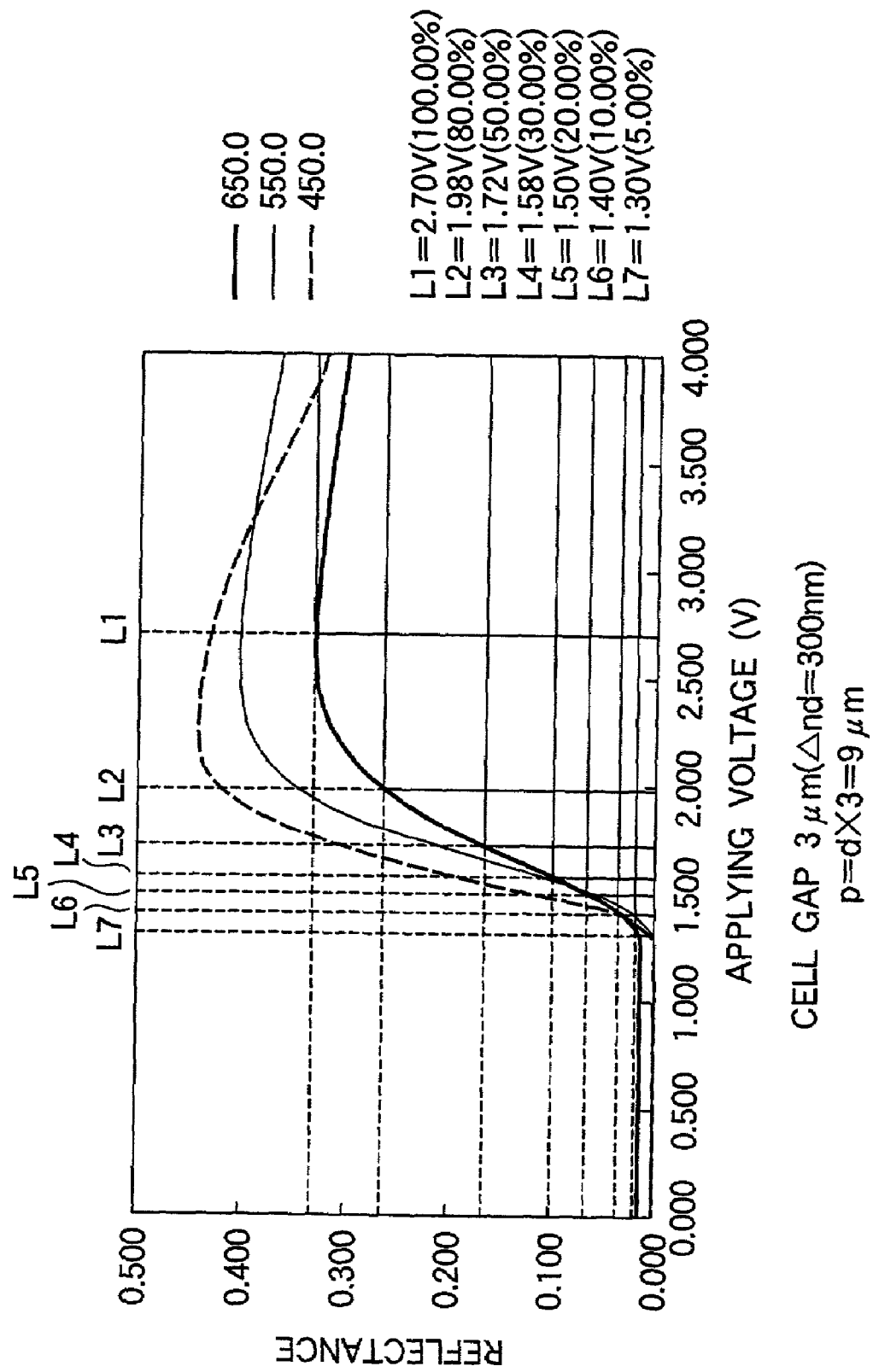
FIG. 40 is a view showing simulation result of optical characteristic of the reflective liquid crystal display device according to a second mode for carrying out the invention.
Figure 41:
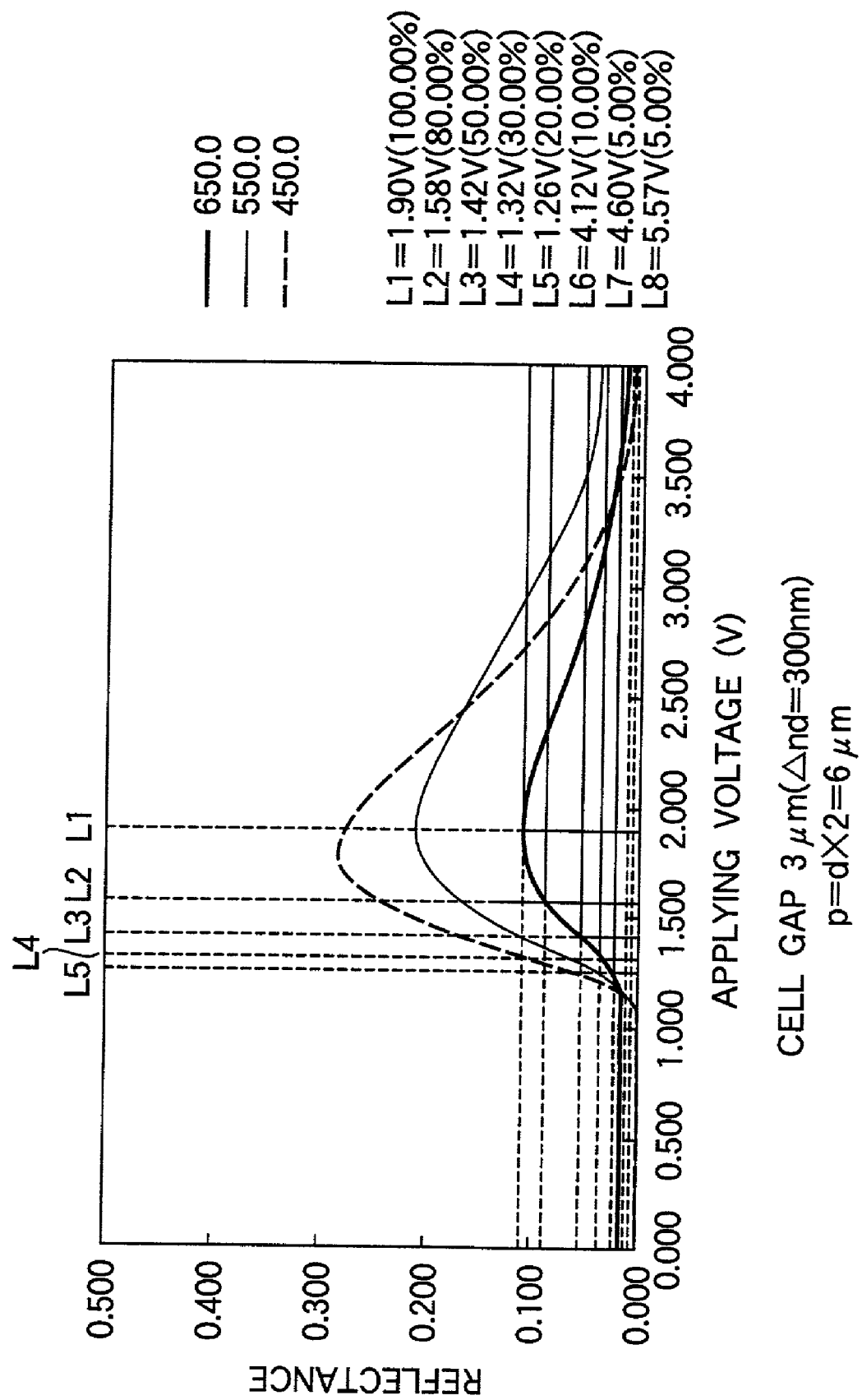
FIG. 41 is a view showing simulation result of optical characteristic of the reflective liquid crystal display device according to a second mode for carrying out the invention.
Figure 42:
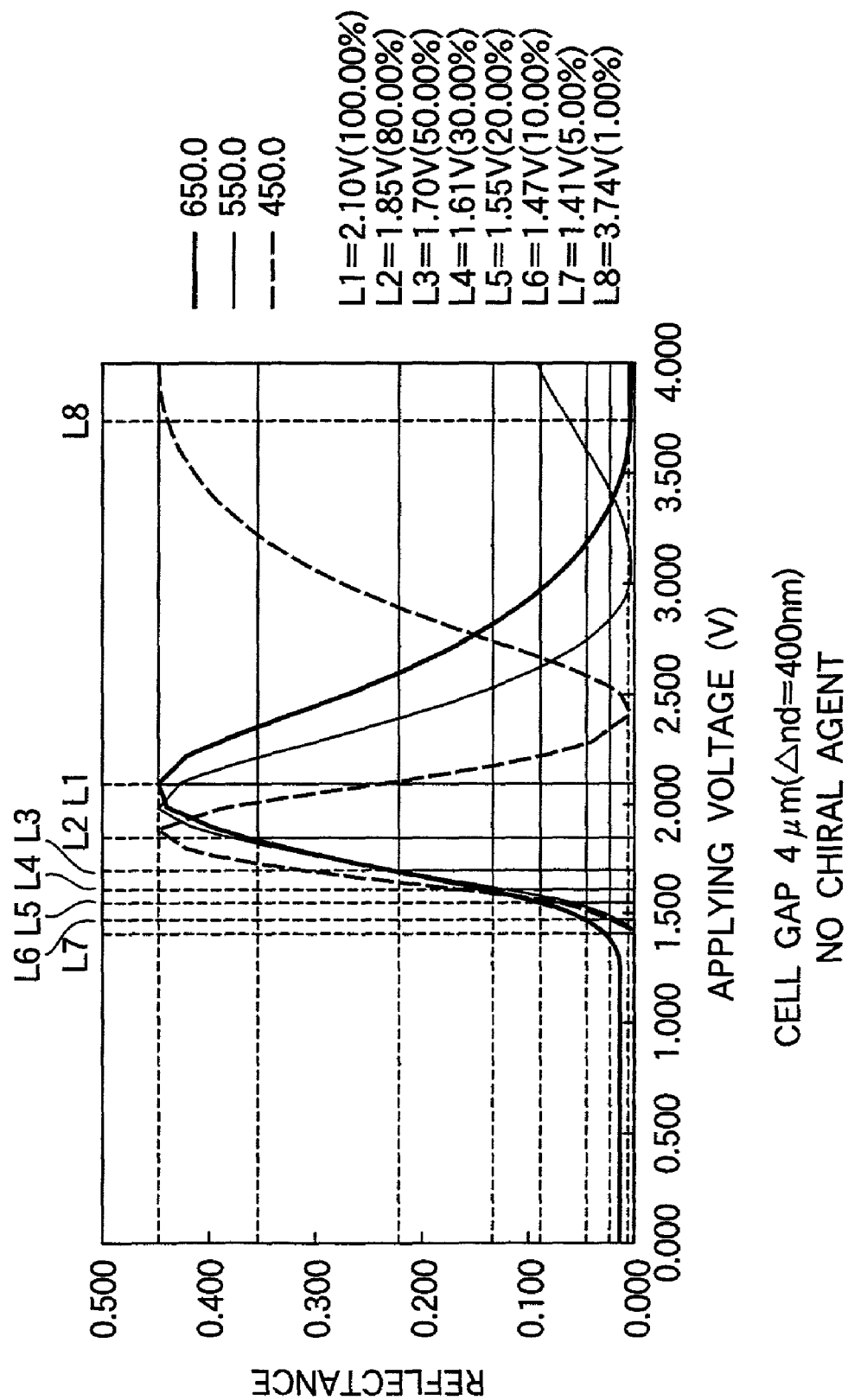
FIG. 42 is a view showing simulation result of optical characteristic of the reflective liquid crystal display device according to a second mode for carrying out the invention.
Figure 43:
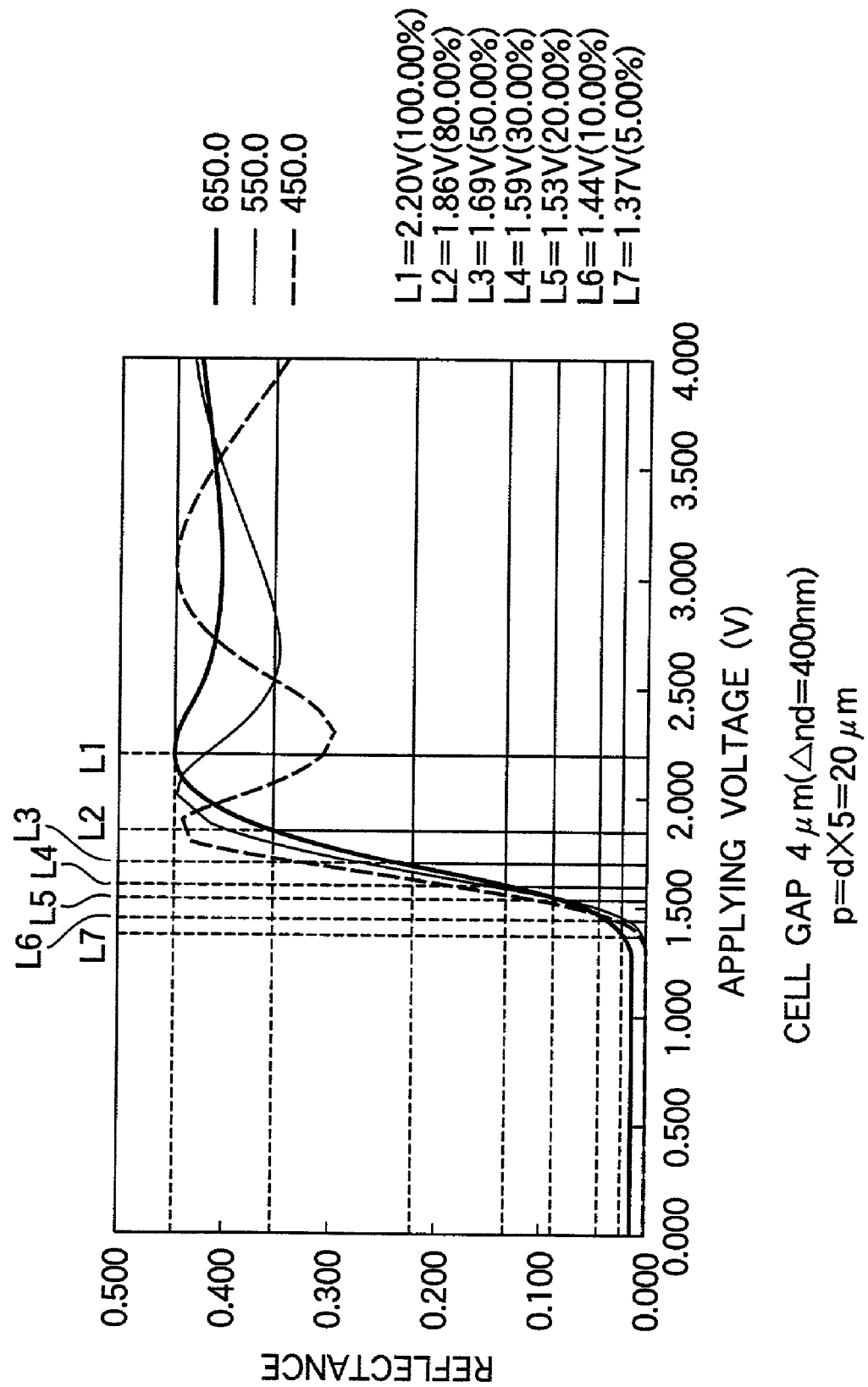
FIG. 43 is a view showing simulation result of optical characteristic of the reflective liquid crystal display device according to a second mode for carrying out the invention.
Figure 44:
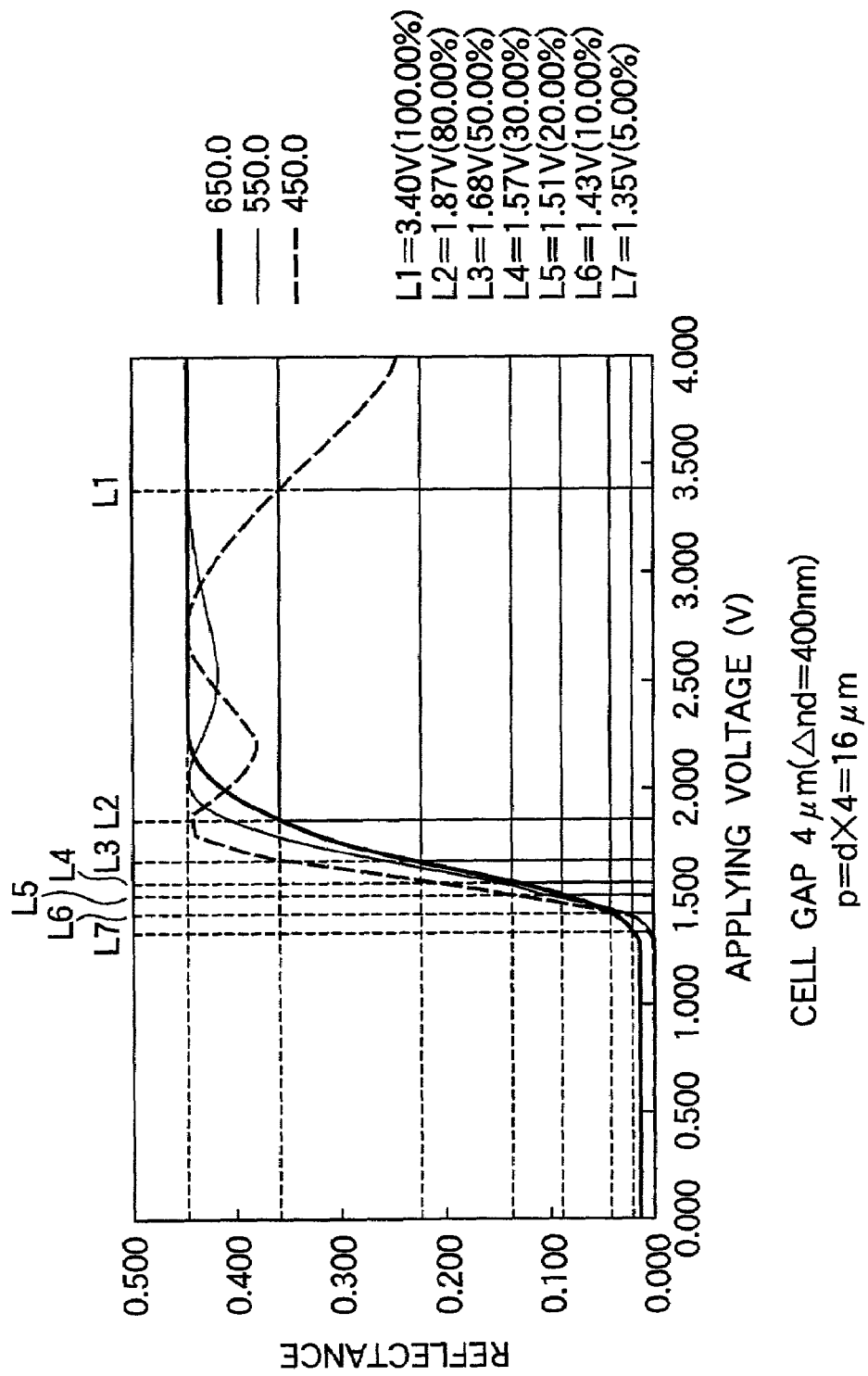
FIG. 44 is a view showing simulation result of optical characteristic of the reflective liquid crystal display device according to a second mode for carrying out the invention.
Figure 45:
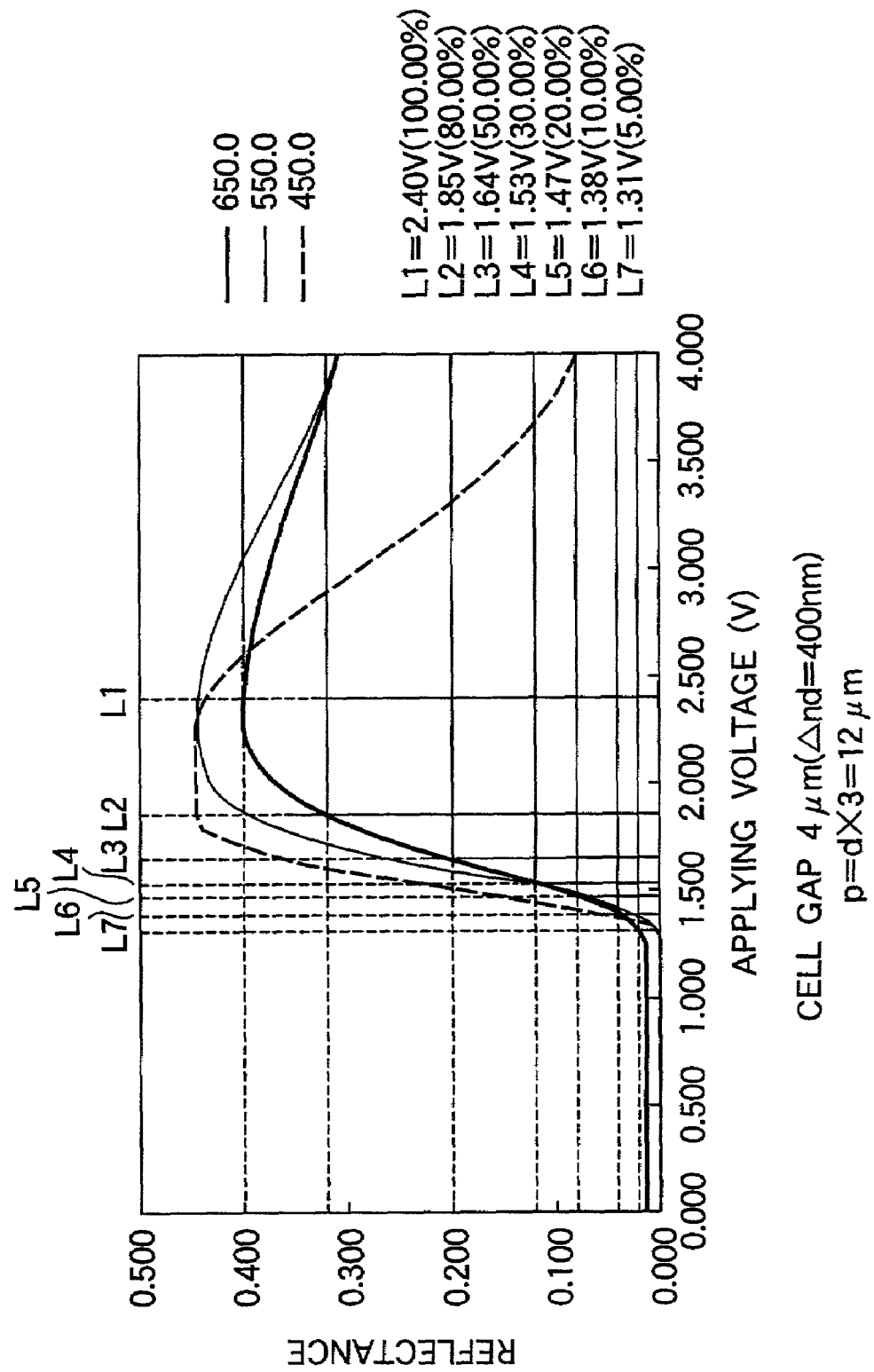
FIG. 45 is a view showing simulation result of optical characteristic of the reflective liquid crystal display device according to a second mode for carrying out the invention.
Figure 46:
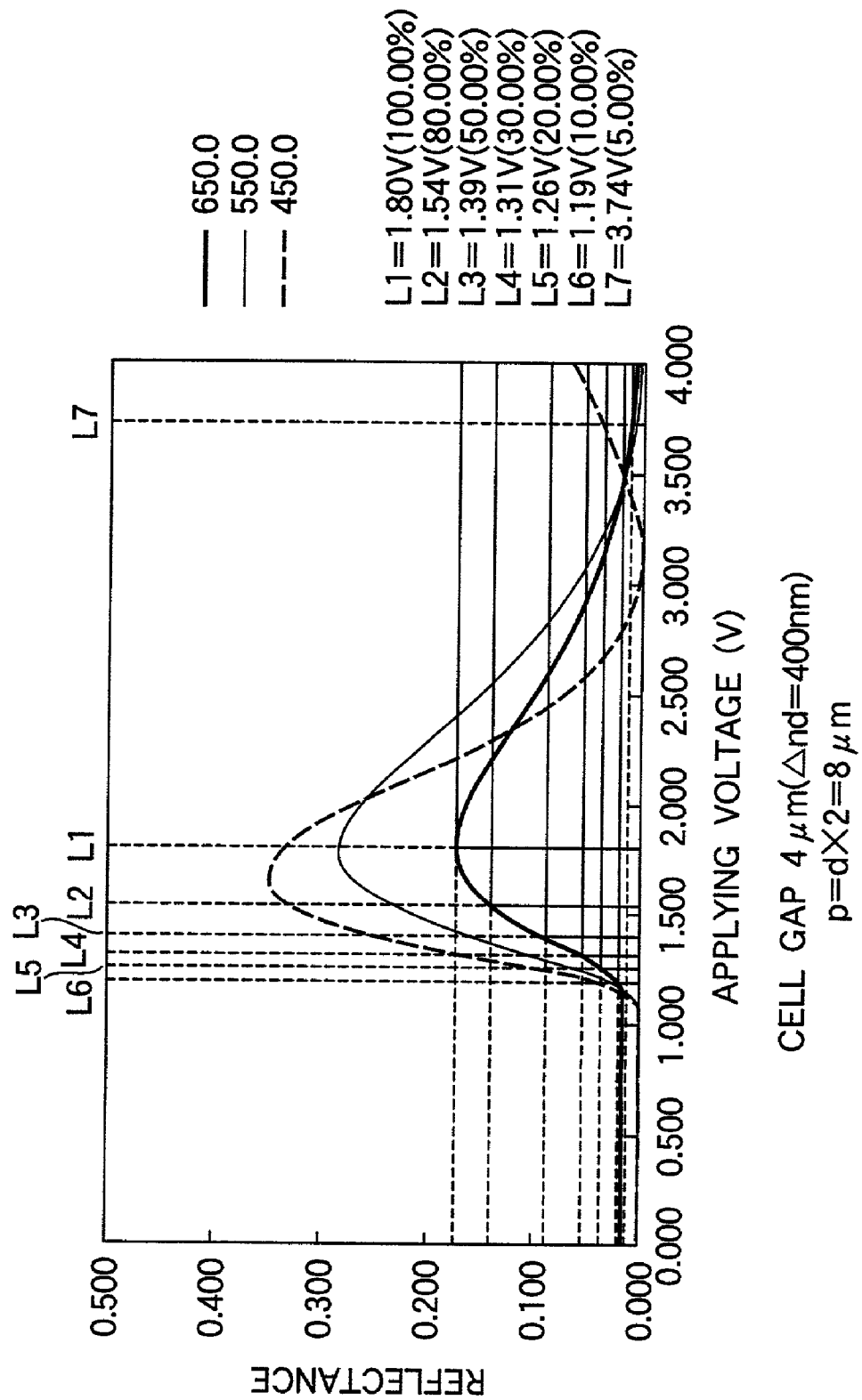
FIG. 46 is a view showing simulation result of optical characteristic of the reflective liquid crystal display device according to a second mode for carrying out the invention.
Figure 47:
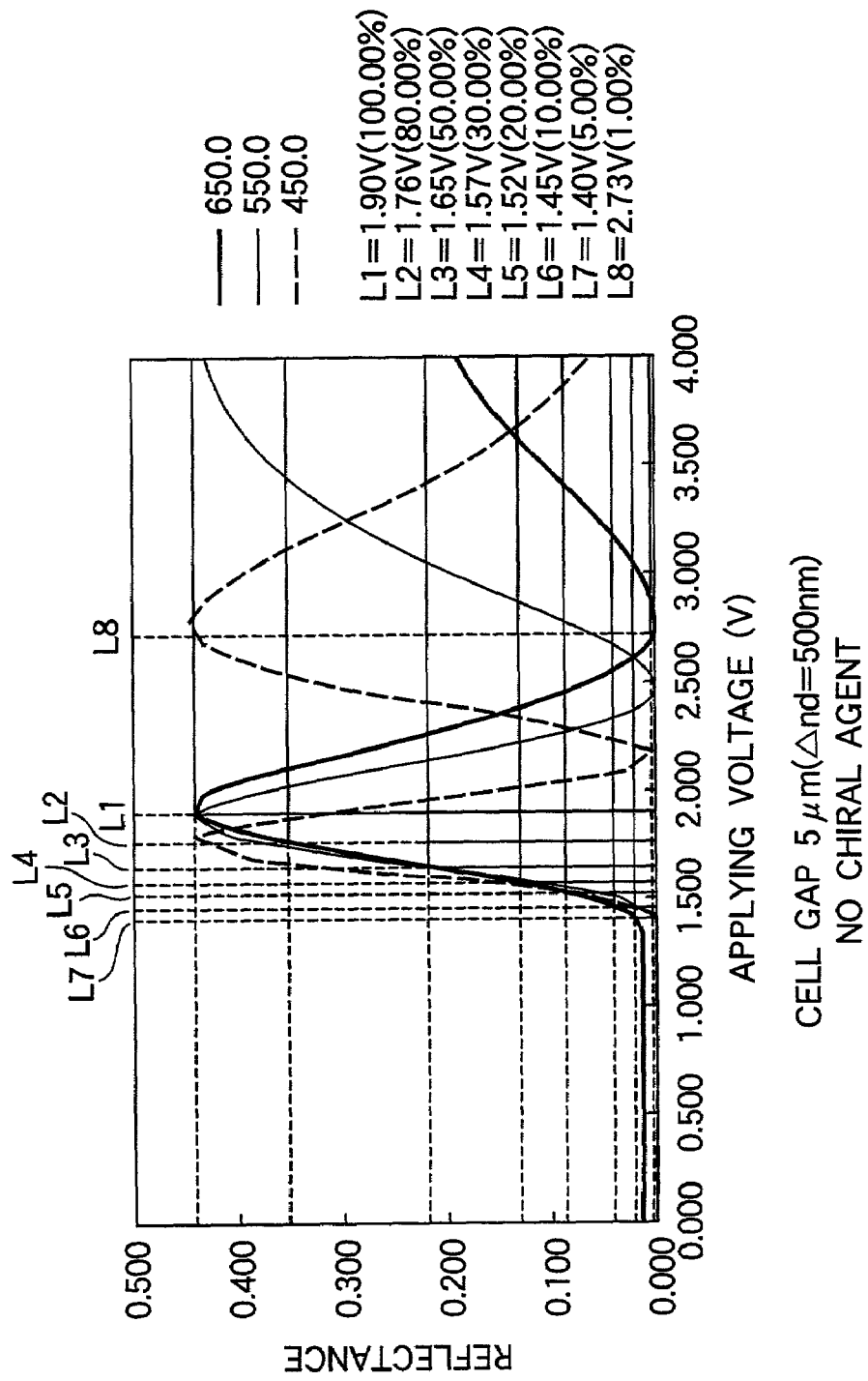
FIG. 47 is a view showing simulation result of optical characteristic of the reflective liquid crystal display device according to a second mode for carrying out the invention.
Figure 48:
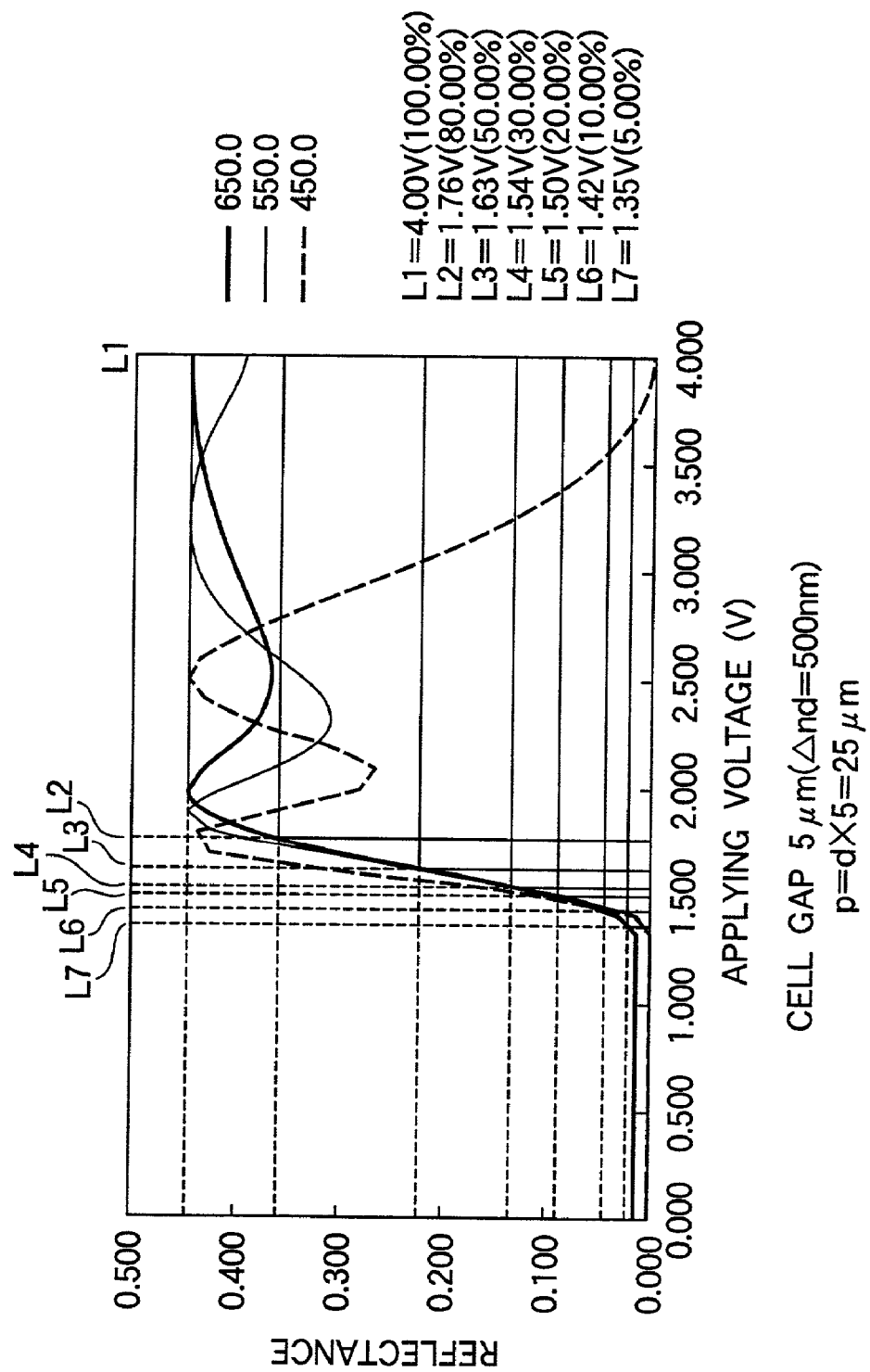
FIG. 48 is a view showing simulation result of optical characteristic of the reflective liquid crystal display device according to a second mode for carrying out the invention.
Figure 49:
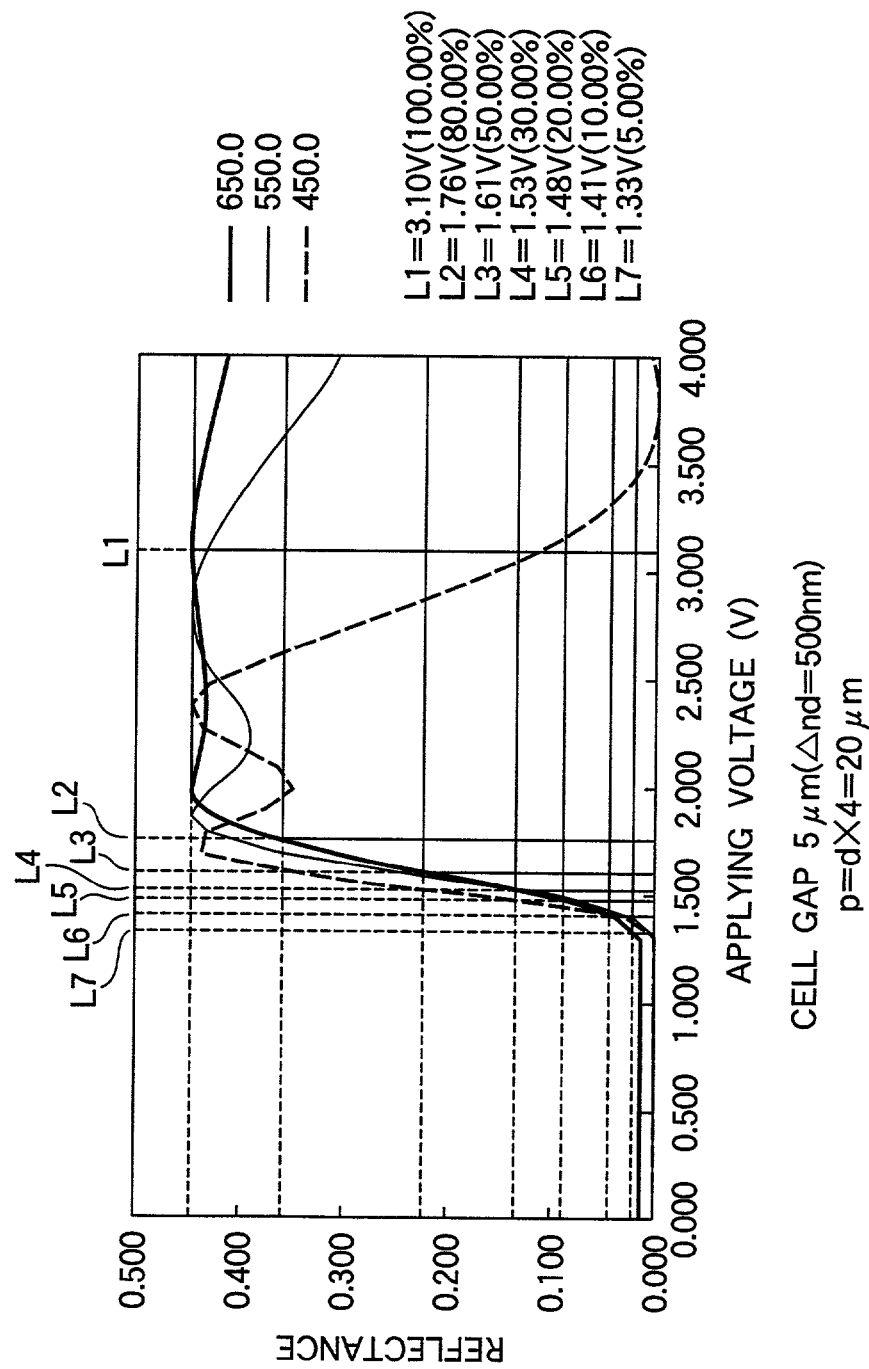
FIG. 49 is a view showing simulation result of optical characteristic of the reflective liquid crystal display device according to a second mode for carrying out the invention.
Figure 50:
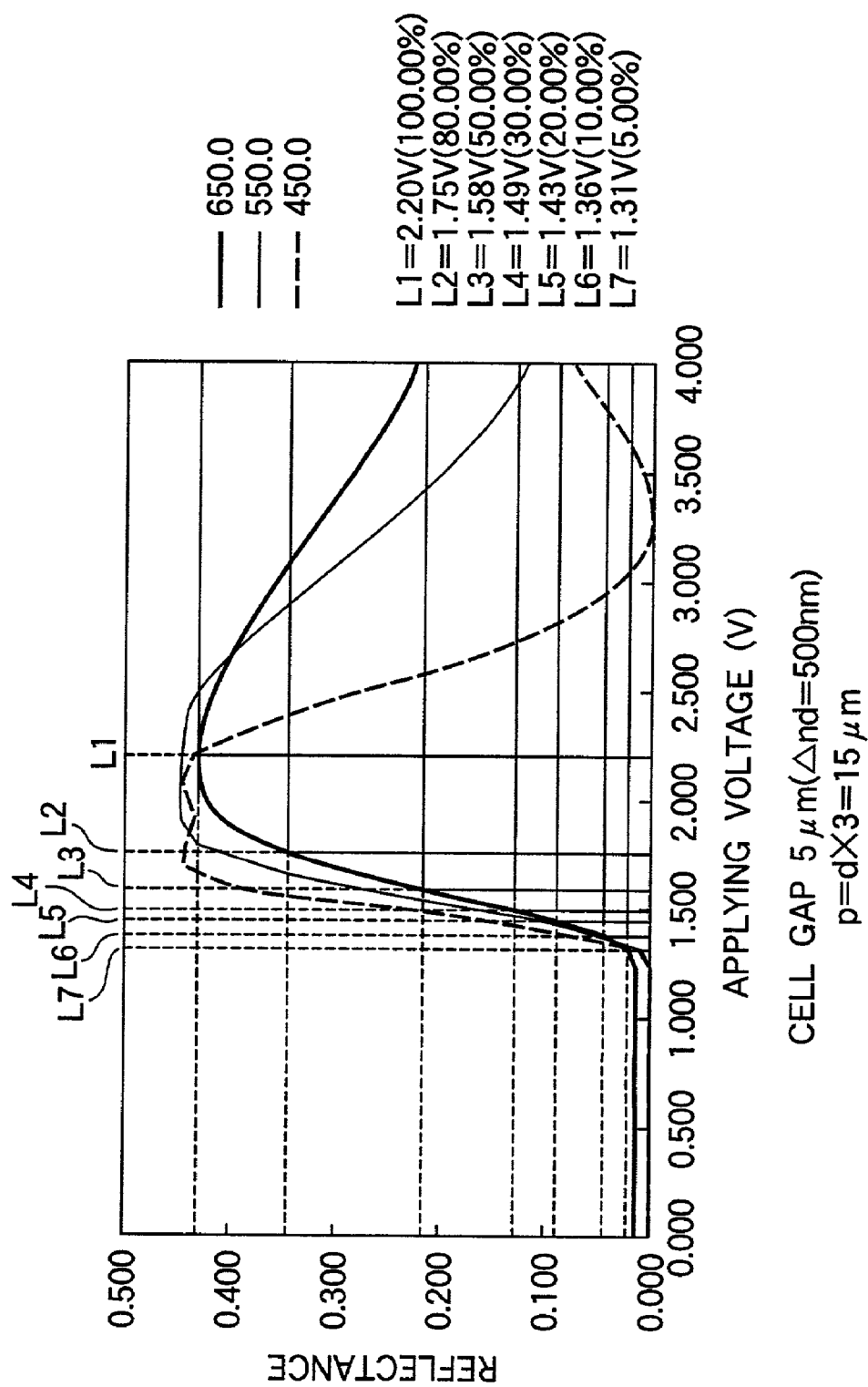
FIG. 50 is a view showing simulation result of optical characteristic of the reflective liquid crystal display device according to a second mode for carrying out the invention.
Figure 51:
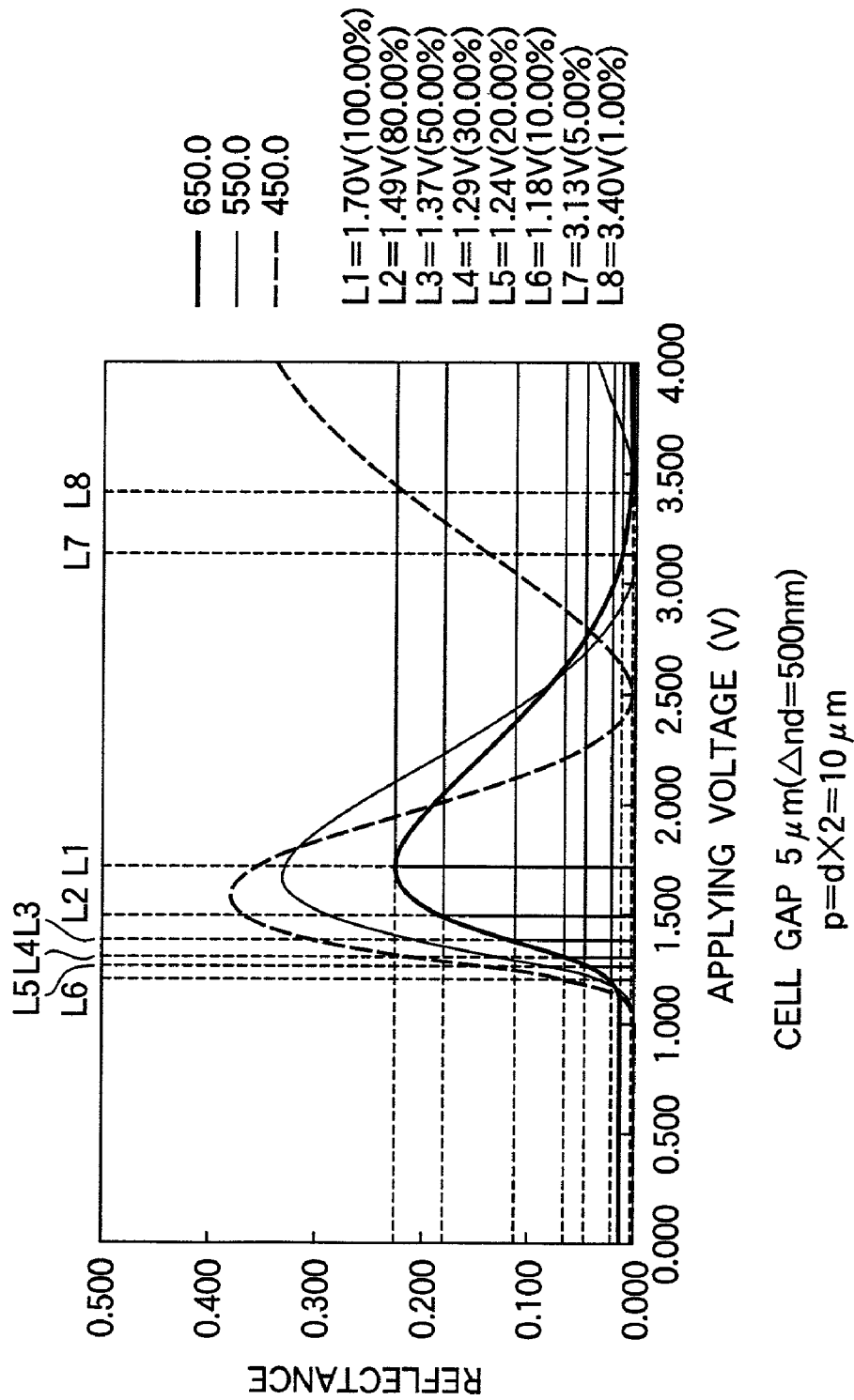
FIG. 51 is a view showing simulation result of optical characteristic of the reflective liquid crystal display device according to a second mode for carrying out the invention.

Operational principles of the reflective liquid crystal display device of the conventional TN mode and VA mode used in the mode for carrying out are shown in FIG. 25A and FIG. 26. Although constructions shown in FIG. 25A, FIG. 26A, and FIG. 26B are similar as the structure shown in FIG. 21, FIG. 22A, and FIG. 22B, a pair of facing substrates 112 and 114 are shown additionally. Liquid crystal molecules 104a are twisted about 60° at condition when no voltage is applied shown in FIG. 25A, at this condition, white display is realized by making retardation of the liquid crystal layer 104 similar as the λ/4 phase difference plate, and very wide reflective characteristic is obtained by combining with the diffusion reflective plate 2 forming wrinkles pattern at the reflective surface.

On the other hand, black display is performed by making retardation as small as possible, ideally as close to zero, at condition when voltage is applied as shown in FIG. 25B. However, in order to have the liquid crystal molecules 104a to stand perfectly vertical, very high voltage applied is needed and not practical. Because of that, contrast ratio of only about 15 is obtained at voltage applied of 4 to 5 volts at contrast ratio in the integrated sphere assessment.

Contrary, in the reflective liquid crystal display devices of VA mode shown in FIG. 26A and FIG. 26B, liquid crystal molecules 105a stand almost vertically at condition when no voltage is applied shown in FIG. FIG. 26A so as to realize ideal black display. When substantial retardation of the liquid crystal layer 105 becomes $\lambda/4$, white display generates at condition when voltage is applied, as shown in FIG. 26B. Therefore, by optimizing retardation of the liquid crystal layer 105 (=$\Delta n \cdot d$; $\Delta n$ is refractive index anisotropy; d is cell gap) more, white display can be realized with lower voltage. Thus, in the reflective liquid crystal display device combining VA mode and the diffusion reflective plate 2 of wrinkled shaped uneven shape, wide white reflective characteristic in viewing angle and more black display (high contrast ratio and wide viewing angle) are realized with driving voltage of 4 V or less.

Simulation result of optical characteristics of the reflective liquid crystal display device according to the mode for carrying out are shown in FIG. 27 to FIG. 51. In the simulation, n type liquid crystal A ($\Delta n=0.1$, $\Delta \epsilon=-7$) having negative dielectric anisotropy is used for liquid crystal material. Reflectance characteristic is examined about three wavelengths of reflective light of $\lambda 1=450$ nm, $\lambda 2=550$ nm, and $\lambda 3=650$ nm.

FIG. 27 to FIG. 31 represent reflectances in order to each voltage applied in the case varying chiral pitch p to p=∞ (infinity; no addition of chiral agent), p=d (cell gap)×5=7.5 µm, p=d×4=6 µm, p=d×3=4.5 µm, and p=d×2=3 µm at cell gap of 1.5 µm and retardation of $\Delta n \cdot d=150$ nm.

FIG. 32 to FIG. 36 represent reflectance in order to each voltage applied in the case varying chiral pitch p to p=∞, p=d×5=10 µm, p=d×4=8 µm, p=d×3=6 µm, and p=d×2=4 µm at cell gap of 2 µm and retardation of $\Delta n \cdot d=200$ nm.

FIG. 37 to FIG. 41 represent reflectance in order to each voltage applied in the case of varying chiral pitch p to p=∞, p=d×5=15 µm, p=d×4=12 µm, p=d×3=9 µm, and p=d×2=6 µm at cell gap of 3 µm and retardation of $\Delta n \cdot d=300$ nm.

FIG. 42 to FIG. 46 represent reflectance in order to each applying voltage in the case of varying chiral pitch p to p=∞, p=d×5=20 µm, p=d×4=16 µm, p=d×3=12 µm, and p=d×2=8 µm at cell gap of 4 µm and retardation of $\Delta n \cdot d=400$ nm.

FIG. 47 to FIG. 51 represent reflectance in order to each applying voltage in the case of varying chiral pitch p to p=∞, p=d×5=25 µm, p=d×4=20 µm, p=d×3=15 µm, and p=d×2=10 µm at cell gap of 5 µm and retardation of $\Delta n \cdot d=500$ nm.

FIG. 27, FIG. 32, FIG. 37, FIG. 42, and FIG. 47 show changes when retardation $\Delta n \cdot d$ of the liquid crystal layer 105 is made large gradually in order of the figure number at no addition of chiral agent and chiral pitch of p=∞. As shown in these figures, it is known that peak value of reflectance (the maximum value) becomes low voltage by increasing retardation $\Delta n \cdot d$ of the liquid crystal layer 105. For example, at $\Delta n \cdot d=500$ nm shown in FIG. 47, peak value of reflectance is obtained with very low voltage, that is, about 2V of applying voltage. However, voltage width of peak value of reflectance becomes narrow, including temperature characteristic, the margin of circuit design becomes narrow. On the other hand, about $\Delta n \cdot d=150$ nm shown in FIG. 27, applying voltage of about 4 V is needed in order to obtain reflectance peak. Thus, it is known that relation of voltage width obtaining peak value of reflectance which becomes a white display and making applying voltage low is relation of trade-off.

Contrary, in the mode for carrying out, it is found that the relation of trade-off is improved by adding definite chiral agent to the liquid crystal. Looking out over the whole FIG. 27 and FIG. 51, it succeeded that enlargement of voltage width obtaining peak value of reflectance which becomes a white display and making applying voltage low are compatible by using liquid crystal having chiral pitch p of 3 to 4 magnifications of cell gap d.

About the mode for carrying out, liquid crystal material in which refractive index anisotropy $\Delta n$ of liquid crystal is 0.05 or more and dielectric anisotropy $\Delta \epsilon$ is −3.8 or less except the above-mentioned n type liquid crystal A can obtain effect of the mode for carrying out. Alignment control is possible by wrinkled uneven shape of the diffusion reflective plate 2 without particularly treating the alignment on the alignment film surface. Further, by performing alignment regulation treatment of rubbing treatment and UV alignment treatment to facing transparent electrode side, reflective liquid crystal display device with superior display characteristic and response characteristic can be realized.

Liquid crystal layer in which liquid crystal having positive or negative dielectric anisotropy and oriented vertically is called vertical alignment (VA) mode, liquid crystal anchoring at boundary of the substrate as TN mode does not remain without switching, and contrast ratio is made high as principal.

However, light reflected to normal direction of the substrate by applying the reflective plate forming unevenness on the surface becomes oblique incidence, and liquid crystal tilts by tilt angle $\zeta$. As a result, even if black display generates when no voltage is applied, the liquid crystal layer has retardation, and complete black display is not obtained at this condition. Retardation of liquid crystal layer when no voltage is applied is represented as function of uneven tilt angle $\zeta$, the above-mentioned retardation can be obtained by obtaining tilt angle $\zeta$ and existence rate $\gamma$ thereof. Therefore, complete black display can be obtained by having negative refractive index anisotropy at direction vertical to substrate surface and by that the retardation compensates with almost the same phase difference plate as retardation obtained above.

Means for compensating retardation of liquid crystal layer aligning vertically using the phase difference plate having negative refractive index anisotropy at vertical direction to substrate surface is well known technology (see English Patent No. 1,462,978 and Japanese Patent Application No. 266889/1997). The means depresses light leakage from oblique direction by making retardation $df \cdot \{(nx+ny)/2-nz\}$ of phase difference plate almost the same as retardation $dlc \cdot \Delta n$ of liquid crystal layer. However, any technology is used for improvement of viewing angle of the reflective liquid crystal display device, and it is impossible to compensate completely the black display of the reflective liquid crystal display device in this retardation.

Figure 52:
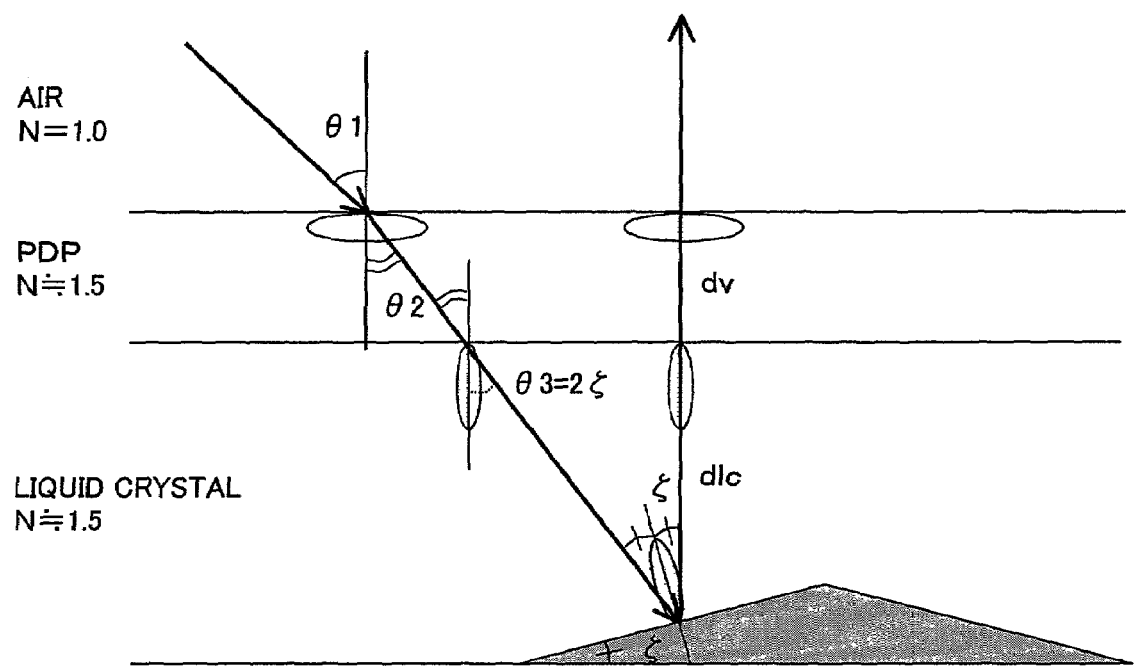
FIG. 52 is a view describing about reflection characteristic of the diffusion reflective plate 2 in which unevenness is formed on surface of the reflective liquid crystal display device according to a second mode for carrying out the invention.

FIG. 52 is a view describing about reflective characteristic of the diffusion reflective plate 2 forming unevenness at the surface. The diffusion reflective plate 2 is designed so that environment light is taken in much to reflect to the observer said. Although light quantity of environment light taken in increases by making taking-in angle θ1 of environment light larger, it is not desirable because light is reflected at boundary when taking-in angle θ1 is too large and light strength is reduced, Taking-in angle θ1 of light reflecting to observer side (normal direction of the substrate) is provided by tilt angle ζ of uneven portion of the diffusion reflective plate 2, and the inventors of the application propose a reflective plate having optimized tilt angle distribution.

In FIG. 52, the following conditions are placed: refractive index of air N=1.0; refractive index of phase difference plate (PDP) N≅1.5; and refractive index of liquid crystal N≅1.5. For thickness of PDP of normal direction of the substrate, dp is placed, θ2 is placed for refractive angle to taking-in angle (incident angle) θ1, and θ3 is placed for refractive angle to incident angle θ2 at boundary of the PDP and liquid crystal. Since refractive indexes of the PDP and liquid crystal are almost equal, the following expression holds between them.

$$dp/\cos θ2 ≅ dp/\cos θ3$$

Length of optical path is $dp/\cos θ2 ≅ dp/\cos 2ζ$ at the PDP, and $dlc/\cos θ3 ≅ dlc/\cos 2ζ$ in the liquid crystal outward towards entering at uneven portion of the diffusion reflective plate 2. On the other hand, the length is dlc in the liquid crystal and dp at the PDP at homeward after reflecting at the uneven portion.

Retardation of the liquid crystal layer when no voltage is applied in the case applying the diffusion reflective plate 2 proposed by the inventors of the application is shown in Table 1.

Figure 53A:
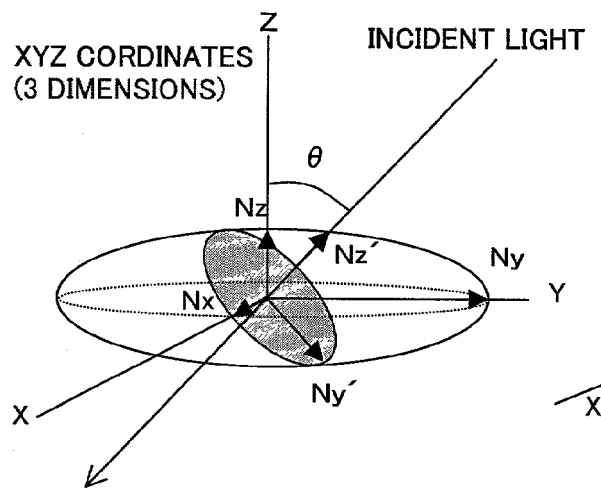
FIG. 53A to FIG. 53D are views showing refractive index ellipsoid.
Figure 53B:
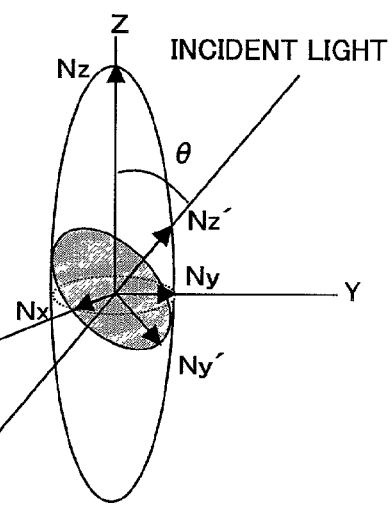

As shown in FIG. 53A, the PDP is assumed to be refractive index ellipsoid having negative dielectric anisotropy in vertical direction to the substrate surface. Further, as shown in FIG. 53B the liquid crystal is assumed to be refractive index ellipsoid having positive dielectric anisotropy in vertical direction to the substrate surface. Refractive index anisotropy when environment light enters with tilt of θ from Z axis direction in the figure is obtained.

Figure 53C:
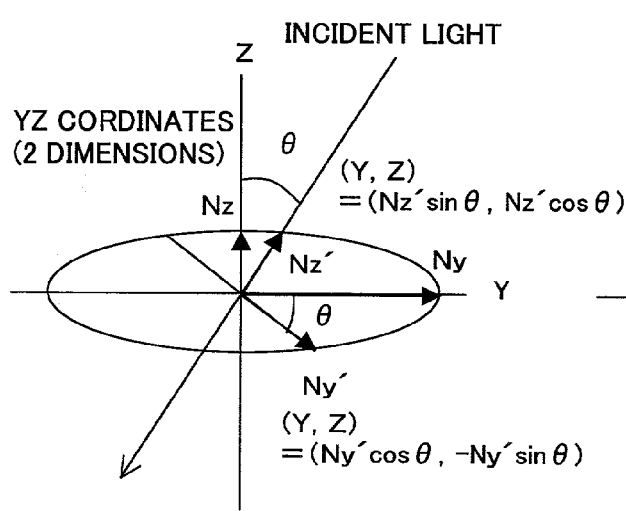
Figure 53D:
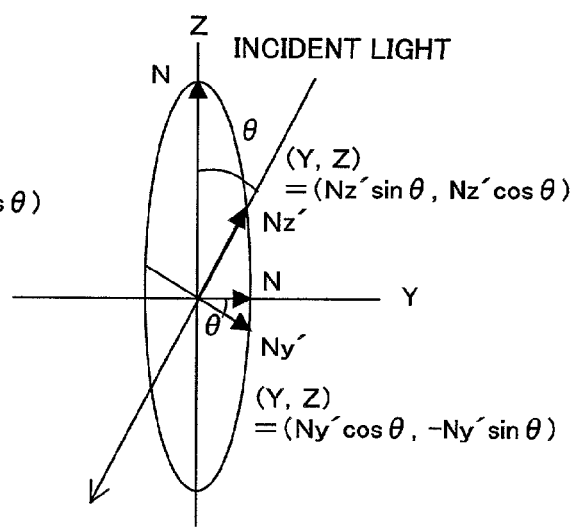

As shown in FIG. 53A and FIG. 53B, ordinary ray No and extraordinary ray Ne of incident light with incident angle θ to X-Y plane suit to minor axis and major axis (or major axis and minor axis) of ellipsoid of section cut off of refractive index ellipsoid at plane where X-Y plane is rotated −θ about X axis as shown in FIG. 53C and FIG. 53D.

Here, when incident light enters with tilt of angle θ from normal (Z axis) direction, Y-Z coordinates of Ny' and Nz' is represented as function of θ as shown in FIG. 53C and FIG. 53D. Ny' is obtained as shown in the following Expression 1 by substituting Y-Z coordinates value into ellipsoid equation of Y-Z plane.

$$Y^2/Ny^2 + Z^2/Nz^2 = 1 \qquad [\text{Expression 1}]$$
$$Ny'^2 \cos^2θ/Ny^2 + Ny'^2 \sin^2θ/Nz^2 = 1$$
$$Ny'^2 = 1/(\cos^2θ/Ny^2 + \sin^2θ/Nz^2)$$
$$Ny' = NyNz/(Nz^2\cos^2θ + Ny^2\sin^2θ)^{1/2}$$
$$= Nz/((Nz^2/Ny^2)\cos^2θ + (1 - \cos^2θ))^{1/2}$$
$$= Nz/(1 - v\cos^2θ)^{1/2}$$

Where, $v = (Ny^2 - Nz^2)/Ny^2$

Similarly, Nz' is obtained as shown in the following Expression 2.

$$Y^2/Ny^2 + Z^2/Nz^2 = 1 \qquad [\text{Expression 2}]$$
$$Nz'^2 \sin^2θ/Ny^2 + Nz'^2 \cos^2θ/Nz^2 = 1$$
$$Nz'^2 = 1/(\sin^2θ/Ny^2 + \cos^2θ/Nz^2)$$
$$Nz' = NyNz/(Nz^2\sin^2θ + Ny^2\cos^2θ)^{1/2}$$
$$= Nz/((Nz^2/Ny^2)(1 - \cos^2θ) + \cos^2θ))^{1/2}$$
$$= Nz/(Nz^2/Ny^2 + v\cos^2θ)^{1/2}$$

From the relational expression of θ and Nx', Ny' and Nz' obtained in such way, retardation of the liquid crystal layer responding to tilt angle distribution of unevenness and retardation of the phase difference plate are obtained. Setting to 3 μm for thickness dlc of liquid crystal and 0.1 for refractive index difference Δn of extraordinary ray and ordinary ray, liquid crystal tilts by tilt angle ζ as it goes to the lower substrate (reflective plate side) from the upper substrate. Thus, incident angle θ3 to liquid crystal of environment light becomes small by tilt angle ζ outward towards the lower substrate from the upper substrate, and it becomes small by tilt angle ζ homeward towards as going to the upper substrate from the lower substrate.

TABLE 1

| Reflective plate | Mean tilt | Liquid crystal layer | Phase Difference (1) | Compensating rate | Phase Difference (2) | Compensating rate |
|---|---|---|---|---|---|---|
| A | 13.06 | 46.77 | 15.26 | 32.6% | 29.65 | 63.4% |
| B | 8.98 | 23.14 | 9.05 | 39.1% | 16.15 | 69.8% |
| C | 7.67 | 17.09 | 7.53 | 44.1% | 12.85 | 75.2% |
| D | 7.48 | 13.63 | 6.64 | 48.7% | 10.92 | 80.1% |

| Reflective plate | Mean tilt | Liquid crystal layer | Phase Difference (3) | Compensating rate | Phase Difference (4) | Compensating rate |
|---|---|---|---|---|---|---|
| A | 13.06 | 46.77 | 36.32 | 77.7% | 41.81 | 89.4% |
| B | 8.98 | 23.14 | 19.04 | 82.3% | 21.73 | 93.9% |
| C | 7.67 | 17.09 | 14.82 | 86.7% | 16.83 | 98.5% |
| D | 7.48 | 13.63 | 12.35 | 90.6% | 13.96 | 102.4% |

TABLE 1-continued

| Reflective plate | Mean tilt | Liquid crystal layer | Phase Difference (5) | Compensating rate | Phase Difference (6) | Compensating rate |
|---|---|---|---|---|---|---|
| A | 13.06 | 46.77 | 47.12 | 100.7% | 51.34 | 109.8% |
| B | 8.98 | 23.14 | 24.34 | 105.2% | 25.96 | 112.2% |
| C | 7.67 | 17.09 | 18.77 | 109.8% | 19.76 | 115.6% |
| D | 7.48 | 13.63 | 15.52 | 113.9% | 16.15 | 118.5% |

Retardation of the liquid crystal layer when no voltage is applied obtained from tilt angle distribution (tilt angle ζ and its existence ratio) of uneven portion and is 17 nm at wrinkled shape, and the retardation may be compensated with the phase difference plate having negative refractive index anisotropy in vertical direction to the substrate surface. Assuming that the phase difference plate is a refractive index ellipsoid having negative refractive index anisotropy in vertical direction to the substrate surface, refractive index anisotropy when environment light enters with tilt of θ from Z axis direction similarly as the liquid crystal is obtained. Thickness dp of the phase difference plates are set to (1) 79 μm, (2) 83 μm, (3) 87 μm, (4) 84 μm, (5) 88 μm, and (6) 89 μm, difference of refractive indexes {(nx+ny)/2−nz} of parallel direction and vertical direction to the substrate surface are set to (1) 0.0006, (2) 0.0013, (3) 0.0015, (4) 0.0018, (5) 0.0020, and (6) 0.0022, and it is assumed that there is no refractive index anisotropy of parallel direction on the substrate surface (nx=ny).

Retardation generating at phase difference plate (1) to (6) when the same optical path is taken is shown in Table 1. Since sample (5) becomes same degree as retardation of the liquid crystal layer when no voltage is applied with the reflective plate A for the phase difference plate, optimizing compensation is performed.

Retardation of the liquid crystal layer when no voltage is applied calculated here varies by dlc and Δn, and it is in proportion to these values. Therefore, it is desirable that ratio of dlc·Δn rather than value itself is used in order to provide retardation of the phase difference plate compensating this. Since retardation is represented with value of parallel or vertical direction to the substrate surface, retardation of the phase difference plate is desirable to represent with value of parallel or vertical direction to the substrate surface instead of practical value obtained at the above-mentioned. By providing retardation of the phase difference plate in such way, the following range is obtained.

$$0.5 \leq [df \cdot \{(nx+ny)/2-nz\}]/(dlc \cdot \Delta n) \leq 0.7$$

Here, the reason that optimizing retardation of the phase difference plate has some degree of range is that remarkable effect is expected as compensating of black display even if retardation of the phase difference plate shifts about 10% from optimizing value.

Although the retardation of the phase difference plate is optimized by reflective plate proposed by the inventors of the application, retardation of the phase difference plate can be obtained even for the other reflective plate by the similar technique. Result of tilt angle distribution measured about various reflective plate produced by way of trial by the inventors and retardation of the liquid crystal layer when no voltage is applied is obtained is shown in Table 1. The range of retardation of the liquid crystal layer when no voltage is applied becomes about 14 to 47 nm when the reflective plate of mean tilt angle range of 7 degree to 13 degree is applied, and the phase difference plates of samples (3) to (6) are optimum. By providing retardation of the phase difference plate similarly obtained at the above-mentioned, the following range is obtained.

$$0.4 \leq [df \cdot \{(nx+ny)/2-nz\}]/(dlc \cdot \Delta n) \leq 0.7$$

Therefore, retardation of the phase difference plate completely compensating black display at the reflective liquid crystal display device of VA mode applying the reflective plate having unevenness at the surface is generally provided in the following range.

$$0.4 \leq [df \cdot \{(nx+ny)/2-nz\}]/(dlc \cdot \Delta n) \leq 0.7$$

By that a second phase difference plate with less than the liquid crystal in wavelength dispersibility is sandwiched between the polarizing plate and liquid crystal cell and azimuth of linear polarized light is rotated 90° with the phase difference plate so as to be absorbed by the polarizing plate, black display with little wavelength dispersibility (a part of visible light wavelength does not leak) can be obtained. Here, it is desirable to arrange the second phase difference plate between the polarizing plate and the first phase difference plate, and not desirable between the first phase difference plate and the liquid crystal layer.

Environment light becoming a linear polarized light at the polarizing plate becomes a circularly polarized light at the second phase difference plate. By arranging the second phase difference plate between the polarizing plate and the first phase difference plate, the first phase difference plate may compensate at position adjacent to light of almost the same polarized light condition (differs for compensating retardation strictly) as light enters the liquid crystal layer, and polarized light is hardly disturbed. However, by arranging the second phase difference plate between the first phase difference plate and the liquid crystal layer, the first phase difference plate must compensate light of polarized light condition different from light entering in the liquid crystal layer by sandwiching the second phase difference plate, and polarized light is easily disturbed. As a result, it is desirable to arrange the second phase difference plate between the polarizing plate and the first phase difference plate.

According to the mode for carrying out, a reflective liquid crystal display device having low power consumption, low cost, high yield, and very high display quality (contrast ratio and reflectance) is possible to realize.

The reflective liquid crystal display device according to the mode for carrying out will be described concretely using embodiments below.

EMBODIMENT 2-1

A diffusion reflective plate serves as pixel electrode forming a transparent electrode on one substrate and fanning a wrinkled uneven pattern on the other substrate is formed. Next, a vertical alignment film is formed at surface contacting liquid crystal layer of the both substrates. Next, empty cells having three kinds of cell gaps are produced by bonding both substrates using spacers having diameters of 3 μm, 4 μm, and 5 μm respectively. Three kinds of liquid crystal panels are produced by injecting liquid crystal material of n type liquid crystal A into each cell and sealed. Three kinds of liquid crystal display panels are produced by bonding an optical compensating plate laminating a circularly polarizing plate combining a polarizing plate and a λ/4 plate and a phase difference plate having negative phase difference film to these liquid crystal panels. These liquid crystal panels realized a contrast ration 40 of double or more when comparing with the conventional display device of TN made at low voltage of 2.5 V drive.

EMBODIMENT 2-2

A diffusion reflective plate serves as pixel electrode fanning a transparent electrode on one substrate and forming a wrinkled uneven pattern on the other substrate is formed. Next, a vertical alignment film is formed at surface contacting liquid crystal layer of the both substrates. Next, empty cells having three kinds of cell gaps are produced by bonding both substrates using spacers having diameters of 3 μm, 4 μm, and 5 μm respectively. Three kinds of liquid crystal petals are produced by injecting mixed liquid crystal of chiral pitch p=12 μm adding chiral agent CN ton type liquid crystal A into each cell and sealed. Liquid crystal display panels are produced by bonding an optical compensating plate laminating a circularly polarizing plate combining a polarizing plate and a λ/4 plate and a phase difference plate having negative phase difference film to these liquid crystal panels. These liquid crystal panels realize a contrast ratio 40 of more than double when comparing with the conventional display device of TN mode at low voltage of 2.5 V drive.

EMBODIMENT 2-3

A diffusion reflective plate serves as pixel electrode connected to TFT forming a color filter (CF) and a transparent electrode on one substrate and forming TFT and wrinkled uneven shape on the other substrate is formed. Next, an alignment film having vertical alignment ability is formed at the surface contacting the liquid crystal layer of both substrates. Next, two empty cells are produced by bonding both substrates using spacers having diameters of 3 μm, liquid material of n type liquid crystal A (not adding chiral agent) is injected into one empty cell, liquid crystal adding chiral agent (chiral pitch p=12 μm) to liquid crystal A is injected into the other empty cell so as to produce a pair of two kinds of liquid crystal panels. Two kinds of liquid crystal panels are produced by bonding an optical compensating plate laminating a circularly polarizing plate combining a polarizing plate and a λ/4 plate and a phase difference plate having negative phase difference film to these liquid crystal panels are produced. These liquid crystal panels realize a contrast ratio 40 of double or more when comparing will, the conventional display device of TN mode at low voltage of 2.5 V drive.

EMBODIMENT 2-4

Unevenness having reflectivity on the surface is formed on the substrate surface as follows. First, a resist (made by Shipray Far East) is spin coated at about 1 μm thickness on the TFT substrate, Next, after 30 minutes of pre-baking at 90° C., ultra violet irradiation is performed using a mask of uneven pattern. Next, development is performed using developing solution (by Shipley Far east), and unevenness comprising resist is formed. Next, post-baking of 40 minutes a 135° C., ultra violet irradiation to whole surface of the substrate, and final baking of 60 minutes at 200° C. are performed so as to form unevenness of mean tilt angle 7.7°. In order to change tilt angle of unevenness, temperature and time of baking may be changed, and it can be set optionally. After that, a reflective plate is formed by depositing Al with 200 nm film thickness on the unevenness.

Next, vertical alignment film (by JSR Company) is applied on surface of TFT substrate and CF substrate, and spacer (by Sekisui Fine Chemical Company) of 3 μm diameter is sprayed so as to bond both. Liquid crystal (by Merck Japan Company) having negative dielectric anisotropy ($\Delta\epsilon=-7.0$) and being 0.1 in difference of refractive indexes Δn of extraordinary ray and ordinary ray is injected so as to obtain a liquid crystal element of VA mode.

In the mode for carrying out, the polarizing plate and the phase difference plate are arranged at CF side of the reflective liquid crystal element as shown in the following.

(1) polarizing plate: Absorbing axis is 15° (by Sumitomo Chemical Company)

(2) λ/2 plate: One axis film in which retardation of parallel direction to the substrate surface is 275 nm (by JSR Company). Lagging phase axis is 25°.

(3) λ/4 plate: One axis film in which retardation of parallel direction to the substrate surface is 135 nm (by JSR Company). Lagging phase axis is 80°.

(4) VAC 70: Two axes film in which retardation of parallel direction to the substrate surface is 3 nm and retardation of vertical direction to the substrate surface is 154 nm (by Sumitomo Chemical Company). Lagging axis of parallel direction to the substrate surface is 80°.

(5) Liquid crystal element: VA mode

Here, items (2) and (3) are λ/4 plates of laminating type, and form λ/4 plates little in wavelength dispersibility as a whole by laminating with certain angle.

Items (3) and (4) are agreed in lagging axis of parallel direction to the substrate surface, and retardation of (3) is reduced by retardation portion of (4) to make the total retardation becomes a quarter of the highly visible green wavelength (540 nm). Item (4) is a phase difference plate having negative refractive index anisotropy arranged for compensating retardation of liquid crystal layer at applying no voltage, retardation of (1) dp·(nx+ny)/2−nz) becomes the following.

$$[dp \cdot \{(nx+ny)/2-nz\}]/(dlc \cdot \Delta n) = 0.51$$

In order to compare arrangement of VAC 70, the polarizing plate and the phase difference plate are arranged at CF side of the reflective liquid crystal element as shown in the following comparative example.

(1) Polarizing plate: Same as Embodiment 2-4
(2) VAC 70: Same as Embodiment 2-4
(3) λ/2 plate: Same as Embodiment 2-4
(4) λ/4 plate: Same as Embodiment 2-4
(5) Liquid crystal element: Same as Embodiment 2-4

In order to compare with the case of not applying the means of the invention, the polarizing plate and the phase difference plate are arranged at CF side of the reflective liquid crystal element as shown in the following conventional example 1.

(1) Polarizing plate: Same as Embodiment
(2) λ/2 plate: Same as Embodiment 2-4

(3) λ/4 plate: One axis film in which retardation of parallel direction to the substrate surface is 138 nm (by JSR Company). Lagging phase axis is 80°.

(4) Liquid crystal element: Same as Embodiment 2-4

In order to compare with TN mode proposed, the polarizing plate and the phase difference plate are arranged at CF side of the reflective liquid crystal element as shown in the following in the conventional example 2.

(1) Polarizing plate: Same as Embodiment 2-4

(2) λ/2 plate: One axis film in which retardation of parallel direction to the substrate surface is 260 nm (by JSR Company). Lagging phase axis is 25°.

(3) λ/4 plate: One axis film in which retardation of parallel direction to the substrate surface is 115 nm (by JSR Company). Lagging phase axis is 80°.

(4) Liquid crystal element: TN mode

Here, in the λ/4 plate of item (3), in order to compensate residual retardation of liquid crystal layer at applying voltage, lagging phase axis is agreed to composing vector of anchoring (rubbing) direction of liquid crystal layer, and retardation of parallel direction to the substrate surface is reduced 23 nm from the λ/4 plate of embodiment. Since residual retardation of liquid crystal layer enable to compensate becomes large when reducing retardation is made large, reflectance at black display can be made low. However, problems generate, such as reflectance is reduced because of lack of retardation of the phase difference plate at white display and white display is colored.

In the liquid crystal display element of item (4), horizontal alignment film (by JSR Company) is applied on the substrate surface, bonding is performed by spraying spacer of 3 μm diameter (by Sekisui Fine Chemical Company). Into the empty panel, liquid crystal (by Chisso Corporation) having positive dielectric anisotropy (Δε=6.0) being 0.067 in difference of refractive indexes Δn of extraordinary ray and ordinary ray is injected.

The reflective liquid crystal display devices of Embodiment 2-4, comparative example, the conventional examples 1 and 2 are applied with the same voltage, and reflectance of white display and black display by a spectral luminance meter using a light source of integrated sphere and a spot light source is measured. Here, the light source of integrated sphere is diffusion light in which light goes out to all angles and azimuths, and the spot light source is parallel light in which light goes out to particular angle and azimuth. The light source of integrated sphere is close to environment light such as room lighting and sunlight, and reflectance close to impression of looking at can be measured. On the other hand, the spot light source measures reflectance at particular angle and azimuth, and dependency of angle and azimuth of incident light can be measured. (Integrated value of reflectance at particular angle and azimuth measured using the spot light source becomes the reflectance measured by the light source of integrated sphere).

The result of measurement at using the light source of integrated sphere is shown in Table 2. Reflectance of black display becomes 0.29 (55% less in relative ratio with the conventional example 2) in the embodiment, and contrast ratio is improved to 37 (116% increase in the same condition). Although residual retardation of liquid crystal layer is compensated by reducing retardation of λ/4 plate in the conventional example 2, contrast ratio is about same as the conventional example 1 (reflective liquid crystal display device of vertical alignment compensating nothing). This shows that contrast ratio becomes high as principal because the reflective liquid crystal display device of VA mode using the λ/4 plate becomes black display when no voltage is applied. The result of measurement of the comparing example is not more than the same of the embodiment, it can be said that VAC 70 is desirable to arrange between the polarizing plate and the liquid crystal layer as shown in the embodiment.

TABLE 2

| | | Reflectance | | |
| | Alignment | Black display | White display | CR |
| --- | --- | --- | --- | --- |
| Embodiment | Vertical | 0.29 | 10.82 | 37.3 |
| Comparative example | Vertical | 0.45 | 10.63 | 23.6 |
| Conventional example 1 | Vertical | 0.60 | 11.05 | 18.4 |
| Conventional example 2 | Horizontal | 0.64 | 11.02 | 17.2 |

(Applying voltage)

| Black voltage: | 0 V at vetical alignment |
| | 4 V at horizontal alignment |
| White voltage: | 2.5 V at vetical alignment |
| | 0 V at horizontal alignment |

The result of measurement at using the spot light source is shown in Table 3. Angle of incident light θ is set to 30° considering tilt angle of the reflective plate used for the embodiment, and the measurement is performed from upper azimuth. Reflectance of black display becomes 0.56 (48% less in relative ratio with the conventional example 2) in the embodiment, and contrast ratio improves to 45 (92% increase in the conventional ratio).

TABLE 3

| | | Reflectance | | |
| | Alignment | Black display | White display | CR |
| --- | --- | --- | --- | --- |
| Embodiment | Vertical | 0.56 | 25.27 | 45.1 |
| Comparative example | Vertical | 0.70 | 25.14 | 35.9 |
| Conventional example 1 | Vertical | 0.90 | 25.45 | 28.3 |
| Conventional example 2 | Horizontal | 1.08 | 25.36 | 23.5 |

(Applying voltage)
Same as the above

The mode for carrying out is possible to apply for the reflection transmitting type liquid crystal display device having light transmitting area where the light reflective plate is partly not formed. The reflection transmitting type liquid crystal display device arranges a polarizing plate, for example, at TFT substrate side forming the diffusion reflective plate, and both TFT substrate and CF substrate side, a phase difference plate and a polarizing plate are arranged in order from the substrate surface for example. By guiding light from a back light unit, for example, to the light transmitting area, bright picture can be displayed even at dark place.

[A Third Mode for Carrying Out]

Next, the reflective liquid crystal display device according to the third mode for carrying out the invention will be described using FIG. 54 to FIG. 59B. The reflective liquid crystal display device takes in environment light such as room lighting and sunlight, and display is performed by reflecting at the reflective plate to observer side. Since the reflective liquid crystal display device does not need a back light unit, it is low in power consumption, and it is widely used for a portable terminal. In order to obtain clear display, device is needed, in which environment light is taken in much and is reflected to observer side in white display, and in black display, the light taken in is not reflected to observer side.

Then, phase transition type guest-host (GH) mode (D. L. White and G. N. Taylar: J. Appl. Phys. 45 4718 1974) is proposed as display mode used for the reflective liquid crystal display device. Although bright white display is obtained because the polarizing plate is needless, even black display becomes bright so that contrast ratio is about 5 to 6.

On the other hand, twisted nematic (TN) mode (see Japanese Patent Application No. 319261/1989 and Japanese Patent Laid-Open No. 011711/1994) using one sheet of a polarizing plate is proposed besides the mode. The mode is horizontally orientated type liquid crystal element making liquid crystal having positive dielectric contact anisotropy twist as principal, incident environment light (external light) is changed to linear polarized light at the polarizing plate, polarizing azimuth is rotated 90° with the liquid crystal layer or the phase difference plate having retardation of ¼ of visible light wavelength, and black display is performed by absorbing the linear polarized light with the polarizing plate. Although brightness of the mode is about 40% of GH mode because using the polarizing plate, contrast ratio is about 12 to 14 because black display can be made darker.

Technology is proposed that lagging phase axis of phase difference plate is almost agreed to anchoring azimuth of liquid crystal layer as means to improve contrast ratio of TN mode and black display is compensated by reducing retardation of the phase difference plate by retardation portion of the liquid crystal layer residual (see the above-mentioned Japanese Patent Laid-Open No. 311784/1999). By using the technology, contrast ratio improves to about 16 to 18.

Clarity of display at the reflective liquid crystal display device is provided with brightness and contrast ratio, when it is bright, it is clear even with low contrast ratio, and when it is dark, high contrast is required (Television Society Paper Vol. 50, No. 8, pp 1091 to 1095, 1996). Although about 12 of contrast ratio is need to realize clarity of display of GH mode with one sheet system of the polarizing plate being about 40% in brightness, contrast ratio of TN mode becomes about 16 to 18 by using the above-mentioned technology so as to become more clear than GH mode. As a result, in the reflective liquid crystal display device, TN mode using one sheet of polarizing plate becomes mainstream.

In the TN mode using one sheet of polarizing plate, rubbing treatment is performed at different azimuth in upper and lower substrates to make the liquid crystal layer a twist structure, and anchoring azimuths of liquid crystal layer do not agree at the upper and lower substrates. Although lagging axis of the phase difference plate is agreed to almost center axis of anchoring azimuth of the upper and lower substrates in the technology of the above-mentioned Japanese Patent Laid-Open No. 311784/1999, this compensates the composing vector of anchoring azimuth, but does not compensate retardation of the liquid crystal layer residual at the upper and lower substrates individually. Therefore, it is not enough as compensation of black display.

VA mode using one sheet of polarizing plate is proposed (see the above-mentioned Japanese Application No. 319261/1989). Although the VA mode is reversed as TN mode in switching condition (ON or OFF) of liquid crystal, the point that incident environment light is changed to linear polarized light at the polarizing plate, polarizing azimuth is rotated 90° with the liquid crystal layer or the phase difference plate having retardation of ¼ of visible light wavelength, and black display is performed by absorbing the light to the polarizing plate is the same. However, because the mode becomes black display when no voltage is applied in the case azimuth is rotated 90° at the phase difference plate, liquid crystal layer anchoring at boundary of the substrate does not remain like TN mode without switching, and contrast ratio can be made high as principle. However, because vertical alignment film is used in VA mode, vertical alignment falls partly by rubbing treatment, and it makes brightness irregular so as to generate sinewy display defect (rubbing sinew). By rubbing-treating the substrate forming uneven shape having reflectivity, liquid crystal is oriented with tilt and that contrast ratio falls.

As a result, the technology is proposed in Japanese Patent Laid-Open No. 29030/2000 that rubbing sinew is hard to see and fall of contrast ratio is depressed by performing rubbing treatment only on the substrate little in step difference to rubbing treatment. However in this technology, the point performing the rubbing treatment is same so as to generate rubbing sinew.

The technology is proposed in Japanese Patent Application No. 319261/1989 that a slit crossing a reflective electrode obliquely is arranged at facing substrate side and alignment control is performed by oblique electric field generating between upper and lower substrates when voltage is applied. However, in the technology, reflectance falls in whole of pixels because liquid crystal layer on the slit does not switch, and clarity of display is not so improved even if contrast ratio is high. Therefore, in order to apply the VA mode for the reflective liquid crystal display device of one sheet system of the polarizing plate, alignment control means not sacrificing reflectance is in need.

In the mode for carrying out, means performing alignment control without sacrificing reflectance in the liquid crystal display device sandwiching liquid crystal having negative dielectric anisotropy between a first substrate and a second substrate forming unevenness having reflectivity on the surface is provided.

(First Solving Means)

In the reflective liquid crystal display device providing a second substrate arranged facing a first substrate and forming a reflective plate, reflective surface thereof is uneven shape, and liquid crystal sealed between the first and second substrates and having negative dielectric anisotropy, the device further has an alignment control structure (line shape projection or slit removing electrode) formed at corresponding area on the first substrate facing a gap portion between adjacent pixel electrode (the above-mentioned reflective plate serves) on the second substrate, and liquid crystal alignment in the pixel is made almost mono-domain alignment.

Figure 54:
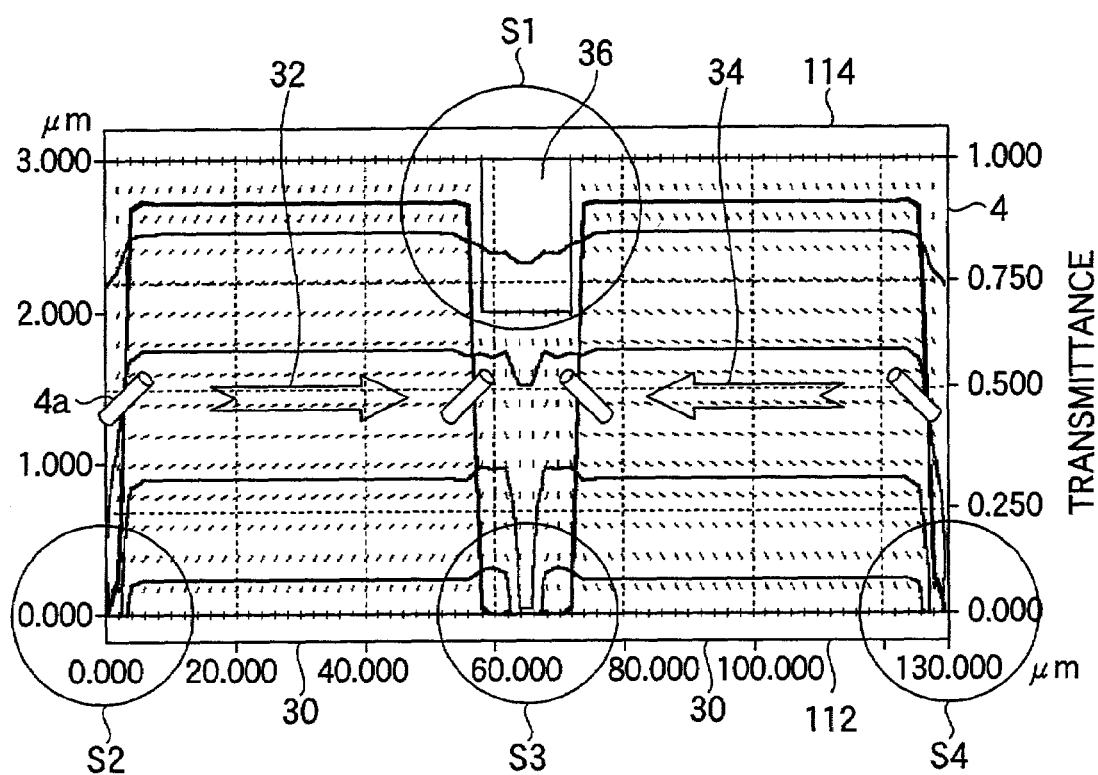
FIG. 54 is a model view describing first solving means according to a third mode for carrying out the invention.

FIG. 54 is a model view describing the first solving means. FIG. 54 shows liquid crystal panel cut of f to vertical direction to panel surface. In the figure, horizontal direction represents position (μm) from standard position of a substrate 112, and vertical scale of left side in the figure represents height (μm) to a substrate 114 from the substrate 112. Vertical scale of right side in the figure represents transmittance (a. u.), and a curve of solid line in the figure shows transmittance change of every voltage applied. Minute line in the figure represents director of liquid crystal molecules 4a when certain voltage is applied. Pixel electrodes 30 are formed on the substrate 112, a gap potion is formed at area surrounded by circles S2, S3, and S4 of FIG. 54. An alignment control structure (projection) 36 is formed just on the gap portion surrounded by circle S3 on the substrate 114. As shown with arrow in the figure, liquid crystal molecules 4a tilt to direction of arrow signs 32 and 34 when voltage is applied.

As shown in FIG. 54, because there is no reflective plate at gap portion between adjacent pixel electrodes 30, reflectance is not sacrificed by forming an alignment control structure 36 at area facing the gap portion and performing alignment control. That is, alignment of liquid crystal molecules 4a in the pixel electrodes 30 can be made mono-domain alignment by controlling oblique electric field so that domain boundary does not generate in the pixel electrodes 30 using the alignment control structure 36. Concrete control method of oblique electric field will be shown in second solving means.

(Second Solving Means)

Figure 55:
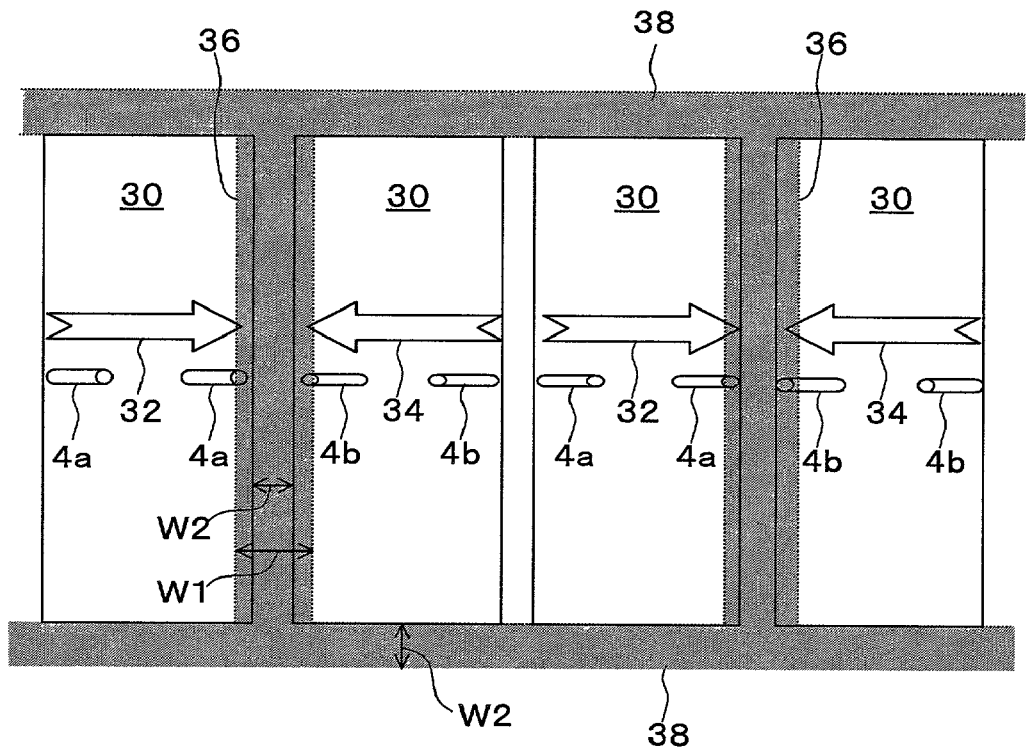
FIG. 55 is a view showing an alignment control structure in Embodiment 3-1 viewing to normal direction of surface of substrate according to the third mode for carrying out the invention.

In the first solving means, alignment control structures are formed at every other one pixel electrode at corresponding area on the first substrate facing the gap portion of pixel electrode long side, the structure contacts adjacent two long sides of pixel electrodes or overlaps viewing to normal direction of the substrate surface. The construction according to the solving means is shown in FIG. 55. FIG. 55 shows the state viewing the alignment control structure 36 at normal direction of the substrate surface. FIG. 55 shows the state applying voltage to a liquid crystal layer 4, and shows the state that liquid crystal molecules 4a and 4b on the pixel electrodes 30 tilt to directions of arrow signs 32 and 34 facing to the alignment control structures 36 positioning at upper position of gap between the pixel electrodes 30. As shown in FIG. 55, gap width between the pixel electrodes 30 is W2, and pattern width of the alignment control structure 36 of long side of the pixel electrodes 30 is W1.

In the second solving means, liquid crystal is oriented to azimuth different in almost 90° to long side of the pixel electrode using oblique electrical field generating at the gap portion between pixel electrode 30 while applying voltage, and oblique electric field generating at the gap portion between adjacent pixel electrodes is eliminated by the alignment control structure 36 formed at corresponding area on the first substrate. Desirably, by changing tilt azimuth of electric field, liquid crystal alignment in the pixel electrodes is made mono-domain alignment, and domain boundary is fixed at the gap portion between pixel electrodes 30.

Incidentally, when the alignment control structure is not formed at the gap portion between the pixel electrodes, domain boundary by reverse tilt generates in the pixel electrodes because liquid crystal performs tilt orientation to inside of the pixel electrodes. Although domain boundary is not conspicuous by making incident light to the liquid crystal a circularly polarized light using a phase difference plate having retardation of almost ¼ of visible light wavelength, light scatters or is refracted so as to give rough feeling by oblique viewing angle because the liquid crystal differs from surrounding liquid crystal in refractive index at the area.

The reason that the alignment control structure 36 is formed at the gap portion of long side of the pixel electrode 30 is to make distance to the gap portion adjacent to the alignment control structure 36 as short as possible so as to have good responsibility. That is, although liquid crystal alignment propagates from area generating oblique electric field to area not generating at alignment control by oblique electric field, response time that liquid crystal alignment is put in order almost uniformly becomes long when propagating distance becomes long. Since pixel electrode constructs one pixel (pixel) with three color sub-pixels of R (red), G (green), and B (blue), the electrode is a rectangle of almost 3:1 in ratio of length and breadth, and propagating distance can be made ⅓ in the case of short side of the pixel electrode 30 by performing alignment control using oblique electric field generating at the gap portion of long side of the pixel electrode 30.

The reason that the alignment control structure 36 formed at corresponding area of the first substrate contacts adjacent two long sides of the pixel electrode 30 or desirably overlaps is that oblique electric field generating at the gap portion between the pixel electrodes 30 is eliminated with the alignment control structure 36 or desirably tilt azimuth of electric field is changed. The reason that the alignment control structures 36 are formed at every other one pixel electrode 30 is to orient liquid crystal to azimuth different in almost 180° between adjacent pixel electrodes 30. That is, although a common electrode is formed at corresponding area of the first substrate facing the gap portion if the pixel electrodes 30, viewing normal direction of the substrate surface, liquid crystal in the pixel electrodes 30 become mono-domain alignment because the alignment control structures 36 contact long sides of adjacent two pixel electrodes 30 or liquid crystal molecules are oriented with tilt to external side of the pixel electrodes 30 and not to internal side desirably when the structures are overlapped. However, when azimuth of mono-domain alignment are made same at area of all pixel electrodes 30, increase and decrease of retardation at tilt azimuth and the reverse azimuth of liquid crystal molecules becomes large so that viewing angle dependency becomes large. Then, by aligning liquid crystal of adjacent pixel electrodes 30 to azimuth different in 180° so as to perform two domain orientations at area of adjacent two pixel electrodes 30, increase and decrease of retardation at applicable azimuth is made average so as to realize clear display at all azimuths.

(Third Solving Means)

In the second solving means, width W1 of alignment control structure is generally within the following range:

$$1 \leq (W1/W2) \leq 3$$

In order to eliminate oblique electric field generating at the gap portion between the pixel electrodes 30 with the alignment control structures 36 or desirably tilt azimuth of electric field is changed, it is necessary that the alignment control structures 36 is contacted long side of the pixel electrodes 30 or desirably overlapped viewing normal direction of the substrate surface by making width W1 of the alignment control structures 36 which is equal to or more than gap width W2 of long side of the pixel electrodes 30.

As shown in FIG. 55, reflectance falls because the alignment control structures 36 extends in the pixel electrodes 30 when width W1 is too large. By examining the fall of reflectance varying overlapping quantity, when gap width W2 between the pixel electrodes 30 is set to 6 μm and the alignment control structures 36 are formed for the facing area, the falls of reflectance of 2% at overlapping quantity 2 μm, 3% at 4 μm, and 4% at 6 μm are proved. Since the fall is of a degree that difference is not distinguished as viewing sense when fall of reflectance is less than 5%, it is desirable that width W1 is generally set to the above-mentioned range at overlapping the alignment control structures 36 to long sides of adjacent two pixel electrodes 30. Here, the reason that range of width W1 is provided with ratio of the gap width W2 is that area generating oblique electric field by length of the gap width W2 between the pixel electrodes 30 is different, following it, it is necessary to change width W1 of the alignment control structures 36.

(Fourth Solving Mean)

Figure 56:
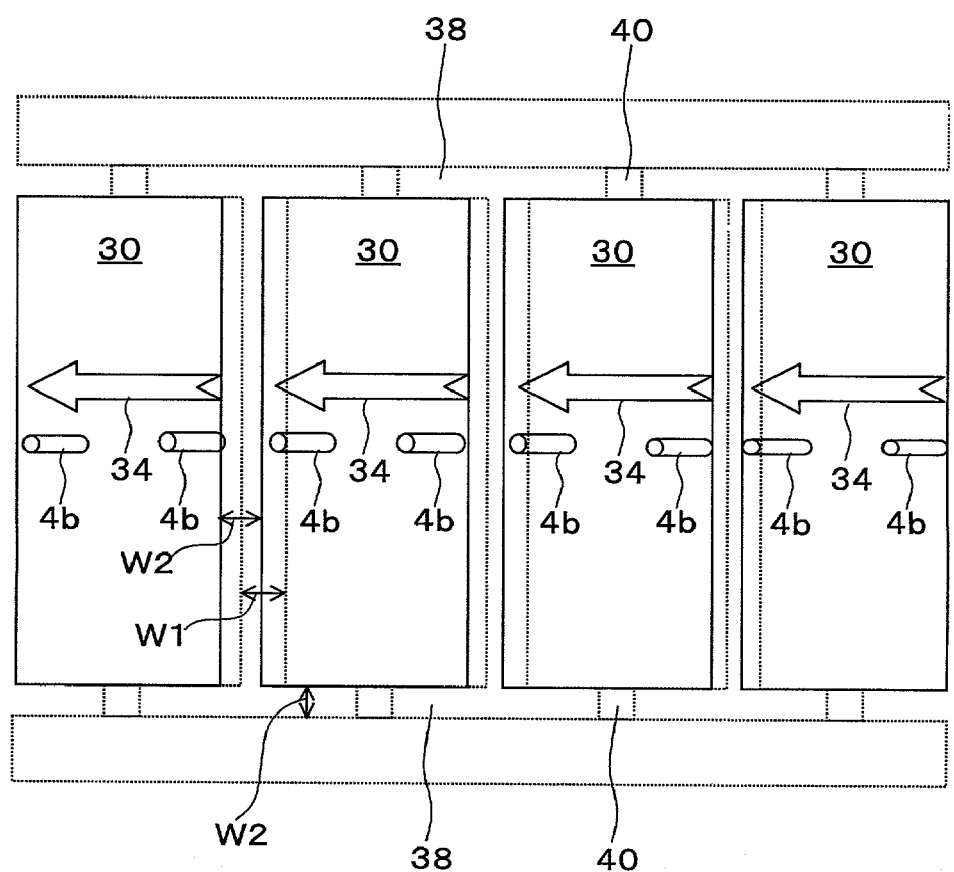
FIG. 56 is a view showing a structure of fourth solving means according to the third mode for carrying out the invention.

In the first solving means, alignment control structures are formed at every other one pixel electrode at corresponding area on the first substrate facing the gap portion of pixel electrode long side, the structure contacts adjacent two long sides of pixel electrodes or overlaps viewing to normal direction of the substrate surface. The construction according to the solving means is shown in FIG. 56. FIG. 56 shows the state viewing the alignment control structure 36 to normal direction of the substrate surface. FIG. 56 shows the state when applying voltage to a liquid crystal layer 4, and shows the state that liquid crystal molecules 4b on the pixel electrodes 30 tilt to directions of arrow sign 34 facing to the alignment control structures 36 positioning at upper position of gap between the pixel electrodes 30. As shown in FIG. 56, gap width between the pixel electrodes 30 is W2, and pattern width of the alignment control structure 36 of long side of the pixel electrodes 30 is W1.

By contacting long side of adjacent one pixel electrode 30 with the alignment control structure 36 or desirably overlapping, tilt azimuth of oblique electric field only at the gap portion of long side of one pixel electrode 30 is reversed. By forming this similarly at every pixel electrode 30, mono-domain alignment not having domain boundary is realized at all of the area because tilt azimuths of oblique electric field are almost put in order at the gap portion between all pixel electrodes 30. Although mono-domain alignment becomes large in viewing angle dependency at tilt azimuth and the reverse azimuth, increase and decrease of retardation are little at azimuth different in 90° from tilt azimuth so that viewing angle dependency is little. It is possible to select such mono-domain alignment in the case that there is not a problem at practical use when viewing angle dependency is little at certain azimuth even if display of particular azimuth (tilt azimuth) is hard to see such as use for note type personal computer.

(Fifth Solving Means)

In the fourth solving means, width W1 of alignment control structure is generally within the following range:

$$1/2 \leq (W1/W2) \leq 3/2$$

Different point with the second solving means is the point that the alignment control structures 36 is contacted long side of the pixel electrodes 30 or desirably overlapped viewing to normal direction of the substrate surface. As a result, only half of the alignment control structure 36 may be formed as border at center line of the gap portion between the pixel electrodes 30 so that range of width W1 is about half of the second solving means.

(Sixth Solving Means)

In the first solving means, the alignment control structures of about gap width are formed at every picture electrode at corresponding area facing to the gap portion of short side of the pixel electrode among the corresponding area on the first substrate.

Because oblique electric field generates even at the gap portion of short side of the pixel electrodes 30, it is desirable to eliminate oblique electric field by forming an alignment control structure 38 even at corresponding area facing to this as shown in FIG. 55 and FIG. 56. Although it is desirable that width W1 of an alignment control structure 36 is made large to degree that oblique electric field of reverse azimuth generates at the gap portion of long side of the pixel electrode 30 and domain boundary is made stable at the gap portion between the pixel electrode 30, oblique electric field of the facing gap portion may be eliminated at the gap of short side of the pixel electrode 30, and it is not desirable because oblique azimuth of reverse azimuth generates when the width is made large to a degree overlapping to short side of the pixel electrode 30 so as to generate domain boundary.

(Seventh Solving Means)

In the first solving means, an alignment control structure supports between a first and second substrates by having height corresponding to layer thickness of liquid crystal layer in at least a part of the structure or forming a projection corresponding to layer thickness of the liquid crystal layer on the structure. A column shape spacer 40 is shown in FIG. 56.

When the substrate is supported using the alignment control structures 36 and 38, spacer is removed from inside of the pixel electrode 30 so that reflectance improves because spacer spraying is needless. Although it is difficult to control thickness of liquid crystal layer 4 to desired thickness when spacer is sprayed equally to the substrate forming unevenness and the alignment control structures 36 and 38 on the surface, standard surface is made almost equal by using the alignment control structures 36 and 38 so as to control thickness of liquid crystal layer 4 easily.

(Eighth Solving Means)

In the first solving means, a second alignment control construction of almost parallel to short side of pixel electrodes and having width 4 μm or less is formed adjacent to an alignment control construction of corresponding area on upper side of gap portion of long side of the pixel electrode at a second corresponding area on a first substrate facing to the pixel electrode.

Figure 57:
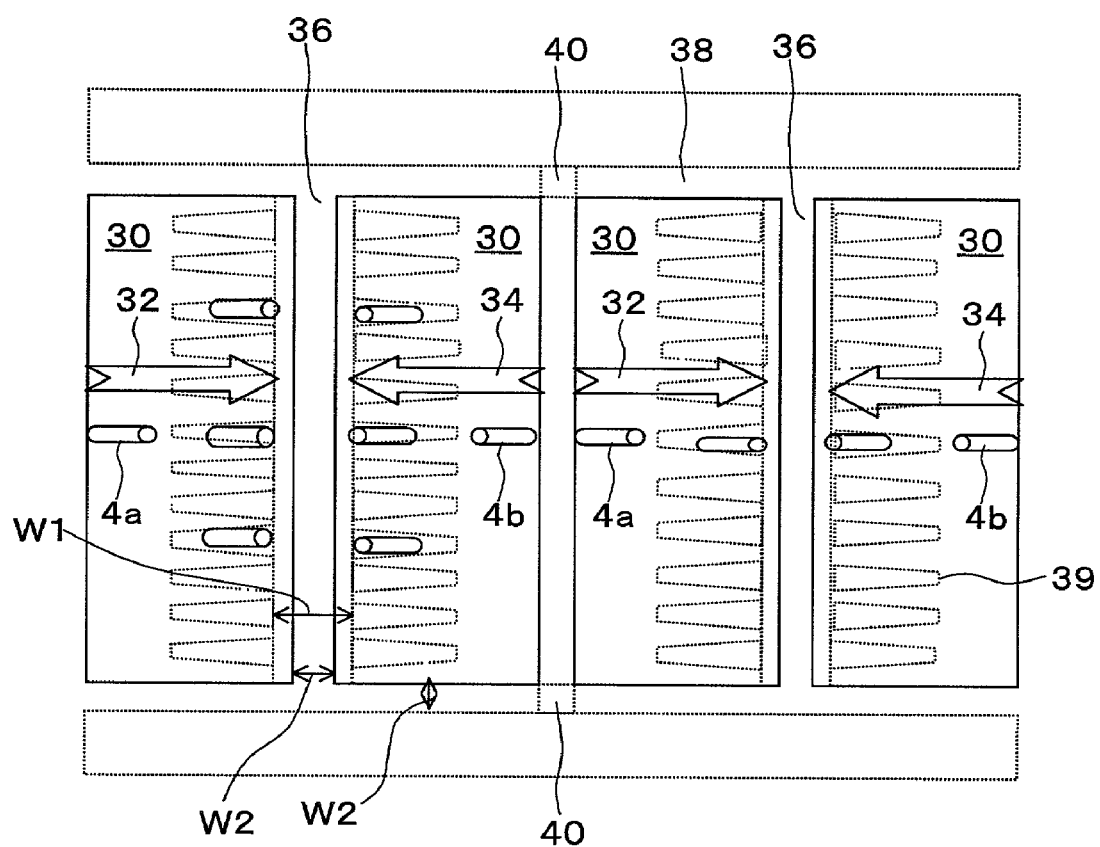
FIG. 57 is a view showing a structure of eighth solving means according to the third mode for carrying out the invention.

When alignment control is performed using oblique electric field of the gap portion of long side of the pixel electrode 30, it is necessary to propagate liquid crystal alignment for distance of short side of the pixel electrode 30, response speed becomes slow comparing with all surface alignment treatment such as rubbing treatment. Then, response speed can be improved by forming a second alignment control structure 39 almost parallel to short side of the pixel electrode 30 and having width of 4 μm or less being adjacent to the alignment control structure 36 of corresponding area on upper side of the gap portion of long side of the pixel electrode 30 at the second facing area facing to the pixel electrode 30 of the first substrate as shown in FIG. 57 because providing power aligning liquid crystal to almost parallel azimuth to short side of the pixel electrode 30 generates even on the pixel electrode 30. That is, although width W1 is large to a degree that liquid crystal orients with tilt at oblique electric field generating between upper and lower substrates in the alignment control structure 36 of upper side of the gap portion of long side of the pixel electrode 30, liquid crystal does not orient at oblique electric field generating between upper and lower substrates, and liquid crystal orients with tilt by distortion of electric field generating to parallel azimuth to the second alignment control structure 39 because width of the second alignment control structure 39 is narrow with 4 μm or less. The reason that the second alignment control structure 39 is formed being adjacent to the alignment control structure 36 on upper side of the gap portion of long side of the pixel electrode 30 is that tilt orientation of liquid crystal is fixed to any one azimuth among almost parallel to short side of the pixel electrode 30 and mono-domain alignment is realized.

Since liquid crystal molecules is oriented to parallel azimuth to the structure in the second alignment control structure 39, upper side of the second alignment control structure 39 contributes to reflectance. That is, reflectance falls because liquid crystal molecules 4a and 4b of center portion of oblique electric field is hard to orient with tilt in tilt orientation using oblique electric field generating between the upper and lower substrates. However, when only tilt azimuth of liquid crystal provided in tilt orientation using distortion of electric field generating in the substrate surface, reflectance does not fall because liquid crystal on the second alignment control structure 39 orients with tilt to almost equal azimuth. Whether liquid crystal molecules 4a and 4b orient to scanning azimuth to the alignment control structures 36 and 39 or orient to azimuth different 90° depends on width of the alignment control structures 36 and 39, and liquid crystal orients to almost scanning azimuth at 4 μm or less.

(Ninth Solving Means)

In the first solving means, a second alignment control construction (slit for example) of almost parallel to short side of pixel electrodes and having width 4 μm or less is formed adjacent to long side of the pixel electrode on the pixel electrode.

The similar effect is expected by forming a second alignment control construction 29 similar to the eighth solving means on the pixel electrode 30. Especially, although at forming an alignment control slit on the pixel electrode 30, the slit does not contribute to reflectance because reflective plate is removed at the area, the reflection-transmission type liquid crystal display device can be realized by using the area as light transmitting area. Although the reflection-transmission type liquid crystal display device perform display of transmission type by forming transmitting window on reflective electrode, switching of liquid crystal is possible without forming transparent electrode at transmitting area by using the second alignment control slit for transmitting window. Since oblique electric field aligning liquid crystal with tilt does not generate at boundary portion of reflective area, it is possible to make liquid crystal alignment almost mono-domain alignment in the pixel electrode.

(Tenth Solving Means)

In the eighth and ninth solving means, a second alignment control structure (line shape projection or slit) has almost triangle or almost rectangle viewing to normal direction of the substrate surface, and is formed continuously at almost same intervals.

By making plane shape of second alignment control structure almost triangle or almost rectangle, azimuths that liquid crystal orients with tilt are put in order to almost same azimuths in the gap portion between the pixel electrodes and the pixel electrodes. Since directivity generates in distortion of electric field of direction in the substrate surface in almost triangle, liquid crystal orients with tilt to tapering-off azimuth of almost triangle. Therefore, it is desirable to make plane shape almost triangle in order to orient the liquid crystal in the pixel electrodes almost the same azimuth. However, in the case that patterning is difficult in almost triangle and alignment control slit is used for transmitting window such as the reflection-transmission type liquid crystal display device, almost rectangle may be used.

By forming continuously the second alignment control structure at almost same interval, response speed can be improved efficiently because the second alignment control structures are formed closely in the pixel electrode.

(Eleventh Solving Means)

In the first solving means, liquid crystal has high polymer chain based on liquid crystal alignment formed by photopolymerizing the photopolymerization material while applying voltage dispersing the material. By forming high polymer chain high in compatibility with liquid crystal to azimuth that liquid crystal orients with tilt, response speed is improved because response of liquid crystal is made fast by compatible force with high polymer chain.

Since electric field that liquid crystal orients with tilt does not generate without applying voltage in some degree in alignment control using electric field, change of reflectance to voltage applied becomes sharp so that control of gradation display becomes difficult. However, by using the construction, change of reflectance to voltage applied become slow so that control of gradation display is easy because liquid crystal in the condition can easily aligning with tilt by compatible force with high polymer chain.

(Twelfth Solving Means)

The structure is provided only on the first substrate, and an alignment control means having alignment regulating force which is equal to or more than that of oblique electric field generating at the gap portion between adjacent pixel electrodes on the second substrate is provided, thereby liquid crystal alignment in the pixel electrodes is made almost mono-domain alignment.

By performing alignment control means having alignment regulating force which is equal to or more than that of oblique electric field generating at the gap portion between pixel electrodes overall area, oblique electric field is negated and liquid crystal alignment in the pixel electrodes can be made almost mono-domain alignment. However, it is difficult to perform almost uniform alignment treatment at overall area because the second substrate forms unevenness having reflectivity on the surface. That is, the alignment control means having alignment regulating force which is equal to or more than that of oblique electric field has function mainly increasing anchoring energy with boundary surface of alignment so that pre-tilt angle of liquid crystal is reduced. Although its reduction is insignificant at the first substrate, at the second substrate, liquid crystal is easy to orient with tilt because liquid crystal previously tilts for tilt angle of unevenness so that reduction of pre-tilt angle becomes large. As a result, retardation generates at black display, and contrast ratio is reduced.

Then, by performing alignment control means having alignment regulating force which is equal to or more than that of oblique electric field generating at the gap portion between the pixel electrodes only at the first substrate and by performing nothing at the second substrate, and the second substrate is hollowed alignment regulating force of the first substrate. The second substrate easily follows alignment regulating force of the first substrate because liquid crystal is in the condition easily aligning with tilt at the second substrate.

(Thirteenth Solving Means)

Liquid crystal is oriented to arbitrary azimuth by light-reforming alignment film only at the first substrate. The reason for light-reforming alignment film only at the first substrate is that control of light reforming is difficult except the above-mentioned reason. That is, in the technology, light irradiation is performed from arbitrary azimuth to the alignment film, alkyl side chains of the alignment film tilted to random azimuth are put in order to arbitrary azimuth, and liquid crystal orients with tilt to the azimuth. However, in the substrate forming unevenness having reflectivity at the surface, it is difficult to put in order alkyl side chains of the alignment film to arbitrary azimuth by reflective light or surface shape so that it is difficult to obtain uniform mono-domain alignment.

On the other hand, only CF layer is formed on surface of the first substrate, but reflective plate and unevenness are not formed. As a result, it is easy to put in order alkyl side chains of the alignment film to arbitrary azimuth.

(Fourteenth Solving Means)

Liquid crystal sealed between the first and second substrates and having negative dielectric anisotropy has azimuth angle dependency in reflective strength by uneven plane shape, and alignment azimuth of liquid crystal is intersected at almost right angles to azimuth of local maximum of reflective strength.

In the reflective liquid crystal display device forming unevenness having reflectivity on the surface, design is performed so that obliquely incident light outgoes vertically in order to reflect more environment light to observer side. Although black display is performed at the condition that liquid crystal orients vertically in VA mode, however, the retardation of the oblique incidence light influences the reflected light in the vertical direction, it is necessary to eliminate it with phase difference plate having negative retardation in order to obtain complete black display.

Light path becomes reversed by observing from oblique direction to panel surface and not from vertical direction, and vertical incident light outgoes obliquely. Here, when liquid crystal orients with tilt, by observing from azimuth of tilt orientation, that is, by observing from angle (outgoing angle obtained from tilt angle and refractive index of liquid crystal and air) almost agreeing tilt angle optically, retardation generating at oblique outgoing becomes almost zero, and negative retardation becomes large for the zero so that float of black brightness is conspicuous. In this case, although retardation generates at vertical incidence, negative retardation becomes large because optical path length is shorter than oblique incident light length. The float of black brightness does not generate because increase and decrease of retardation by tilt angle are canceled out by tilt azimuth and obliquely incident component from reverse azimuth observing from vertical direction. Therefore, it is not desirable to set local maximum of reflectance strength to azimuth of tilt orientation in mono-domain because the float of black brightness is conspicuous.

Then, by setting local maximum of reflectance strength to azimuth different in 90° to azimuth that liquid crystal orients with tilt, black brightness is inconspicuous because azimuth with little in viewing angle dependency is bright and large part of dependency is dark. In the case that directivity of reflective strength by uneven shape becomes azimuths of upper and lower, and right and left direction, local maximum of one reflective strength agrees azimuth of tilt orientation of liquid crystal when local maximum of reflective strength is set to azimuth different in 90° to azimuth that liquid crystal orients with tilt. However, the azimuth may be arranged at not observing side (keyboard side for example) from oblique direction if possible.

According to the mode for carrying out, in the reflective liquid crystal display device of vertical alignment mode using one sheet of the polarizing plate, alignment control is possible without sacrificing reflectance. As a result of that, the reflective liquid crystal display device in which contrast ratio is high and display is clear can be produced with good yield.

The reflective liquid crystal display device according to the mode for carrying out will be concretely described below using embodiments.

EMBODIMENT 3-1

Uneven shape having reflectivity on the surface is formed on the substrate surface as the following. First, positive type resist (made by Shipray Far East) is spin-coated about 3 µm thickness to form resist layer on the TFT substrate. Next, after 30 minutes of pre-baking at 90° C., the resist layer is half-exposed, post baking of 40 minutes at 135° C., and final baking of 60 minutes at 200° C. are performed so as to form uneven shape. After that, Al film is deposited at whole surface of the substrate, a reflective electrode (being the pixel electrode and serving the diffusion reflective plate) is formed by peeling Al film off except the pixel electrode using photolithography technique.

The alignment control structure is formed on the substrate surface as the following. First, the above-mentioned positive type resist is spin-coated about 3 µm thickness to form resist layer on the facing substrate. Next, after 30 minutes of pre-baking at 90° C., the alignment control structures pattern contacting long sides of two long sides of pixel electrodes or overlapping viewing to normal direction of the substrate surface are formed at every other one pixel electrode at corresponding area facing the gap portion of pixel electrode long side, and the alignment control structures pattern of the same dimension as the gap portion at area facing the gap portion of pixel electrode short side is exposed using a mask formed at every pixel electrodes.

The structure of the embodiment will be described using FIG. 55 again. FIG. 55 shows the state applying voltage to a liquid crystal layer 4, and shows the state that liquid crystal molecules 4a and 4b on the pixel electrodes 30 tilt to directions of arrow signs 32 and 34 facing to the alignment control structures 36 positioning at upper position of gap between the pixel electrodes 30. As shown in FIG. 55, gap width W2 between the pixel electrodes 30 is 6 µm at both of long side and short side of the pixel electrode 30, pattern width W1 of the alignment control structure 36 of long side of the pixel electrodes 30 is 6 to 18 µm, and overlapping quantity of the long side of the pixel electrodes 30 and the alignment control structure 36 is 0 to 6 µm. Next, half-exposure is performed using a mask forming dot shape pattern for supporting the substrates at area on pattern of the alignment control structure 36. Here, the reason half-exposing is that height of the alignment control structure 36 except area supporting the substrate is made less than thickness equal to liquid crystal layer and that the alignment control structure 36 disturbs injection of liquid crystal when whole structure is made thickness equal to liquid crystal layer. However, there is no limit when bonding the substrates and injection of liquid crystal are performed in a lump such as drop injection, and the alignment control structure 36 having thickness equal to liquid crystal layer at whole thereof does not disturb injection of liquid crystal.

Although the substrate is supported using a part of the alignment control structure in the embodiment, the substrate may be supported by forming a projection, total height of which is equal to layer thickness of liquid crystal layer.

Next, developing treatment, post exposure, post-baking of 2 minutes at 130° C., and final baking of 60 minutes at 220°

C. are performed, thereby the alignment control structure and supporting column are formed.

A matter (conventional example) performing rubbing treatment without forming the alignment control structure on the facing substrate is formed.

Next, vertical alignment film (by JSR Company) is applied on surface of TFT substrate and facing substrate, and spacer (by Sekisui Fine Chemical Company) of 3 μm diameter is sprayed so as to bond both for the conventional example performing rubbing treatment. Liquid crystal (made by Merck Japan Company) having negative dielectric anisotropy (Δϵ=−7.0) and being 0.1 in difference of refractive indexes (refractive index anisotropy) An of extraordinary ray and ordinary ray is injected so as to obtain the reflective liquid crystal display device.

A negative phase difference film in which retardation of thickness direction is about 150 nm, a phase difference plate having retardation of almost ¼ of visible light wavelength, and a polarizing plate are laminated in order at facing substrate side of the reflective liquid crystal display device. Reflectance at whole white display and whole black display is measured from normal direction of the substrate using integrated sphere light source, and contrast ratio is obtained. Alignment observation is performed using linear polarizer and circle polarizer.

The results are shown in Table 4 and FIG. 58A to FIG. 58F.

Figure 58A:
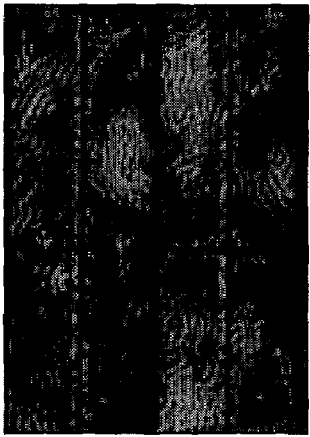
Figure 58B:
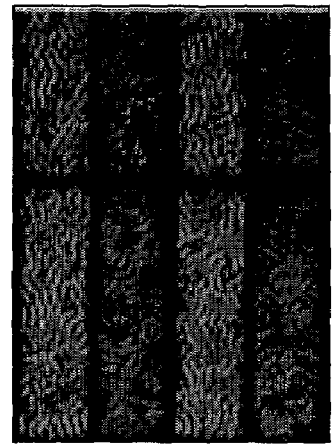
Figure 58C:
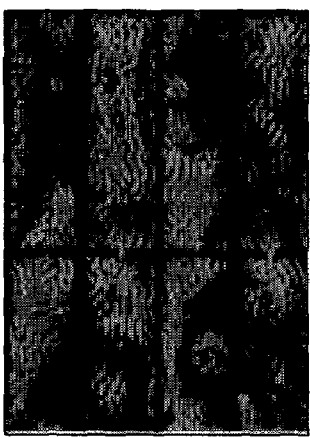
Figure 58E:
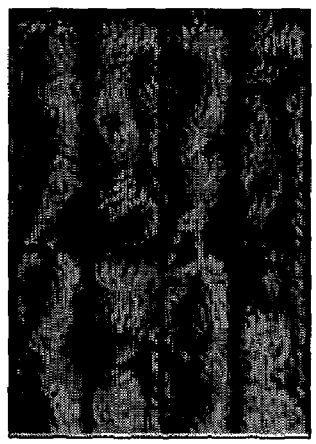
Figure 58F:
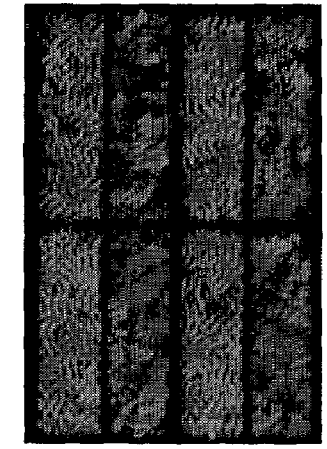

FIG. 58A to FIG. 58F show pictures observed at alignment observation. In FIG. 58A to FIG. 58F, FIG. 58A and FIG. 58B are pictures at Embodiment 1A in the case of W1/W2=1.0, FIG. 58C and FIG. 58D are pictures at Embodiment 1B in the case of W1/W2=1.7, and FIG. 58E and FIG. 58F are pictures at Embodiment 1C in the case of W1/W2=2.3. FIG. 58A, FIG. 58C, and FIG. 58E are observation results using linear polarizer, and FIG. 58B, FIG. 58D, and FIG. 58F are observation results using circle polarizer.

In the case that width W1 of the alignment control structure and gap width W2 are the same (Embodiment 1A), although whole white reflectance become higher than the conventional rubbing-treated example for that there is no spacer in the pixel electrodes, when width of the alignment control structure is made large, the reflectance gradually falls so as to become the same degree (Embodiments 1B to 1D). Since whole black reflectance becomes large a little with it, contrast ratio gradually falls. This is because overlapping quantity of the alignment control structure and long side of the pixel electrode becomes large, whole white reflectance falls a little because retardation near long side of the pixel electrode is reduced for thickness of the alignment control structure, and whole black reflectance increases a little because liquid crystal near long side of the pixel electrode orients with tilt by the alignment control structure.

By arranging the linear polarizer with tilt 45° to short side of the pixel electrode, uniform black display is obtained if liquid crystal is arranged uniformly to azimuth of short side of the pixel electrode. Here, the case that alignment direction of liquid crystal is shifted from azimuth of short side of the pixel electrode at greater part of area so as to remove light is shown with symbol x, the case that alignment direction of liquid crystal is shifted from azimuth of short side of the pixel electrode at about half of area so as to remove light is shown with symbol Δ, and the case that alignment direction of liquid crystal agrees with azimuth of short side of the pixel electrode at greater part of area so that removing light is little is shown with symbol ○. The circle polarizer is arranged to arbitrary azimuth because of no azimuth angle dependency, the case that dark line by domain boundary and uneven feeling at oblique viewing angle exist is shown with symbol x, and the case that they do not exist is shown in symbol ○.

As the width of the alignment control structure is made larger, removing light is reduced at aligning condition viewed with linear polarizer, aligning direction of liquid crystal agrees with azimuth of short side of the pixel electrode. Aligning condition viewed with circle polarizer is good independently of width of the alignment control structure, large dispersion causing reverse tilt is not generated even if aligning direction disperses when the alignment control structure is formed at an area where the alignment control structure corresponds to the gap portion between the pixel electrodes. However, although a domain boundary is not generated by the combination with a circle polarizer when the width of the alignment control structure is the width of the gap or more, the aligning direction of liquid crystal disperses considerably, thereby a large dispersion causing reverse tilt results at the generation of a position shift in bonding the substrates. Therefore, it is desirable to make width of the alignment control structure for a position larger in an actual process, and it is desirable that a width W1 of the alignment control structure is set to the following range because reduction of reflectance is reduced to the same degree as a rubbing treatment when W1/W2 is 3 or less.

$$1 \leq W1/W2 \leq 3$$

On the other hand, rubbing sinew generates in the conventional example, and contrast ratio falls by whole black reflection for the rubbing sinew.

TABLE 4

|  | W1/W2 | Whole white Reflectance | Whole black Reflectance | CR | Linear polarized light | Circular polarized light | Display defect |
| --- | --- | --- | --- | --- | --- | --- | --- |
| Embodiment 1A | 1.0 | 11.3% | 0.25% | 45.2 | x | ○ | No |
| Embodiment 1B | 1.7 | 11.1% | 0.25% | 44.4 | Δ | ○ | No |
| Embodiment 1C | 2.3 | 11.0% | 0.27% | 40.7 | ○ | ○ | No |
| Embodiment 1D | 3.0 | 10.9% | 0.30% | 36.3 | ○ | ○ | No |
| Conventional example | — | 11.0% | 0.35% | 31.4 | ○ | ○ | Rubbing sinew |

EMBODIMENT 3-2

Unevenness having reflectivity is formed on the TFT substrate by the same technique as Embodiment 3-1. Alignment control slit is formed on the substrate surface as the following. First, the above-mentioned positive type resist is spin-coated about 1.5 μm thickness to form resist layer on the facing substrate. Next, after 30 minutes of pre-baking at 90° C., the alignment control slit pattern contacting long side of adjacent one pixel electrode or overlapping is formed at every pixel electrode at facing area to the gap portion of long side of the pixel electrode, and exposure is performed using a mask forming the alignment control slit pattern of the same dimension as the gap width at facing area to the gap portion of short side of the pixel electrode at every pixel electrode. Gap width W2 between the pixel electrodes is 6 μm at both of long side and short side of the pixel electrode, pattern width W1 of the alignment control structure of long side of the pixel electrodes is 3 to 9 μm, and overlapping quantity of the long side of the pixel electrodes and the alignment control structure is 0 to 6 μm. Here, end side of alignment control structure is put at center line of the gap portion of the pixel electrode. Next, development treatment, post-exposure, post-baking of 2 minutes at 130° C., peeling the ITO film, and peeling the resist layer are performed in order so as to form alignment control slit.

Next, applying vertical alignment film on surface of TFT substrate and facing substrate, spacer of 3 μm diameter is sprayed so as to bond. The reflective liquid crystal display device is produced similarly as the first solving means, and similar measurement and observation are performed.

The result is shown in Table 5. In the case that width of the alignment control structure is half of the gap width (Embodiment 2A), although the whole white reflectance is same as the conventional rubbing-treated example, when width of the alignment control structure is made large, the reflectance gradually falls (Embodiments 2B to 2D). Since the whole black reflectance does not change, decrease in contrast ratio is little. This is because overlapping quantity of the alignment control structure and long side of the pixel electrode becomes large, whole white reflectance falls a little because area generating oblique electric field near long side of the pixel electrode becomes wide, and whole black reflectance does not change because liquid crystal near long side of the pixel electrode does not orient with tilt when no voltage is applied. Alignment condition is same as Embodiment 3-1, as width of the alignment control structure is made larger, removing light is reduced at aligning condition viewed with linear polarizer, aligning direction of liquid crystal agrees with azimuth of short side of the pixel electrode. It is desirable to make width of the alignment control structure larger by position shift portion in actual process, it is desirable that width W1 of the alignment control structure is set to the following range because reduction of reflectance is less than 5%, the degree in which difference of them is not distinguished as viewing sense when W1/W2 is 1.5 or less.

$$0.5 \leq W1/W2 \leq 1.5$$

EMBODIMENT 3-3

Figure 59A:
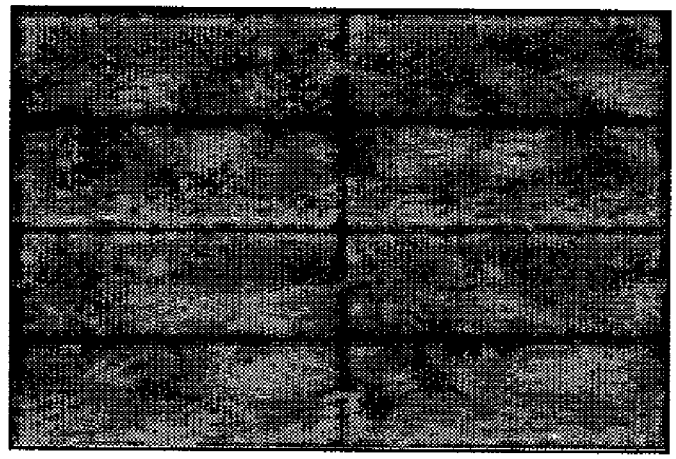
FIGS. 59A and 59B are views showing observed pictures obtained at alignment observation in Embodiment 3-3 according to the third mode for carrying out the invention.
Figure 59B:
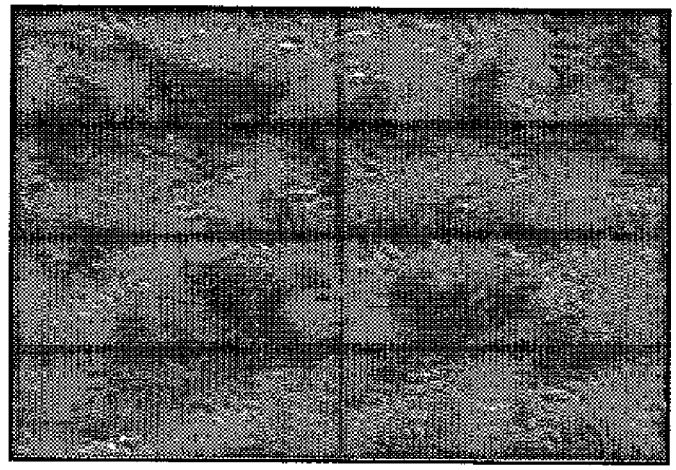

Unevenness having reflectivity is formed on the TFT substrate by the same technique as Embodiment 3-1. Alignment control slit is formed on the substrate surface as follows. First, the above-mentioned positive type resist is spin-costed to about 1.5. μm thickness to form a resist layer on the TFT substrate. Next, after 30 minutes of pre-baking at 90° C., exposure is performed using a mask. The mask is fanned by alignment control slits, alignment control slit patterns, end second alignment control alit patterns. The alignment control slits overlapping the long side of the adjacent two pixel electrode are formed every other one pixel electrode at the facing area to the gap portion of long side of the pixel electrode. The alignment control slit patterns of the same dimension as the gap width are formed at every pixel electrode at the facing area to the gap portion of the short side of the pixel electrode. The second alignment control slit patterns almost parallel to short side of the pixel electrode and having almost a rectangle of 4 μm or less in pattern width are formed at the facing area to the pixel electrode in a comb shape adjacent to the alignment control slit patterns. Gap width W2 between the pixel electrodes is 6 μm at both of the long side and short side of the pixel electrode, pattern width W1 of the alignment control slit of the long side of the pixel electrodes is 10 μm, and an overlapping quantity of the long side of the pixel electrodes and the alignment control slit is 2 μm. Next, development treatment, post-exposure, post-baking of 2 minutes at 130° C., peeling the ITO film, and peeling the resist layer are performed in order so as to form the alignment control slit (see Embodiment 3A; FIG. 59A). For comparison, a sample not forming the second alignment control slit is produced by performing exposure using a mask forming the second control slit pattern (see Embodiment 3B; FIG. 59B).

The reflective liquid crystal display device is produced similarly as Embodiment 3-1, and response speed at changes to white display from black display are measured adding to similar measurement and observation. The result is shown in Table 6. Although whole white reflectance, whole black reflectance, CR are similar as Embodiment 3-2, alignment condition viewed by linear polarizer is different, removing light is reduced in Embodiment 3A (FIG. 59A) forming the second alignment control slit as shown in FIG. 59A and FIG. 59B, and alignment direction of liquid crystal agrees with azimuth of short side of pixel electrode. This is because liquid crystal in the pixel electrode becomes easy to orient to direction of short side of the pixel electrode by the second alignment control slit arranged in comb shape, response speed from whole black to whole white is improved over the conventional example.

TABLE 5

|  | W1/W2 | Whole white reflectance | Whole black reflectance | CR | Linear polarized light | Circular polarized light | Display defect |
| --- | --- | --- | --- | --- | --- | --- | --- |
| Embodiment 2A | 0.5 | 11.0% | 0.25% | 44.0 | X | ◯ | No |
| Embodiment 2B | 0.8 | 10.8% | 0.25% | 43.2 | Δ | ◯ | No |
| Embodiment 2C | 1.2 | 10.7% | 0.25% | 42.8 | ◯ | ◯ | No |
| Embodiment 2D | 1.5 | 10.5% | 0.25% | 42.0 | ◯ | ◯ | No |
| Conventional example | — | 11.0% | 0.35% | 31.4 | ◯ | ◯ | Rubbing sinew |

TABLE 6

|  | W1/W2 | Whole white reflectance | Whole black reflectance | CR | Linear polarized light | Circular polarized light | Response speed |
|---|---|---|---|---|---|---|---|
| Embodiment 3A | 1.7 | 10.5% | 0.25% | 42.0 | ○ | ○ | 27 ms |
| Embodiment 3B | 1.7 | 10.8% | 0.25% | 43.2 | Δ | ○ | 45 ms |
| Conventional example | — | 11.0% | 0.35% | 31.4 | ○ | ○ | 25 ms |

EMBODIMENT 3-4

Unevenness having reflectivity is formed on the TFT substrate by the same technique as Embodiment 3-1. Alignment control structure and second alignment control slit are formed on the substrate surface as follows. First, the above-mentioned positive type resist is spin-coated to about 3 μm thickness to form resist layer on the TFT substrate. Next, after 30 minutes of pre-baking at 90° C., the alignment control slit pattern overlapping the long sick of adjacent two pixel electrodes is formed at every other one pixel electrode at a facing area to the gap portion of the long side of the pixel electrode, and exposure is performed using a mask forming the alignment control structure pattern of the same dimension at the gap width at the facing area to the gap portion of the short side of the pixel electrode at every pixel electrode. Next, half exposure is performed using a mask forming a dot shape pattern for supporting the substrate on the pattern of alignment control strucure. Next, development treatment, post-exposure, post-baking of 2 minutes a 130° C., and final baking of 60 minutes at 220° C. are performed so as to from the alignment control structure and supporting column.

The above-mentioned positive type resist is spin-coated to bout 1.5 μm thickness to form a resist layer on the TFT substrate. Next, after 30 minutes of pre-baking at 90° C., and-exposure is performed using a mask in which a second alignment control slit patterns almost parallel to the short side of the pixel electrode and having almost a rectangle of 4 μm or less in pattern width are formed in a comb shape adjacently to the gap portion of the long side of the pixel electrode not forming the alignment control Structure at the facing area. Gap width W2 between the pixel electrodes is 6 μm at both of the long side and short side of the pixel electrode, pattern width W1 of the alignment control slit of the long said of the pixel electrodes is 10 μm, and an overlapping quantity of the long side of the pixel electrodes and the alignment control slit is 2 μm. Next, development treatment, post-exposure, post-baiting of 2 minutes at 130° C., peeling Al film and uneven layer at an area being the second alignment control slit, and pooling of the resist layer are performed in order so as to form the second alignment control slit.

The reflective liquid crystal display device is produced similarly as Embodiment 3-1, and similar measurement and observation as Embodiment 3-3 are performed. The result is shown in Table 7. Although whole white reflectance at the embodiment (embodiment 4 in Table 7) falls for peeling reflective plate (Al film) on the pixel electrode, whole black reflectance does not change so that contrast ratio is as same as the conventional example. Even if whole white reflectance falls, clarity of display does not fall much because contrast ratio is high. In alignment condition viewed by linear polarizer, removing light is reduced similarly as Embodiment 3A. as a result, response speed from whole black to whole white is improved over rubbing treatment (conventional example). When the reflection-transmission type liquid crystal display device is produced forming the second alignment control slit, relation of transmittance and reflectance is in a relation of trade-off, length and forming interval of the second alignment control slit may be changed by desired transmittance and reflectance besides a comb shaped pattern used in the embodiment.

TABLE 7

|  | W1/W2 | Whole white reflectance | Whole black reflectance | CR | Linear polarized light | Circular polarized light | Response speed |
|---|---|---|---|---|---|---|---|
| Embodiment 4 | 1.7 | 8.0% | 0.25% | 32.0 | ○ | ○ | 27 ms |
| Conventional example | — | 11.0% | 0.35% | 31.4 | ○ | ○ | 25 ms |

EMBODIMENT 3-5

Unevenness having reflectivity is formed on TFT substrate by the same technique as Embodiment 3-1, and alignment control structure is formed on the facing substrate. Next, a vertical alignment film is applied on a surface of the TFT substrate and the facing substrate, and bonding is performed. The above-mentioned liquid crystal including liquid crystal monomer (by Merck Japan Company) of 0.3 wt % having photopolymization is injected into an empty panel. The reflective liquid crystal display device is produced as similarly as Embodiment 3-1, and the material is photopolymerized while applying DC 10 V so as to form high polymer chain based on liquid crystal alignment. Measurement and observation similar as Embodiment 3-1 are performed besides threshold voltage when reflectance is 10% and response speed from whom black to whole white. The result is shown in Table 8.

In Embodiment 3-5 (Embodiment 5 in Table 8) forming high polymer chain in compatibility with liquid crystal in liquid crystal, threshold voltage falls by 0.3 V when comparing Embodiment 1B, removing light in alignment condition viewed by linear polarizer is reduced, and response speed from whole black to whole white is improved over rubbing treatment (conventional example). However, whole black reflectance increases a little because liquid crystal is easy to orient with tilt, and contrast ratio falls. Threshold voltage does not fall to degree of the conventional example because high polymer chain becomes resistance. However, contrast ratio is as same as the conventional example, the embodiment provides useful means when multi-gradation display is required because fall of 0.3 V is large for saturation voltage 2.3 V.

TABLE 8

|  | W1/W2 | Whole white reflectance | Whole black reflectance | CR | Threshold voltage | Linear polarized light | Circular polarized light | Response speed |
|---|---|---|---|---|---|---|---|---|
| Embodiment 1B | 1.7 | 11.1% | 0.25% | 44.4 | 1.60 | Δ | ○ | 43 ms |
| Embodiment 5 | 1.7 | 11.1% | 0.36% | 30.8 | 1.30 | ○ | ○ | 25 ms |
| Conventional example | — | 11.0% | 0.35% | 31.4 | 1.10 | ○ | ○ | 25 ms |

EMBODIMENT 3-6

Unevenness having reflectivity is formed on the TFT substrate by the same technique as Embodiment 3-1, vertical alignment control film is applied on surface of TFT substrate and facing substrate. Next, ultra violet light of 2000 mJ/cm² tilting 45° to substrate surface from almost parallel azimuth is irradiated at short side of the pixel electrode in only the facing substrate, and light reforming of vertical alignment film is performed. The reflective liquid crystal display device is produced similarly as Embodiment 3-1 besides spraying spacer on the facing substrate, and measurement and observation similar as Embodiment 3-5 are performed. The result is shown in Table 9.

In Embodiment 3-6 (described Embodiment 6 in Table 9), whole black reflectance is low, and contrast ratio is high comparative to conventional example. Threshold voltage, alignment, and response speed are same as the conventional example, display defect such as rubbing sinew is not generated. Light reforming of alignment film is effective in order to perform the alignment control structure having alignment regulating force which is equal to or more than that of oblique electric field only on the facing substrate.

using bus lines on the TFT substrate. That is, although the bus lines are firmed to upper and lower, and right and left azimuth surrounding the pixel electrode, the resist layer is formed in a remaining bus line shape when film thickness of the resist layer is made thin. When the resist layer is half-exposed, unevenness has directivity to upper and lower azimuths because unevenness is formed continuously in a plane along shape of bus lines. Here, the reason that directivity generates to upper and lower azimuths is that the distance of the gap portion shorter at a data bus line formed to upper and lower azimuths than same bus line formed to right and left azimuths, and the embodiment can have directivity even to right and left azimuths by forming Cs or contact hole so that a distance of the gap portion of right and left azimuths is shorted. In this case, unevenness may be arranged at side that lilt alignment direction dof liquid crystal is not observed from the oblique direction if possible as above-described.

Next, Al film is deposited at whole surface of the substrate, a reflective electrode is formed peeling Al film except the pixel electrode using photolithography. Vertical alignment film is applied on surface of TFT substrate and facing substrate, ultra violet light of 2000 mJ/cm² tilting 45° to substrate surface from almost parallel azimuth is irradiated at short side of the pixel electrode in only the facing substrate, and light reforming of vertical alignment film is performed. The reflective liquid crystal display device is produced similarly as Embodiment 3-1 except spraying spacer on the facing substrate.

Reflectance at whole black display and whole white display is measured by entering point light source with tilt

TABLE 9

|  | Whole white reflectance | Whole black reflectance | CR | Threshold voltage | Linear polarized light | Circular polarized light | Response speed | Display defect |
|---|---|---|---|---|---|---|---|---|
| Embodiment 6 | 11.0% | 0.25% | 44.0 | 1.20 | ○ | ○ | 25 ms | No |
| Conventional example | 11.0% | 0.35% | 31.4% | 1.10 | ○ | ○ | 25 ms | Rubbing sinew |

EMBODIMENT 3-7

Unevenness having azimuth angle dependency at reflective strength is formed on the substrate surface as follows. first, positive type resist is spin-coated to about 1.5 μm thickness to form resist layer on the TFT substrate. Next, after 30 minutes of pre-baking at 90° C. the resist layer is half-exposed, post baking of 40 minutes at 135° C., and final baking of 60 minutes at 200° C. are performed so as to form unevenness. The reason that the resist layer is made half of the thickness of Embodiment 3-1 is to have directivity of upper and lower azimuths at a plane shape of unevenness of 30° from upper and lower, and right and left azimuths, and by receiving light at vertical direction to the substrate. The result is shown in Table 10. Although CR does not almost change, reflectance of whole black falls 30% comparing with the conventional example in Embodiment 3-7 (described Embodiment 7 in Table 10). In Embodiment 7, by setting local maximum of reflective strength to azimuth different in 90° from azimuth (right azimuth) which liquid crystal orients with tilt, black floating of azimuth of tilt alignment of liquid crystal at mono-domain alignment can be inconspicuous because high azimuth of CR can be made bright and low azimuth dark.

TABLE 10

|  | Upper azimuth White/Black/CR | Lower azimuth White/Black/CR | Right azimuth White/Black/CR | Left azimuth White/Black/CR |
| --- | --- | --- | --- | --- |
| Embodiment 7 | 22.0/0.37/59.5 | 23.0/0.38/60.5 | 12.0/0.70/17.1 | 12.0/0.18/66.7 |
| Conventional example | 17.0/0.28/60.7 | 17.3/0.29/59.7 | 16.9/1.00/16.9 | 17.1/0.25/68.4 |

As described above, according to the mode for carrying out, display high in contrast ratio and brighter is obtained in the reflective liquid crystal display device of one sheet polarizing plate system.

Thus, according to the invention, the reflective liquid crystal display device reducing a falloss of contrast by retardation and having low cost and high reflectance is realized.

What is claimed is:

1. A substrate for a reflective liquid crystal display device comprising:
    a light reflective plate having an uneven shape on a reflective surface thereof,
    wherein the uneven shape is a wrinkled pattern having linear or curved shaped top portions when viewed in a direction vertical to the reflective surface,
    wherein the reflective surface has a plurality of small mirror surfaces, each small mirror surface having a normal vector $I_n$ at a specified azimuth angle $\phi$, there being existing probabilities that each of said normal vectors is in an azimuth angular range of $\phi_n$ to $\phi_n+1°$, and
    wherein a standard deviation of said existing probabilities is greater than 0.1.

2. A substrate for a reflective liquid crystal display device according to claim 1,
    wherein the standard deviation is 0.5 or more.

3. A substrate for a reflective liquid crystal display device according to claim 1,
    wherein a local maximum of the random variable exists at an arbitrary azimuth angle and an azimuth angle almost intersecting to the arbitrary azimuth angle at a right angle.

4. A substrate for a reflective liquid crystal display device according to claim 1,
    wherein a local maximum of the random variable exists only at an arbitrary azimuth angle.

5. A reflective liquid crystal display device providing liquid crystal sealed by a pair of facing substrates and having negative dielectric anisotropy, and a light reflective plate formed at one of the substrates,
    wherein the substrate is the substrate for a reflective liquid crystal display device according to claim 1.

6. A reflective liquid crystal display device according to claim 5,
    wherein the uneven shape is a wrinkled pattern.

7. A reflective liquid crystal display device according to claim 6,
    wherein the wrinkled pattern is reflected by a surface shape of grounding of the reflective surface.

* * * * *